(12) United States Patent
Ishizuka et al.

(10) Patent No.: US 12,359,103 B2
(45) Date of Patent: Jul. 15, 2025

(54) PRESSURE SENSITIVE ADHESIVE PARTICLE AND METHOD OF PRODUCING PRINTED MATTER

(71) Applicant: FUJIFILM Business Innovation Corp., Tokyo (JP)

(72) Inventors: Takahiro Ishizuka, Kanagawa (JP); Satoshi Kamiwaki, Kanagawa (JP); Sumiaki Yamasaki, Kanagawa (JP); Yoshifumi Iida, Kanagawa (JP); Sakae Takeuchi, Kanagawa (JP); Satomi Kashiwagi, Kanagawa (JP); Susumu Yoshino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 847 days.

(21) Appl. No.: 17/003,509

(22) Filed: Aug. 26, 2020

(65) Prior Publication Data
US 2021/0017429 A1    Jan. 21, 2021

Related U.S. Application Data

(63) Continuation-in-part of application No. 16/817,719, filed on Mar. 13, 2020, now abandoned.

(30) Foreign Application Priority Data

Jul. 17, 2019 (JP) .................................. 2019-132140
Jul. 17, 2019 (JP) .................................. 2019-132145
Jul. 17, 2019 (JP) .................................. 2019-132146

(51) Int. Cl.
*C09J 125/14* (2006.01)
*B41M 5/50* (2006.01)
*C09J 11/04* (2006.01)

(52) U.S. Cl.
CPC ............ *C09J 125/14* (2013.01); *B41M 5/502* (2013.01); *C09J 11/04* (2013.01)

(58) Field of Classification Search
None
See application file for complete search history.

(56) References Cited

U.S. PATENT DOCUMENTS 5,250,382 A * 10/1993 Shimojo ............ G03G 9/08797
430/109.3
2001/0053492 A1* 12/2001 Suwabe ............... G03G 9/0827
430/110.3

(Continued)

FOREIGN PATENT DOCUMENTS

EP    3 147 339 A1    3/2017
JP    2007-229993 A    9/2007

(Continued)

*Primary Examiner* — Scott R. Walshon
*Assistant Examiner* — Thomas A Mangohig
(74) *Attorney, Agent, or Firm* — Sughrue Mion, PLLC

(57) ABSTRACT

A pressure sensitive adhesive particle includes a styrene resin; and a (meth)acrylate resin, wherein the (meth)acrylate resin contains two kinds of (meth)acrylates as a polymerization component in which the weight proportion of the (meth)acrylate to the total polymerization components is 90% by weight or more, and has two glass transition points in which a difference between the lowest glass transition temperature and the highest glass transition temperature is 30° C. or higher.

12 Claims, 3 Drawing Sheets

(56) References Cited

U.S. PATENT DOCUMENTS

| | | | |
|---|---|---|---|
| 2009/0226834 A1* | 9/2009 | Matsumura | G03G 9/0819 |
| | | | 430/105 |
| 2013/0030110 A1 | 1/2013 | Okada et al. | |
| 2014/0363763 A1* | 12/2014 | Shibata | G03G 9/08724 |
| | | | 430/109.3 |
| 2018/0275544 A1 | 9/2018 | Chonan et al. | |
| 2019/0292412 A1* | 9/2019 | Yamasaki | C09J 4/06 |

FOREIGN PATENT DOCUMENTS

| | | |
|---|---|---|
| JP | 2012-188512 A | 10/2012 |
| JP | 2018-002889 A | 1/2018 |
| JP | 2018-163198 A | 10/2018 |
| JP | 6468727 B2 | 2/2019 |

\* cited by examiner

PRESSURE SENSITIVE ADHESIVE PARTICLE AND METHOD OF PRODUCING PRINTED MATTER

CROSS-REFERENCE TO RELATED APPLICATIONS

This application is a continuation-in-part of U.S. application Ser. No. 16/817,719, filed Mar. 13, 2020, which is based on and claims priority under 35 U.S.C. § 119 from Japanese Patent Application No. 2019-132140, filed on Jul. 17, 2019, Japanese Patent Application No. 2019-132145, filed on Jul. 17, 2019, and Japanese Patent Application No. 2019-132146, filed on Jul. 17, 2019, the disclosures of which are incorporated herein by reference in their respective entireties.

BACKGROUND

(i) Technical Field

The preset invention relates to a pressure sensitive adhesive particle and a method of producing a printed matter.

(ii) Related Art

In JP-A-2012-188512, there is disclosed a water-dispersed pressure-sensitive adhesive composition containing two kinds of acrylic polymers in an aqueous solvent.

In JP-A-2018-002889, there is disclosed an adhesive material satisfying an expression formula: 20° C.≤T (1 MPa)−T (10 MPa) (where T (1 MPa) represents a temperature at which the viscosity becomes $10^4$ Pa·s at an applied pressure of 1 MPa, and T (10 MPa) represents a temperature at which the viscosity becomes $10^4$ Pa·s at an applied pressure of 10 MPa).

In JP-A-2018-163198, there is disclosed a pressure fixing toner that contains a styrene resin and a (meth)acrylate resin having a glass transition temperature which is lower than that of the styrene resin by at least 30° C., and includes a core portion having a sea-island structure formed of a sea part containing the styrene resin and an island part containing the (meth)acrylate resin, and a major axis of 200 nm to 500 nm; and a shell layer covering the core portion and containing a resin having a glass transition temperature of 50° C. or higher.

In JP-B-6468727, there is disclosed a water-dispersed pressure-sensitive adhesive composition that contains an acrylic polymer (A) which is a polymer of a monomer raw material (A), an acrylic polymer (B) which is a polymer of the monomer raw material (B), in which a glass transition temperature of the acrylic polymer (B) is 0° C. or higher, a weight average molecular weight of the acrylic polymer (B) is more than $0.3 \times 10^4$ and $5 \times 10^4$ or less, a weight average molecular weight of the acrylic polymer (A) is $40 \times 10^4$ or more, a difference between the glass transition temperature of the acrylic polymer (B) and the glass transition temperature of the acrylic polymer (A) is 70° C. or higher, and the monomer raw material (B) contains a carboxyl group-containing monomer in a proportion of 3% by weight to 20% by weight.

In JP-A-2007-229993, there is disclosed a pressure-bonded postcard paper in which an adhesive layer contains an acrylic acid/alkyl methacrylate copolymer.

SUMMARY

Aspects of non-limiting embodiments of the present disclosure relate to a pressure sensitive adhesive particle that contains a styrene resin and a (meth)acrylate resin, and easily undergoes phase transition due to pressure and has excellent adhesion as compared with a pressure sensitive adhesive particle in which the (meth)acrylate resin is a (meth)acrylate homopolymer.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a pressure sensitive adhesive particle including:
a styrene resin; and
a (meth)acrylate resin,
wherein the (meth)acrylate resin contains two kinds of (meth)acrylates as a polymerization component, with a weight proportion of the (meth)acrylates to the total polymerization components being 90% by weight or more, and has two glass transition points, with a difference between the lowest glass transition temperature and the highest glass transition temperature being 30° C. or higher.

BRIEF DESCRIPTION OF THE DRAWINGS

Exemplary embodiments of the present invention will be described in detail based on the following figures, wherein.

DETAILED DESCRIPTION

Figure 1:
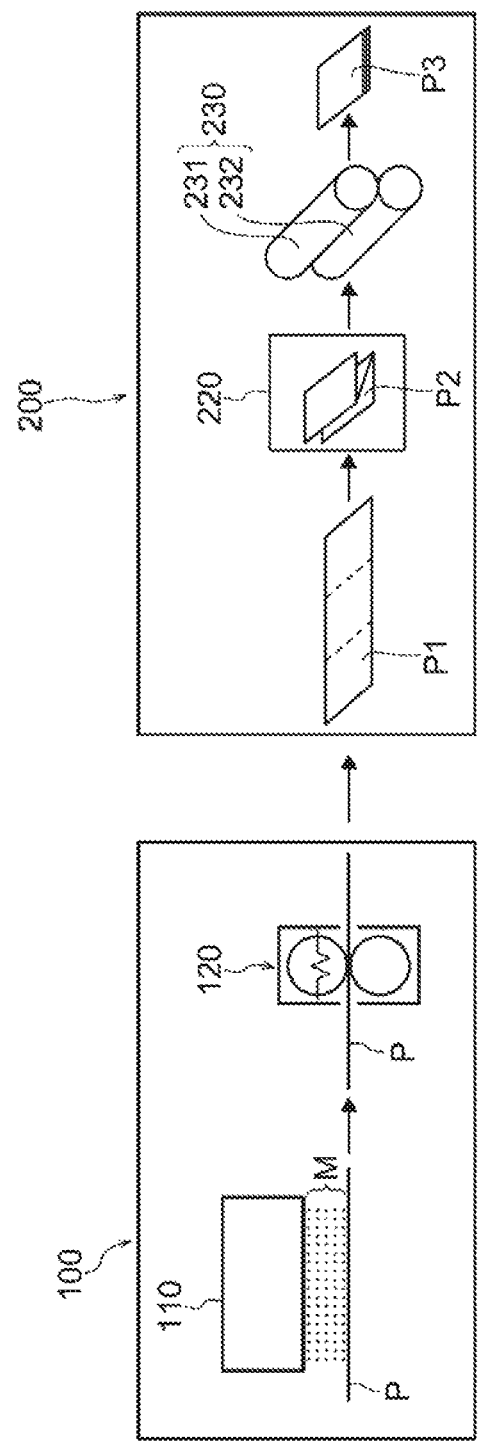
FIG. 1 is a schematic diagram illustrating an example of an apparatus of producing a printed matter according to the exemplary embodiment.

Hereinafter, the exemplary embodiment of the present disclosure will be described. These descriptions and examples illustrate the exemplary embodiments and do not limit the scope of the exemplary embodiment.

In the present disclosure, a numerical range indicated by using "to" indicates a range including the numerical values described before and after "to" as the minimum value and the maximum value, respectively.

In the numerical ranges that are described stepwise in the present disclosure, the upper limit value or the lower limit value described in one numerical range may be replaced with the upper limit value or the lower limit value of other numerical ranges described in stages. In addition, in the numerical range described in the present disclosure, the upper limit value or the lower limit value of the numerical range may be replaced with the value described in examples.

In the present disclosure, a term "process" is not limited to an independent process, and is included in the term if the intended purpose of the process is achieved even in a case where it is not able to be clearly distinguished from other processes.

In the present disclosure, in a case where the exemplary embodiment is described with reference to the drawings, a configuration of the exemplary embodiment is not limited to the configuration illustrated in the drawings. Moreover, the size of the member in each figure is conceptual, and the relative relationship of the size between the members is not limited to this.

In the present disclosure, each component may contain a plurality of corresponding substances. In a case where the amount of each component in the composition is referred to in the present disclosure, when there are a plurality of substances corresponding to each component in the composition, unless otherwise specified, the amount of each component means the total amount of the plurality of substances present in the composition.

In the present disclosure, each component may contain a plurality of corresponding particles. In a case where there are a plurality of particles corresponding to the respective components in a composition, unless otherwise specified, the particle diameter of each component means a value of a mixture of the plurality of particles present in the composition.

In the present disclosure, "(meth)acrylic" is an expression including both "acrylic" and "methacrylic".

In the present disclosure, "a pressure sensitive adhesive particle" is also simply referred to as "an adhesive particle".

In the present disclosure, a printed matter formed by folding a recording medium in half and bonding the surfaces facing each other or a printed matter formed by stacking two or more recording media and bonding the surfaces facing each other is referred to as a "pressure-bonded printed matter".

Pressure Sensitive Adhesive Particle

The adhesive particle according to the exemplary embodiment contains a styrene resin containing styrene and other vinyl monomers as a polymerization component, and a (meth)acrylate resin which contains at least two kinds of (meth)acrylates as a polymerization component, with the weight proportion of the (meth)acrylate to the total polymerization components being 90% by weight or more, and has at least two glass transition temperatures, with a difference between the lowest glass transition temperature and the highest glass transition temperature being 30° C. or higher.

The adhesive particle according to the exemplary embodiment undergoes phase transition due to pressure by exhibiting a thermal characteristic of "having at least two glass transition temperatures in which a difference between the lowest glass transition temperature and the highest glass transition temperature is 30° C. or higher". In the present disclosure, the adhesive particle that undergoes the phase transition due to the pressure means an adhesive particle that satisfies Expression 1 below.

$$10° C. \leq T1-T2 \quad \text{Expression 1:}$$

In Expression 1, T1 is a temperature at which the adhesive particle has a viscosity of 10,000 Pa·s under a pressure of 1 MPa, and T2 is a temperature at which the adhesive particle has a viscosity of 10,000 Pa·s under a pressure of 10 MPa. A method of obtaining the temperature T1 and the temperature T2 will be described below.

The adhesive particle according to the exemplary embodiment easily undergoes the phase transition due to the pressure and has excellent adhesion by containing the "styrene resin containing styrene and other vinyl monomers as a polymerization component" and the "(meth)acrylate resin which contains at least two kinds of (meth)acrylates as a polymerization component, with the weight proportion of the (meth)acrylate to the total polymerization components being 90% by weight or more". The following is presumed as a mechanism thereof.

In general, it is considered that the styrene resin and the (meth)acrylate resin have low compatibility with each other, and thus both resins are contained in an adhesive particle in a phase-separated state. In addition, it is considered that when the adhesive particle is pressurized, the (meth)acrylate resin having a relatively low glass transition temperature is first fluidized, and the fluidization is spread to the styrene resin, so that both resins are fluidized. Further, it is considered that both resins in the adhesive particle form a phase-separated state again due to low compatibility when the resins are fluidized by pressurization and then solidified in accordance with reduced pressure to thereby form a resin layer.

The (meth)acrylate resin containing at least two (meth)acrylates as the polymerization component has at least two kinds of ester groups bonded to a main chain, and thus it is presumed that the degree of molecular alignment in a solid state is lower than that of the (meth)acrylate homopolymer, and therefore, the resin is easily fluidized by pressurization. Furthermore, when the weight proportion of the (meth)acrylate to the total polymerization components is 90% by weight or more, since at least two kinds of ester groups are present in high density, it is presumed that the degree of molecular alignment in the solid state is high, and therefore, the resin is easily fluidized by pressurization. Therefore, it is presumed that the adhesive particle according to the exemplary embodiment is more easily fluidized due to the pressure, that is, more likely to undergo phase transition due to the pressure, as compared with an adhesive particle in which the (meth)acrylate resin is a (meth)acrylate homopolymer.

It is presumed that since the (meth)acrylate resin containing at least two kinds of (meth)acrylates as a polymerization component, with the weight proportion of the (meth)acrylate to the total polymerization components being 90% by weight or more, has a low degree of molecular alignment even when it is solidified again, the phase separation from the styrene resin is a small phase separation. It is presumed that the smaller the phase separation between the styrene resin and the (meth)acrylate resin, the higher the uniformity of the state of the bonding surface with respect to an adherend and the better the adhesion. Therefore, it is presumed that the adhesive particle according to the exemplary embodiment is excellent in the adhesion as compared with an adhesive particle in which the (meth)acrylate resin is a (meth)acrylate homopolymer.

Hereinafter, the components, structure, and characteristics of the adhesive particle according to the exemplary embodiment will be described in detail. In the following description, unless otherwise noted, "styrene resin" means a "styrene resin containing styrene and other vinyl monomers as a polymerization component", the "(meth)acrylate resin" means a "(meth)acrylate resin which contains at least two kinds of (meth)acrylates as a polymerization component, with the weight proportion of the (meth)acrylate to the total polymerization components being 90% by weight or more".

The adhesive particle according to the exemplary embodiment contains at least an adhesive mother particle, and an external additive as needed.

An Adhesive Mother Particle

The adhesive mother particle contains at least a styrene resin and a (meth)acrylate resin. The adhesive mother particle may contain a coloring agent, a release agent, and other additives.

From the viewpoint of maintaining the adhesion, the adhesive mother particle preferably has a styrene resin content higher than a (meth)acrylate resin content. The content of the styrene resin is preferably 55% by weight to 80% by weight, is more preferably 60% by weight to 75% by weight, and is still more preferably 65% by weight to 70% by weight, with respect to the total content of the styrene resin and the (meth)acrylate resin.

Styrene Resin

The adhesive mother particles constituting the adhesive particle according to the exemplary embodiment contain a styrene resin containing styrene and other vinyl monomers as polymerization components.

From the viewpoint of preventing the fluidization of the adhesive particle in an unpressurized state, the weight proportion of styrene to the total polymerization components of the styrene resin is preferably 60% by weight or more, and is more preferably 70% by weight or more, and is still more preferably 75% by weight or more, and from the viewpoint of forming an adhesive particle that easily undergoes phase transition by pressure, it is preferably 95% by weight or less, is more preferably 90% by weight or less, and is still more preferably 85% by weight or less.

Examples of other vinyl monomers other than styrene constituting the styrene resin include a styrene monomer other than styrene and an acrylic monomer.

Examples of styrene monomers other than styrene include vinyl naphthalene; alkyl-substituted styrene such as α-methyl styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, and p-n-dodecyl styrene; aryl-substituted styrene such as p-phenyl styrene; alkoxy-substituted styrene such as p-methoxystyrene; halogen-substituted styrene such as p-chlorostyrene, 3,4-dichlorostyrene, p-fluorostyrene, and 2,5-difluorostyrene; and nitro-substituted styrene such as m-nitrostyrene, o-nitrostyrene, and p-nitrostyrene. The styrene monomer may be used alone, and two or more kinds thereof may be used in combination.

As the acrylic monomer, at least one acrylic monomer selected from the group consisting of (meth)acrylic acid and (meth)acrylate is preferable. Examples of the (meth)acrylate include alkyl (meth)acrylate, carboxy-substituted alkyl (meth)acrylate, hydroxy-substituted alkyl (meth)acrylate, alkoxy-substituted alkyl (meth)acrylate, and di(meth)acrylate. The acrylic monomer may be used alone or two or more kinds thereof may be used in combination.

Examples of the alkyl (meth)acrylate include methyl (meth)acrylate, ethyl (meth)acrylate, propyl (meth)acrylate, isopropyl (meth)acrylate, n-butyl (meth)acrylate, isobutyl (meth)methacrylate, n-hexyl (meth)acrylate, 2-ethyl hexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of the carboxy-substituted alkyl (meth)acrylate include 2-carboxyethyl (meth)acrylate.

Examples of the hydroxy-substituted alkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of the alkoxy-substituted alkyl (meth)acrylate include 2-methoxyethyl (meth)acrylate.

Examples of the di(meth)acrylate include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylates include 2-(diethylamino) ethyl (meth)acrylate, benzyl (meth)acrylate, and methoxypolyethylene glycol (meth)acrylate.

Examples of other vinyl monomers constituting the styrene resin include, in addition to the styrene monomer and the acrylic monomer, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming an adhesive particle that easily undergoes phase transition due to the pressure, the styrene resin preferably contains (meth)acrylate as a polymerization component, more preferably contains alkyl (meth)acrylate, still more preferably contains alkyl (meth)acrylate having 2 to 10 carbon atoms in an alkyl group, even still more preferably contains alkyl (meth)acrylate having 4 to 8 carbon atoms in an alkyl group, and particularly preferably contains at least one of n-butyl acrylate and 2-ethyl hexyl acrylate. From the viewpoint of forming an adhesive particle that easily undergoes phase transition due to the pressure, the styrene resin and the (meth)acrylate resin preferably contain the same kind of (meth)acrylate as a polymerization component.

From the viewpoint of preventing the fluidization of the adhesive particle in an unpressurized state, the weight proportion of the (meth)acrylate to the total polymerization components of the styrene resin is preferably 40% by weight or less, and is more preferably 30% by weight or less, and is still more preferably 25% by weight or less, and from the viewpoint of forming an adhesive particle that easily undergoes phase transition by pressure, it is preferably 5% by weight or more, is more preferably 10% by weight or more, and is still more preferably 15% by weight or more. The (meth)acrylate here is preferably alkyl (meth)acrylate, is more preferably alkyl (meth)acrylate having 2 to 10 carbon atoms in the alkyl group, and is still more preferably alkyl (meth)acrylate having 4 to 8 carbon atoms in an alkyl group.

The styrene resin particularly preferably contains at least one of n-butyl acrylate and 2-ethyl hexyl acrylate as a polymerization component, and the content of n-butyl acrylate and 2-ethyl hexyl acrylate in the total polymerization components of the styrene resin is preferably 40% by weight or less, is more preferably 30% by weight or less, and is still more preferably 25% by weight or less from the viewpoint of preventing the fluidization of the toner in an unpressurized state, and is preferably 5% by weight or more, is more preferably 10% by weight or more, and is still more preferably 15% by weight or more from the viewpoint of forming a toner that easily undergoes phase transition due to the pressure.

From the viewpoint of preventing the fluidization of the adhesive particle in an unpressurized state, the weight average molecular weight of the styrene resin is preferably 3,000 or more, and is more preferably 4,000 or more, and is still more preferably 5,000 or more, and from the viewpoint of forming an adhesive particle that easily undergoes phase transition by pressure, it is preferably 60,000 or less, is more preferably 55,000 or less, and is still more preferably 50,000 or less.

The weight average molecular weight of the resin in the present disclosure is measured by gel permeation chromatography (GPC). The molecular weight measurement by GPC is performed using HLC-8120 GPC, manufactured by Tosoh Corporation as a GPC device, TSK gel Super HM-M (15 cm), manufactured by Tosoh Corporation as a column, and tetrahydrofuran as a solvent. The weight average molecular weight of the resin is calculated based on a molecular weight calibration curve obtained by using a reference sample of a monodispersed polystyrene.

From the viewpoint of preventing the fluidization of the adhesive particle in an unpressurized state, the glass transition temperature of the styrene resin is preferably 30° C. or higher, is more preferably 40° C. or higher, and is still more preferably 50° C. or higher, and from the viewpoint of forming a toner that easily undergoes phase transition due to the pressure, it is preferably 110° C. or lower, more preferably 100° C. or lower, and is still more preferably 90° C. or lower.

In the present disclosure, the glass transition temperature of the resin is determined from a differential scanning calorimetry curve (DSC curve) obtained by performing differential scanning calorimetry (DSC). More specifically, it is determined according to "Extrapolated Glass Transition Start Temperature" described in how to determine the glass transition temperature in "Method for Measuring Glass Transition Temperature of Plastics" of JIS K7121: 1987.

The glass transition temperature of the resin may be controlled by the kind and the polymerization rate of polymerization component. The glass transition temperature tends to be higher as the density of flexible units, such as a methylene group, an ethylene group, an oxyethylene group and the like, which are contained in the main chain, is higher, and the density of rigid units, such as an aromatic ring, a cyclohexane ring and the like, which are contained in the main chain, is higher. Further, the glass transition temperature tends to be lower as the density of the aliphatic group in the side chain is higher.

The weight proportion of styrene resin to the total adhesive particles in the exemplary embodiment is, from the viewpoint of preventing the fluidization of the adhesive particle in an unpressurized state, preferably 55% by weight or more, and more preferably 60% by weight or more, and still more preferably 65% by weight or more, and from the viewpoint of forming an adhesive mother particle that easily undergoes phase transition by pressure, preferably 80% by weight or less, more preferably 75% by weight or less, and still more preferably 70% by weight or less.

(Meth)Acrylate Resin

The adhesive mother particle constituting the adhesive particle according to the exemplary embodiment contains a (meth)acrylate resin which contains at least two kinds of (meth)acrylates as a polymerization component, with the weight proportion of the (meth)acrylate to the total polymerization components being 90% by weight or more.

The weight proportion of the (meth)acrylate to the total polymerization components of the (meth)acrylate resin is preferably 90% by weight or more, is more preferably 95% by weight or more, is still more preferably 98% by weight or more, and is even still more preferably 100% by weight.

Examples of the (meth)acrylate include alkyl (meth)acrylate, carboxy-substituted alkyl (meth)acrylate, hydroxy-substituted alkyl (meth)acrylate, alkoxy-substituted alkyl (meth)acrylate, and di(meth)acrylate.

Examples of the alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethyl hexyl (meth)acrylate, lauryl (meth)acrylate, stearyl (meth)acrylate, cyclohexyl (meth)acrylate, dicyclopentanyl (meth)acrylate, and isobornyl (meth)acrylate. Examples of the carboxy-substituted alkyl (meth)acrylate include 2-carboxyethyl (meth)acrylate. Examples of the hydroxy-substituted alkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of the alkoxy-substituted alkyl (meth)acrylate include 2-methoxyethyl (meth)acrylate.

Examples of the di(meth)acrylate include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylates include 2-(diethylamino)ethyl (meth)acrylate, benzyl (meth)acrylate, and methoxypolyethylene glycol (meth)acrylate.

The (meth)acrylate may be used singly or in combination of two or more types thereof.

From the viewpoint of forming an adhesive particle that easily undergoes phase transition by pressure and has excellent adhesion, the (meth)acrylate is preferably alkyl (meth)acrylate, is more preferably alkyl (meth)acrylate having 2 to 10 carbon atoms in an alkyl group, is still more preferably alkyl (meth)acrylate having 4 to 8 carbon atoms in an alkyl group, and is particularly preferably n-butyl acrylate or 2-ethyl hexyl acrylate. From the viewpoint of forming an adhesive particle that easily undergoes phase transition due to the pressure, the styrene resin and the (meth)acrylate resin preferably contain the same kind of (meth)acrylate as a polymerization component.

From the viewpoint of forming an adhesive particle that easily undergoes phase transition by pressure and has excellent adhesion, the weight proportion of the alkyl (meth)acrylate to the total polymerization components of the (meth)acrylate resin is preferably 90% by weight or more, is more preferably 95% by weight or more, is still more preferably 98% by weight or more, and is even still more preferably 100% by weight. As the alkyl (meth)acrylate here, an alkyl (meth)acrylate having 2 to 10 carbon atoms in an alkyl group is preferable, and an alkyl (meth)acrylate having 4 to 8 carbon atoms in an alkyl group is more preferable.

From the viewpoint of forming an adhesive particle that easily undergoes phase transition by pressure and has excellent adhesion, the weight ratio of two kinds having the largest weight ratio among at least two kinds of (meth)acrylates contained as the polymerization components for the (meth)acrylate resin is preferably 80:20 to 20:80, is more preferably 70:30 to 30:70, and is still more preferably 60:40 to 40:60.

Among at least two (meth)acrylates contained in the (meth)acrylate resin as the polymerization component, the two kinds having the largest weight ratio are preferably alkyl (meth)acrylates. As the alkyl (meth)acrylate here, an alkyl (meth)acrylate having 2 to 10 carbon atoms in an alkyl group is preferable, and an alkyl (meth)acrylate having 4 to 8 carbon atoms in an alkyl group is more preferable.

In a case where the two kinds having the largest weight ratio among at least two (meth)acrylates contained in the (meth)acrylate resin as the polymerization component are alkyl (meth)acrylates, from the viewpoint of forming an adhesive particle that is easily transferred due to the pressure and has excellent adhesion, the difference in carbon number of the alkyl group of the two kinds of alkyl (meth)acrylates is preferably 1 to 4, is more preferably 2 to 4, and is still more preferably 3 or 4.

From the viewpoint of forming an adhesive particle that easily undergoes phase transition by pressure and has excellent adhesion, the (meth)acrylate resin preferably contains n-butyl acrylate and 2-ethyl hexyl acrylate as a polymerization component, and among at least two (meth)acrylates contained in the (meth)acrylate resin as the polymerization component, the two kinds having the largest weight ratio are particularly preferably n-butyl acrylate and 2-ethyl hexyl acrylate. The content of n-butyl acrylate and 2-ethyl hexyl acrylate in the total polymerization components of the (meth)acrylate resin is preferably 90% by weight or more, is more preferably 95% by weight or more, is still more preferably 98% by weight or more, and is even still more preferably 100% by weight.

The (meth)acrylate resin may contain a vinyl monomer other than the (meth)acrylate in the polymerization component. Examples of the vinyl monomers other than (meth) acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; olefins such as isoprene, butene, and butadiene. These vinyl monomers may be used alone or two or more kinds thereof may be used in combination.

In a case where the (meth)acrylate resin contains the vinyl monomer other than (meth)acrylate in the polymerization component, the vinyl monomer other than (meth)acrylate is preferably at least one of acrylic acid and methacrylic acid, and is more preferably acrylic acid.

From the viewpoint of preventing the fluidization of the adhesive particle in an unpressurized state, the weight average molecular weight of the (meth)acrylate resin is preferably 50,000 or more, and is more preferably 100,000 or more, and is still more preferably 120,000 or more, and from the viewpoint of forming an adhesive particle that easily undergoes phase transition by pressure, it is preferably 250,000 or less, is more preferably 220,000 or less, and is still more preferably 200,000 or less.

From the viewpoint of forming an adhesive particle that easily undergoes phase transition due to the pressure, the glass transition temperature of the (meth)acrylate resin is preferably 10° C. or lower, is more preferably 0° C. or lower, and is still more preferably −10° C. or lower, and from the viewpoint of preventing the fluidization of the adhesive particle in an unpressurized state, it is preferably −90° C. or higher, is more preferably −80° C. or higher, and is still more preferably −70° C. or higher.

From the viewpoint of forming an adhesive particle that easily undergoes phase transition due to the pressure, the weight proportion of the (meth)acrylate resin to the total adhesive particle particles in the exemplary embodiment is preferably 20% by weight or more, is more preferably 25% by weight or more, and is still more preferably 30% by weight or more, and from the viewpoint of preventing the fluidization of the adhesive particle in an unpressurized state, it is preferably 45% by weight or less, is more preferably 40% by weight or less, and is still more preferably 35% by weight or less.

The content of the styrene resin and the (meth)acrylate resin contained in the adhesive particle in the exemplary embodiment is preferably 70% by weight or more, is more preferably 80% by weight or more, is still more preferably 90% by weight or more, and is even still more preferably 95% by weight or more, and is further still more preferably 100% by weight, with respect to the total adhesive particles.

Other Resins

The adhesive particles may contain polystyrene, an epoxy resin, a polyester resin, a polyurethane resin, a polyamide resin, a cellulose resin, a polyether resin, a modified rosin or the like. These resins may be used alone or two or more kinds thereof may be used in combination.

Various Additives

The adhesive particle may contain a coloring agent (for example, pigment, dye), a release agent (for example, hydrocarbon waxes; natural waxes such as carnauba wax, rice wax, and candelilla wax; synthetic or mineral/petroleum waxes such as montan wax; ester waxes such as fatty acid esters and montanic acid esters), an electrostatic charge controlling agent, and the like, as needed.

In a case where the adhesive particle according to the exemplary embodiment is a transparent adhesive particle, the amount of the coloring agent in the adhesive particle is preferably 1.0% by weight or less with respect to the total adhesive particles, and the coloring agent is preferably used in an amount as small as possible from the viewpoint of improving the transparency of the toner.

Structure of an Adhesive Particle

An internal structure of the adhesive particle is preferably a sea-island structure, and the sea-island structure preferably has a sea phase containing a styrene resin and an island phase containing a (meth)acrylate resin dispersed in the sea phase. The details of the styrene resin contained in the sea phase are as described above. The details of the (meth)acrylate resin contained in the island phase are as described above. The island phase which does not contain the (meth)acrylate resin may be dispersed in the sea phase.

In a case where the adhesive particle has the sea-island structure, an average diameter of the island phases is preferably 200 nm to 500 nm. When the average diameter of the island phase is 500 nm or less, the adhesive particle easily undergoes the phase transition due to the pressure, and when the average diameter of the island phase is 200 nm or more, it is excellent in the mechanical toughness required for the adhesive particle (for example, toughness with which deformation is not caused when agitated in the developer unit). From these viewpoints, the average diameter of the island phase is more preferably 220 nm to 450 nm, and is more preferably 250 nm to 400 nm.

For controlling the average diameter of the island phase of the sea-island structure to fall within the above range, for example, the amount of (meth)acrylate resin relative to the amount of styrene resin is increased or decreased in producing the adhesive particle described later, or the time for keeping the resin particles at a high temperature in the process of coalescing the aggregated resin particles is increased or decreased.

The determination of the sea-island structure and the measurement of the average diameter of the island phase are performed by the following method.

The adhesive particle is embedded in an epoxy resin, a section is prepared with a diamond knife or the like, and the prepared section is dyed with osmium tetroxide or ruthenium tetroxide in a desiccator. The dyed section is observed with a scanning electron microscope (SEM). The sea phase and the island phase of the sea-island structure are distinguished by shading caused by the dyeing degree of resin with osmium tetroxide or ruthenium tetroxide, and the presence or absence of the sea-island structure is determined based on the shading. 100 island phases are randomly selected from the SEM image, a major axis of each island phase is measured, and an average value of 100 major axes is set as an average diameter.

The adhesive particle may be an adhesive particle having a single-layer structure, or an adhesive particle having a core-shell structure composed of a core portion and a shell layer covering the core portion. From the viewpoint of preventing the fluidization of the adhesive particle in an unpressurized state, the adhesive particle preferably has a core-shell structure from the viewpoint of preventing fluidization of the adhesive particle in a non-pressurized state.

In a case where the adhesive particle has a core-shell structure, the core portion preferably contains a styrene resin and a (meth)acrylate resin from the viewpoint of easy phase transition due to the pressure. Furthermore, the shell layer preferably contains a styrene resin from the viewpoint of preventing the fluidization of the adhesive particle in an unpressurized state. The details of the styrene resin are as described above. The details of the (meth)acrylate resin are as described above.

In a case where the adhesive particle has a core-shell structure, the core portion preferably has a sea phase containing a styrene resin and an island phase containing a (meth)acrylate resin dispersed in the sea phase. The average diameter of the island phase is preferably in the range described above. Furthermore, in addition to the above-described configuration of the core portion, the shell layer preferably contains a styrene resin. In this case, the sea phase of the core portion and the shell layer are continuous, and the adhesive particle easily undergoes the phase transition due to the pressure. The details of the styrene resin contained in the sea phase of the core portion and the shell layer are as described above. The details of the (meth)acrylate resin contained in the island phase of the core portion are as described above.

Examples of the resin contained in the shell layer include polystyrene; non-vinyl resins such as an epoxy resin, a polyester resin, a polyurethane resin, a polyamide resin, a cellulose resin, a polyether resin, and a modified rosin. These resins may be used alone or two or more kinds thereof may be used in combination.

From the viewpoint of preventing deformation of the adhesive particles, the average thickness of the shell layer is preferably 120 nm or more, is more preferably 130 nm or more, and is still more preferably 140 nm or more, and is preferably 550 nm or less, is more preferably 500 nm or less, and is still more preferably 400 nm or less, from the viewpoint of easy phase transition of the adhesive particle due to the pressure.

The average thickness of the shell layer is measured by the following method.

The adhesive particle is embedded in an epoxy resin, a section is prepared with a diamond knife or the like, and the prepared section is dyed with osmium tetroxide or ruthenium tetroxide in a desiccator. The dyed section is observed with a scanning electron microscope (SEM). Cross sections of 10 adhesive particles are randomly selected from the SEM image, then the thickness of the shell layer is measured at 20 locations for each adhesive particle to calculate an average value, and an average of the average values of 10 adhesive particles is set as an average thickness.

The volume average particle diameter (D50v) of the adhesive particles is preferably 4 μm or more, is more preferably 5 μm or more, and is still more preferably 6 μm or more, from the viewpoint of easy handling of the adhesive particle, and from the viewpoint that the total adhesive particles easily undergo the phase transition due to the pressure, it is preferably 12 μm or less, is more preferably 10 μm or less, and is still more preferably 9 μm or less.

The volume average particle diameter (D50v) of the adhesive particles is measured using a COULTER MULTISIZER II (manufactured by Beckman Coulter, Inc.) and an aperture having an aperture diameter of 100 μm. 0.5 mg to 50 mg of the adhesive particles is added and dispersed in 2 mL of a 5% by weight aqueous solution of sodium alkyl benzene sulfonate, and then mixed with 100 mL to 150 mL of an electrolytic solution (ISOTON-II, manufactured by Beckman Coulter, Inc.), the mixture is subjected to a dispersion treatment for 1 minute, and the thus-obtained dispersion is used as a sample. With respect to the sample, 50,000 particles having a particle diameter of 2 μm to 60 μm are measured for the particle diameter. In the volume-basis particle diameter distribution from the small diameter side, the particle diameter that reaches 50% in terms of cumulation is referred as a volume average particle diameter (D50v).

The adhesive particle according to the exemplary embodiment preferably further includes a titanium oxide particle as an external additive, along with the adhesive particle having the above-described properties. It is presumed that when the adhesive includes the titanium oxide particle, the interaction between the adhesive particles and the titanium oxide particles works and contributes to the improvement of the adhesion. In particular, it is considered that an adhesive having excellent adhesion may be obtained since the titanium oxide particle exhibits more effective interaction with the resin kinds contained in the adhesive particle. When the adhesive particle according to the exemplary embodiment contains the titanium oxide particle as an external additive, the adhesive particle having the excellent adhesion is provided. In the adhesive particle according to the exemplary embodiment, it is preferable that the titanium oxide particle attaches to the surface of the adhesive particle.

The crystal structure of the titanium oxide particle is not particularly limited, and examples thereof include a rutile type, an anatase type, and a brookite type. An average primary particle diameter of the titanium oxide particles is preferably 1 nm to 180 nm, is more preferably 1 nm to 100 nm, and is still more preferably 10 nm to 90 nm from the viewpoint of improving the adhesion.

The titanium oxide particle contained in the external additive of the adhesive particle according to the exemplary embodiment is preferably a titanium oxide particle which is surface-treated with a surface treatment agent from the viewpoint of improving dispersibility in the adhesive particle. As a surface treatment agent, a silicon-containing organic compound is preferable. Examples of the silicon-containing organic compound include an alkoxysilane compound, a silazane compound, and a silicone oil.

Examples of the alkoxysilane compound used for the surface treatment of the titanium oxide particle include tetramethoxysilane, tetraethoxysilane; methyl trimethoxysilane, ethyl trimethoxysilane, propyl trimethoxysilane, butyl trimethoxysilane, hexyl trimethoxysilane, n-octyl trimethoxysilane, decyl trimethoxysilane, dodecyl trimethoxysilane, vinyl triethoxysilane, methyl triethoxysilane, ethyl triethoxysilane, butyl triethoxysilane, hexyl triethoxysilane, decyl triethoxysilane, dodecyl triethoxysilane, phenyl trimethoxysilane, o-methyl phenyl trimethoxysilane, p-methyl phenyl trimethoxysilane, phenyl triethoxysilane, and benzyl triethoxysilane; and dimethyl dimethoxysilane, dimethyl diethoxysilane, methyl vinyl dimethoxysilane, methyl vinyl diethoxysilane, diphenyl dimethoxysilane, diphenyl diethoxysilane; trimethyl methoxysilane, and trimethyl ethoxysilane.

Examples of the silazane compound used for the surface treatment of the titanium oxide particle include dimethyl disilazane, trimethyl disilazane, tetramethyl disilazane, pentamethyl disilazane, and hexamethyl disilazane.

Examples of the silicone oil used for the surface treatment of the titanium oxide particle include silicone oil such as dimethyl polysiloxane, diphenyl polysiloxane, and phenyl methyl polysiloxane; and modified silicone oils (also referred to as "reactive silicone oils") such as amino-modified polysiloxane, epoxy-modified polysiloxane, carboxyl-modified polysiloxane, carbinol-modified polysiloxane, fluorine-modified polysiloxane, methacryl-modified polysiloxane, mercapto-modified polysiloxane, and phenol-modified polysiloxane.

The surface treatment method using the surface treatment agent may be any method as long as it is a known method, and may be a dry method or a wet method.

The amount of the surface treatment agent (also referred to as "treatment amount") is preferably 0.5% by weight to 20% by weight, and is more preferably 3% by weight to 15% by weight with respect to the weight of the titanium oxide particles except for the surface treatment agent. The content of the titanium oxide particles contained in the external additive of the adhesive particle according to the exemplary embodiment is 0.5 parts by weight to 5 parts by weight, is preferably 0.5 parts by weight to 3 parts by weight, and is more preferably 1 part by weight to 2.5 parts by weight with respect to 100 parts by weight of the adhesive particles from the viewpoint of improving adhesion.

The adhesive particle according to the exemplary embodiment preferably contains the silica particle having an average primary particle diameter of 50 nm to 300 nm as an external additive (hereinafter, the silica particle having an average primary particle diameter within the above range is also referred to as "large diameter silica particle"). With respect to a pressure-bonded printed matter which is pressure-bonded with the adhesive particle containing a large diameter silica particle, adhesion between the adhesive particle layers and peelability are compatible.

When a printed matter is pressure-bonded with the adhesive particle containing large diameter silica particles having the average primary particle diameter of 50 nm or more as external additives, it is considered that the peelability between the adhesive particle layers is improved by the large silica particles dispersed in the adhesive particle layer. Further, when a printed matter is pressure-bonded with the adhesive particle having large diameter silica particles having the average primary particle diameter of 300 nm or less as external additives, it is considered that the adhesion between the adhesive particle layers is improved by the large silica particles dispersed in the adhesive particle layer.

An average primary particle diameter of the large diameter silica particles is 50 nm to 300 nm, is preferably 55 nm to 280 nm, and is more preferably 60 nm to 200 nm from the viewpoint of improving the adhesion.

A method of setting the average primary particle diameter of the large diameter silica particles within the above range is not particularly limited. For example, in a case where the large diameter silica particles are sol-gel silica particles, the method includes a method of controlling the average primary particle diameter by suitably varying the amount of alkoxysilane added dropwise to the amount of the alkali catalyst solution.

The large diameter silica particle may be silica, that is, a particle mainly composed of $SiO_2$, and may be crystalline or amorphous. The large diameter silica particle may be a particle produced from a silicon compound such as water glass or alkoxysilane, or may be a particle obtained by pulverizing quartz. Specific examples of the large diameter silica particle include a sol-gel silica particle; an aqueous colloidal silica particle; an alcoholic silica particle; a fumed silica particle obtained by a gas phase method or the like; and a molten silica particle. Among them, the large diameter silica particle preferably contains sol-gel silica particles from the viewpoint of further improving the peelability between the adhesive particle layers.

The sol-gel silica particle is obtained, for example, as follows. Tetraalkoxysilane is added dropwise into an alkali catalyst solution containing an alcohol compound and an ammonia aqueous solution, and the tetraalkoxysilane (TMOS) is hydrolyzed and condensed to obtain a suspension containing the sol-gel silica particle. Next, the solvent is removed from the suspension to obtain a granular material. Next, the granular material is dried to obtain a sol-gel silica particle.

From the viewpoint of the dispersibility, the average circularity of the large diameter silica particles is preferably 0.85 to 0.99, is more preferably 0.86 to 0.98, and is still more preferably 0.90 to 0.97. The average circularity of the large diameter silica particles is preferably 0.99 or less from the viewpoint of production. Further, when the average circularity of the large diameter silica particles is 0.85 or more, the large diameter silica particle tends to be prevented from being embedded in the surface of the adhesive particle.

A method of setting the average circularity of the large diameter silica particles within the above range is not particularly limited. For example, in a case where the large diameter silica particles are sol-gel silica particles, the method includes a method of controlling the average circularity of the large diameter silica particles by suitably varying the amount of alkoxysilane added dropwise to the amount of the alkali catalyst solution.

The average circularity of the large diameter silica particles is calculated by the following method. The surface of the adhesive particle is observed at a magnification of 40,000 with a scanning electron microscope (SEM), and an image is obtained for at least 100 large diameter silica particles on the outer edge of the adhesive particles. The obtained image of the large diameter silica particle is analyzed using image processing analysis software WINROOF (manufactured by Mitani Corporation), and the circularity of each large diameter silica particle is obtained by the following expression. In the following expression, A represents a projected area and PM represents a perimeter. An arithmetic average value of the circularity of the obtained large diameter silica particles is referred as the average circularities of the large diameter silica particles.

$$\text{Circularity} = \text{equivalent circle diameter perimeter/perimeter} = [2 \times (A\pi)^{1/2}]/PM$$

The large diameter silica particle may be a hydrophobic large diameter silica particle that is subjected to a hydrophobic surface treatment. A hydrophobizing agent is not particularly limited, and a silicon-containing organic compound is preferable. Examples of the silicon-containing organic compound include an alkoxysilane compound, a silazane compound, and a silicone oil. These may be used alone or two or more kinds thereof may be used in combination. Among them, 1,1,1,3,3,3-hexamethyl disilazane (HMDS) is preferable as a hydrophobizing agent for sol-gel silica particles.

For example, from the viewpoint of efficiently hydrophobizing the surface of the silica particle, the amount of the hydrophobizing agent is preferably 10% by weight to 100% by weight, and is more preferable 40% by weight to 80% by weight with respect to 100 parts by weight of the silica particles.

In a case where the large diameter silica particle is a hydrophobic large diameter silica particle that is subjected to a hydrophobic surface treatment, the average primary particle diameter of the large diameter silica particles indicates the average primary particle diameter of the hydrophobic sol-gel silica particles that are subjected to the hydrophobic surface treatment.

The external addition amount of the large diameter silica particles is preferably 0.1% by weight to 10% by weight, is more preferably 0.5% by weight to 5% by weight, and is still more preferably 1% by weight to 3% by weight, with respect to the weight of the total adhesive particles. When the external addition amount of the large diameter silica particles is 0.1% by weight or more, the peelability between the adhesive particle layers tends to be further improved. On the other hand, when the external addition amount of the large diameter silica particles is 10% by weight or less, deterioration of the adhesion between the adhesive particle layers tends to be further prevented.

The average primary particle diameter of the external additive is measured by the following method. Here, the particle diameter is a diameter of a circle having the same area as the primary particle image (so-called equivalent circle diameter). Specifically, an adhesive particle layer made of adhesive particle to which an external additive containing the titanium oxide particle or large diameter silica particle is externally added is observed with a scanning electron microscope (SEM) apparatus at an arbitrary magnification, and an electron microscope image is captured. For the arbitrary external additive particles in the obtained electron microscope image, the equivalent circle diameter is determined by image analysis. This operation is performed for 100 arbitrary external additive particles. Then, the particle diameter (50% diameter, D50v) that reaches 50% in terms of cumulation from the small diameter side in the distribution of the number basis of the primary particle diameter of each external additive particle is set as the average primary particle diameter of the external additive particles.

Other External Additives

Examples of external additives other than titanium oxide and large diameter silica particles (hereinafter, also simply referred to as "other external additives") include inorganic particles. Examples of the inorganic particle include a silica particle having an average primary particle diameter of less than 50 nm, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaOSiO_2$, $K_2O \cdot (TiO_2)n$, $Al_2O_3 \cdot 2SiO_2$, $CaCO_3$, $MgCO_3$, $BaSO_4$, and $MgSO_4$.

The surface of the inorganic particle as the external additive may be subjected to a treatment with hydrophobizing agent. The treatment with hydrophobizing agent is performed, for example, by immersing inorganic particles in a hydrophobizing agent. The hydrophobizing agent is not particularly limited, and examples thereof include a silane coupling agent, a silicone oil, a titanate coupling agent, and an aluminum coupling agent. These may be used alone or two or more kinds thereof may be used in combination. The amount of the hydrophobizing agent is generally, for example, 1 part by weight to 10 parts by weight respect to 100 parts by weight of the inorganic particles.

Examples of the external additive include a resin particle (a resin particle such as polystyrene, polymethyl methacrylate, and a melamine resin), and a cleaning aid (such as a metal salt of higher fatty acid represented by zinc stearate, and a particle of a fluorine polymer).

The external addition amount of the external additive is preferably 0.01 by weight to 5 by weight, and is more preferably 0.01 by weight to 2.0 by weight with respect to the total adhesive particles.

Properties of an Adhesive Particle

The adhesive particle according to the exemplary embodiment has at least two glass transition temperatures. It is estimated that one of the glass transition temperatures is a glass transition temperature of a styrene resin, and the other is a glass transition temperature of a (meth)acrylate resin.

The adhesive particle according to the exemplary embodiment may have three or more glass transition temperatures, and the number of glass transition temperatures is preferably two. As the form in which the number of glass transition temperatures is two, a form in which the resin contained in the adhesive particle is only a styrene resin and a (meth) acrylate resin; and a form in which the content of resins other than the styrene resin and the (meth)acrylate resin is small (for example, a form in which the content of other resins is 5% by weight or less with respect to the total adhesive particle).

The adhesive particle according to the exemplary embodiment has at least two glass transition temperatures in which a difference between the lowest glass transition temperature and the highest glass transition temperature is 30° C. or higher. The difference between the lowest glass transition temperature and the highest glass transition temperature is preferably 40° C. or higher, more preferably 50° C. or higher, and still more preferably 60° C. or higher, from the viewpoint that the adhesive particle easily undergoes phase transition due to the pressure. The upper limit of the difference between the lowest glass transition temperature and the highest glass transition temperature is, for example, 140° C. or lower, 130° C. or lower, and 120° C. or lower.

From the viewpoint that the adhesive particle easily undergoes the phase transition due to the pressure, the lowest glass transition temperature of the adhesive particle according to the exemplary embodiment is preferably 10° C. or lower, is more preferably 0° C. or lower, and is still more preferably −10° C. or lower, and from the viewpoint of preventing the fluidization of the adhesive particle in an unpressurized state, it is preferably −90° C. or higher, is more preferably −80° C. or higher, and is still more preferably −70° C. or higher.

From the viewpoint of preventing the fluidization of the adhesive particle in an unpressurized state, the highest glass transition temperature of the adhesive particle according to the exemplary embodiment is preferably 30° C. or higher, is more preferably 40° C. or higher, and is still more preferably 50° C. or higher, and from the viewpoint of forming an adhesive particle that easily undergoes phase transition due to the pressure, it is preferably 70° C. or lower, more preferably 65° C. or lower, and is still more preferably 60° C. or lower.

In the present disclosure, the glass transition temperature of the adhesive particle is determined from a differential scanning calorimetry curve (DSC curve) obtained by performing differential scanning calorimetry (DSC). More specifically, it is determined according to "Extrapolated Glass Transition Start Temperature" described in how to determine the glass transition temperature in "Method for Measuring Glass Transition Temperature of Plastics" of JIS K7121: 1987.

The adhesive particle according to the exemplary embodiment is an adhesive particle that undergoes the phase transition due to the pressure, and satisfies Expression 1.

$$10° C. \leq T1-T2 \qquad \text{Expression 1:}$$

In Expression 1, T1 is a temperature at which the adhesive particle has a viscosity of 10,000 Pa·s under a pressure of 1

MPa, and T2 is a temperature at which the adhesive particle has a viscosity of 10,000 Pa·s under a pressure of 10 MPa.

From the viewpoint that the adhesive particle easily undergoes the phase transition due to the pressure, the temperature difference (T1−T2) is 10° C. or higher, is preferably 15° C. or higher, is more preferably 20° C. or higher, and from the viewpoint of preventing the fluidization of the adhesive particle in an unpressurized state, it is preferably 120° C. or lower, is more preferably 100° C. or lower, and is still more preferably 80° C. or lower.

The value of the temperature T1 is preferably 140° C. or lower, is more preferably 130° C. or lower, is still more preferably 120° C. or lower, and even more preferably 115° C. or lower. The lower limit of the temperature T1 is preferably 80° C. or higher, and is more preferably 85° C. or higher.

The value of the temperature T2 is preferably 40° C. or higher, is more preferably 50° C. or higher, and is still more preferably 60° C. or higher. The upper limit of the temperature T2 is preferably 85° C. or lower.

A temperature difference (T1−T3) between a temperature T1 at which the adhesive particle has a viscosity of 10,000 Pa·s under a pressure of 1 MPa and a temperature T3 at which the adhesive particle has a viscosity of 10,000 Pa·s under a pressure of 4 MPa is used as an index indicating that the adhesive particle easily undergoes the phase transition due to the pressure, and the temperature difference (T1−T3) is preferably 5° C. or higher. In the adhesive particle according to the exemplary embodiment, the temperature difference (T1−T3) is preferably 5° C. or higher, and is more preferably 10° C. or higher, from the viewpoint of easy phase transition due to the pressure.

The temperature difference (T1−T3) is generally 25° C. or lower.

In the adhesive particle according to the exemplary embodiment, from the viewpoint of adjusting the temperature difference (T1−T3) to 5° C. or higher, the temperature T3 at which the adhesive particle has a viscosity of 10,000 Pa·s under a pressure of 4 MPa is preferably 90° C. or lower, is more preferably 85° C. or lower, and is still more preferably 80° C. or lower. The lower limit of the temperature T3 is preferably 60° C. or higher.

A method for determining the temperature T1, the temperature T2, and the temperature T3 is as follows.

A pellet-like sample is produced by compressing the adhesive particle. The pellet-like sample is set in a flow tester (CFT-500, manufactured by Shimadzu Corporation), the applied pressure is fixed at 1 MPa, and the viscosity with respect to the temperature at 1 MPa is measured. From the obtained viscosity graph, the temperature T1 at which the viscosity reaches $10^4$ Pa·s at an applied pressure of 1 MPa is determined. The temperature T2 is determined in the same manner as in the method related to the temperature T1 except that the applied pressure 1 MPa is 10 MPa. The temperature T3 is determined in the same manner as in the method related to the temperature T1 except that the applied pressure 1 MPa is 4 MPa. A temperature difference (T1−T2) is calculated from the temperature T1 and the temperature T2. A temperature difference (T1−T3) is calculated from the temperature T1 and the temperature T3.

Method of a Preparing Adhesive Particle

The adhesive particle according to the exemplary embodiment may be obtained by externally adding an external additive to the adhesive mother particle after producing the adhesive mother particle.

The adhesive mother particles may be produced by using any one of a drying method (for example, a kneading and pulverizing method) and a wetting method (for example, an aggregation and coalescence method, a suspension polymerization method, and a dissolution suspension method). These methods of producing the adhesive mother particles are not particularly limited, and well-known method may be employed. Among them, it is preferable to obtain the adhesive mother particles by the aggregation and coalescence method.

In a case of producing the adhesive mother particle by using the aggregation and coalescence method, the adhesive mother particle is prepared through, for example, a process of preparing a styrene resin particle dispersion in which styrene resin particles containing a styrene resin are dispersed (styrene resin particle dispersion preparing process), a process of performing polymerization to produce a (meth) acrylate resin in a styrene resin particle dispersion, thereby forming a composite resin particle containing the styrene resin and the (meth)acrylate resin (composite resin particle formation process), a process of aggregating the composite resin particles in a composite resin particle dispersion in which the composite resin particles are dispersed to form a aggregated particle (aggregated particle formation process), and a process of coalescing the aggregated particles by heating an aggregated particle dispersion in which the aggregated particles are dispersed to form an adhesive mother particle (coalescing process).

Hereinafter, the respective processes will be described in detail.

In the following description, a method for obtaining an adhesive mother particle containing no coloring agent and release agent will be described. The coloring agent and the release agent, and other additives may be used as needed. In a case where the adhesive mother particle contains the coloring agent and the release agent, a composite resin particle dispersion, a coloring agent particle dispersion, and a release agent particle dispersion are mixed, and then the coalescing process is performed. The coloring agent particle dispersion and the release agent particle dispersion each may be prepared, for example, by mixing the raw materials and then performing a dispersion treatment using a known disperser.

Styrene Resin Particle Dispersion Preparation Process

A styrene resin particle dispersion is, for example, a dispersion in which styrene resin particles are dispersed in a dispersion medium with a surfactant.

Examples of the dispersion medium include an aqueous medium such as water and alcohols. The medium may be used alone or two or more kinds thereof may be used in combination.

Examples of the surfactant include anionic surfactants such as sulfate, sulfonate, phosphate, and soap anionic surfactants; cationic surfactants such as amine salt and quaternary ammonium salt cationic surfactants; and nonionic surfactants such as polyethylene glycol, alkyl phenol ethylene oxide adduct, and polyhydric alcohol. Nonionic surfactants may be used in combination with anionic surfactants or cationic surfactants. Among them, an anionic surfactant is preferable. The surfactants may be used alone or two or more kinds thereof may be used in combination.

Examples of the method of dispersing the styrene resin particles in the dispersion medium include a method of mixing the styrene resin and the dispersion medium, and stirring and dispersing the mixture using, for example, a rotary shearing-type homogenizer, a ball mill having media, a sand mill, or a DYNO mill.

As another method of dispersing the styrene resin particles in the dispersion medium, an emulsion polymerization method may be mentioned. Specifically, after mixing the polymerization component for the styrene resin with a chain transfer agent or a polymerization initiator, an aqueous medium containing the surfactant is further mixed therewith and stirred to prepare an emulsion, and polymerization for producing the styrene resin is performed in the emulsion. At this time, it is preferable to use dodecanethiol as the chain transfer agent.

The volume average particle diameter of the styrene resin particles dispersed in the styrene resin particle dispersion is, for example, preferably from 100 nm to 250 nm, is more preferably from 120 nm to 220 nm, and is still more preferably from 150 nm to 200 nm.

The volume average particle diameter of the resin particles contained in the resin particle dispersion is measured by a laser diffraction particle diameter distribution measuring device (for example, LA-700 manufactured by Horiba, Ltd.), and in the volume-based particle diameter distribution from the small diameter side, the particle diameter that reaches 50% in terms of cumulation is referred as a volume average particle diameter (D50v).

The content of the styrene resin particles contained in the styrene resin particle dispersion is preferably 30% by weight to 60% by weight, and is more preferably 40% by weight to 50% by weight.

Composite Resin Particle Formation Process

The styrene resin particle dispersion and the polymerization components for the (meth)acrylate resin are mixed, and polymerization is performed for producing the (meth)acrylate resin in the styrene resin particle dispersion to form a composite resin particle containing the styrene resin and the (meth)acrylate resin.

The composite resin particle is preferably a resin particle in which the styrene resin and the (meth)acrylate resin are contained in a microphase-separated state. The resin particle may be produced, for example, by the following method.

A polymerization component (a monomer group containing at least two kinds of (meth)acrylates) of the (meth) acrylate resin is added to the styrene resin particle dispersion, and an aqueous medium is added as needed. Next, while slowly stirring the dispersion, the temperature of the dispersion is heated to a temperature equal to or higher than the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and stirring is continued for a long time, specifically, from 1 hour to 15 hours. At this time, it is preferable to use ammonium persulfate as a polymerization initiator.

Although the detailed mechanism is not necessarily clear, in a case where the above method is employed, it is presumed that the monomer and the polymerization initiator are impregnated in the styrene resin particle, and the (meth) acrylate is polymerized inside the styrene resin particle. As a result, it is presumed that a composite resin particle is obtained, in which the (meth)acrylate resin is contained inside the styrene resin particle, and the styrene resin and the (meth)acrylate resin are in a microphase-separated state inside the particle.

During or after the production of the above composite resin particles, the polymerization components (that is, styrene and other vinyl monomers) of the styrene resin may be added to the dispersion in which the composite resin particles are dispersed to continue the polymerization reaction. As a result, it is presumed that the styrene resin and the (meth)acrylate resin are in a microphase-separated state inside the particle, and a composite resin particle in which a styrene resin is attached to the particle surface is obtained. The adhesive particle produced by using the composite resin particle in which the styrene resin is attached to the surface of the particle has relatively little generation of coarse powder.

Other vinyl monomers that are the polymerization components of the styrene resin attached to the surface of the composite resin particle preferably include the same kind of monomer as at least one of monomers constituting the styrene resin or (meth)acrylate resin that is present inside the composite resin particle, and specifically, it is preferable to contain at least one of n-butyl acrylate and 2-ethyl hexyl acrylate.

The volume average particle diameter of the composite resin particles dispersed in the composite resin particle dispersion is preferably 140 nm to 300 nm, is more preferably 150 nm to 280 nm, and is still more preferably 160 nm to 250 nm.

The content of the composite resin particles contained in the composite resin particle dispersion is preferably from 20% by weight to 50% by weight, and is more preferably from 30% by weight to 40% by weight.

Aggregated Particle Formation Process

The composite resin particles are aggregated in the composite resin particle dispersion to form an aggregated particle having a diameter close to the diameter of the target adhesive mother particle.

Specifically, for example, an aggregating agent is added to the composite resin particle dispersion and a pH of the composite resin particle dispersion is adjusted to be acidic (for example, the pH is 2 to 5). A dispersion stabilizer is added as needed. Then, the mixed dispersion is heated at a temperature of a glass transition temperature of the styrene resin (specifically, for example, from glass transition temperature of the styrene resin −30° C. to glass transition temperature of the styrene resin −10° C.) to aggregate the composite resin particles, thereby forming an aggregated particle.

In the aggregated particle formation process, for example, the aggregating agent may be added at room temperature (for example, 25° C.) while stirring the composite resin particle dispersion with a rotary shearing-type homogenizer, the pH of the composite resin particle dispersion may be adjusted to be acidic (for example, the pH is from 2 to 5), a dispersion stabilizer may be added if necessary, and then the heating may be performed.

Examples of the aggregating agent include a surfactant having an opposite polarity to the polarity of the surfactant contained in the composite resin particle dispersion, an inorganic metal salt, a divalent or more metal complex. When a metal complex is used as the aggregating agent, the use amount of the surfactant is reduced and charging properties are improved.

Along with the aggregating agent, an additive for forming a complex together with a metal ion of the aggregating agent or a similar bond thereto may be used, as needed. A chelating agent is suitably used as such an additive.

Examples of the inorganic metal salt include metal salt such as calcium chloride, calcium nitrate, barium chloride, magnesium chloride, zinc chloride, aluminum chloride, and aluminum sulfate, and an inorganic metal salt polymer such as poly aluminum chloride, poly aluminum hydroxide, and calcium polysulfide.

As the chelating agent, a water-soluble chelating agent may be used. Examples of the chelating agent include oxycarboxylic acid such as tartaric acid, citric acid, and gluconic acid; and aminocarboxylic acid such as iminodiacetic acid (IDA), nitrilotriacetic acid (NTA), and ethylenediaminetetraacetic acid (EDTA).

The addition amount of the chelating agent is, for example, preferably 0.01 parts by weight to 5.0 parts by weight, and is more preferably 0.1 parts by weight or greater and less than 3.0 parts by weight, with respect to 100 parts by weight of resin particle.

Coalescence Process

Next, the aggregated particle dispersion in which the aggregated particles are dispersed is heated at, for example, a temperature that is equal to or higher than the glass transition temperature of the styrene resin (for example, a temperature that is higher than the glass transition temperature of the styrene resin by 10° C. to 30° C.) to coalesce the aggregated particles, thereby forming adhesive mother particles.

The obtained adhesive mother particle through the above processes generally has a sea-island structure composed of a sea phase containing a styrene resin and an island phase containing a (meth)acrylate resin dispersed in the sea phase. In the composite resin particles, when the styrene resin and the (meth)acrylate resin are in a microphase separation state, it is presumed that in the coalescence process, the styrene resins gather together to form the sea phase and the (meth)acrylate resins gather together to form the island phase.

The average diameter of the island phase of the sea-island structure may be controlled by, for example, increasing or decreasing the amount of the styrene resin particle dispersion or the amount of at least two (meth)acrylates used in the composite resin particle formation process, or by increasing or decreasing the time for keeping the high temperature in the coalescence process.

The adhesive mother particle having a core-shell structure may be obtained through, for example, a process of forming a second aggregated particle, which includes preparing an aggregated particle dispersion, mixing the aggregated particle dispersion and the styrene resin particle dispersion, and performing aggregation so as to cause the styrene resin particle to attach on the surface of the aggregated particle, and a process of forming the adhesive mother particle having a core-shell structure, which includes heating a second aggregated particle dispersion in which the second aggregated particles are dispersed to coalesce the second aggregated particles.

The adhesive mother particle having a core-shell structure obtained through the above processes has a shell layer containing a styrene resin. A shell layer containing other kind of resin may be formed by using a resin particle dispersion in which other kinds of resin particles are dispersed instead of the styrene resin particle dispersion.

Here, after the coalescence process ends, the adhesive mother particles formed in the solution are subjected to a washing process, a solid-liquid separation process, and a drying process, that are well known, and thus dry adhesive mother particles are obtained. In the washing process, it is preferable that displacement washing with ion-exchanged water may be sufficiently performed from the viewpoint of charging properties. In addition, the solid-liquid separation process is not particularly limited, and suction filtration, pressure filtration, or the like may be performed from the viewpoint of productivity. In the drying process, freeze drying, airflow drying, fluidized drying, vibration-type fluidized drying, or the like may be performed from the viewpoint of the productivity.

The adhesive particle according to the exemplary embodiment is produced, for example, by adding an external additive to the obtained adhesive mother particles in the dry state and mixing them. The mixing may be performed by using, for example, a V blender, a HENSCHEL mixer, a LOEDIGE mixer, or the like. Furthermore, as needed, coarse particles of the adhesive particle may be removed by using a vibration sieving machine, a wind classifier, or the like.

Cartridge

A cartridge according to the exemplary embodiment stores the adhesive particles according to the exemplary embodiment and is detachable from the apparatus of producing a printed matter. When the cartridge is mounted on the apparatus of producing a printed matter, the cartridge and an arrangement unit that is provided in the apparatus of producing the printed matter and arranges the adhesive particles onto the recording medium are connected via a supply pipe.

When the adhesive particle is supplied from the cartridge to the arrangement unit and the adhesive particle stored in the cartridge become small, the cartridge is replaced.

Apparatus of Producing Printed Matter and Method of Producing Printed Matter

An apparatus of producing a printed matter according to the exemplary embodiment includes an arrangement unit that stores adhesive particles according to the exemplary embodiment and arranges the adhesive particles onto a recording medium; and a pressure-bonding unit that folds and pressure-bonds the recording medium, or stacks and pressure-bonds the recording medium and another recording medium.

The arrangement unit may include, for example, an applying device that applies the adhesive particles onto the recording medium, and further, a fixing device that fixes the adhesive particles applied onto the recording medium onto the recording medium.

The pressure-bonding unit is provided with, for example, a folding device that folds the recording medium on which the adhesive particles are arranged, a stacking device that stacks a recording medium on which the adhesive particles are arranged and another recording medium, and a pressure device that pressurizes the stacked recording media.

The pressure device provided in the pressure-bonding unit applies pressure to the recording medium on which the adhesive particles are arranged. As a result, the adhesive particle is fluidized on the recording medium and thus exhibits the adhesion.

The apparatus of producing the printed matter according to the exemplary embodiment implements the method of producing a printed matter according to the exemplary embodiment. A method of producing a printed matter according to the exemplary embodiment includes an arrangement process of using the adhesive particles according to the exemplary embodiment, and arranging the adhesive particles onto a recording medium; and a pressure-bonding process of folding and pressure-bonding the recording medium, or stacking and pressure-bonding the recording medium and another recording medium.

The arrangement process may include, for example, a process of applying the adhesive particles onto the recording medium, and further, a process of fixing the adhesive particles applied onto the recording medium onto the recording medium.

The pressure-bonding process is provided with, for example, a folding process of folding the recording medium or a stacking process of stacking the recording medium and another recording medium, and a pressure process of pressurizing the stacked recording medium.

The adhesive particles according to the exemplary embodiment may be arranged on the entire surface of the recording medium or may be arranged on a part of the recording medium. The adhesive particles according to the exemplary embodiment are arranged in one or plural layers on the recording medium. A layer of the adhesive particles according to the exemplary embodiment may be a layer that is continuous in the surface direction of the recording medium, or may be a layer that is discontinuous in the surface direction of the recording medium. The layer of the adhesive particles according to the exemplary embodiment may be a layer in which the adhesive particles are arranged as particles, or may be a layer in which the adjacent adhesive particles are coalesced and arranged.

The amount of the adhesive particles (preferable transparent adhesive particles) on a recording medium in the arranged region is, for example, from 0.5 g/m² to 50 g/m², from 1 g/m² to 40 g/m², and from 1.5 g/m² to 30 g/m². The layer thickness of the adhesive particle (preferably transparent adhesive particle) on the recording medium is, for example, from 0.2 µm to 25 µm, from 0.4 µm to 20 µm, and from 0.6 µm to 15 µm.

Examples of the recording medium applied to the apparatus of producing a printed matter according to the exemplary embodiment include paper, coated paper whose surface is coated with a resin, cloth, nonwoven fabric, a resin film, and a resin sheet. The recording medium may have an image on one side or both sides.

Hereinafter, an example of the apparatus of producing a printed matter according to the exemplary embodiment will be described. However, the exemplary embodiment is not limited thereto.

FIG. 1 is a schematic configuration diagram illustrating an example of an apparatus of producing a printed matter according to the exemplary embodiment. The apparatus of producing a printed matter as illustrated in FIG. 1 includes an arrangement unit 100 and a pressure-bonding unit 200 disposed downstream of the arrangement unit 100. An arrow indicates a transport direction of the recording medium.

The arrangement unit 100 is a device that arranges the adhesive particles on the recording medium P, and as the adhesive particles, the adhesive particles according to the exemplary embodiment are used. On the recording medium P, an image is formed in advance on one side or both sides.

The arrangement unit 100 is provided with an applying device 110 and a fixing device 120 disposed downstream of the applying device 110.

The applying device 110 applies the adhesive particle M onto the recording medium P. Examples of the applying method adopted by the applying device 110 include a spray method, a bar coating method, a die coating method, a knife coating method, a roll coating method, a reverse roll coating method, a gravure coating method, a screen printing method, an inkjet method, a laminating method, and an electrophotographic method. Depending on the applying method, the adhesive particles M may be dispersed in a dispersion medium to prepare a liquid composition, and the liquid composition may be applied to the applying device 110.

The recording medium P to which the adhesive particles M have been applied by the applying device 110 is transported to the fixing device 120.

Examples of the fixing device 120 include a heating device having a heating source for heating the adhesive particles M on the recording medium P passing therethrough and fixing the adhesive particles M onto the recording medium P; a pressure device that includes a pair of pressure members (roll/roll, belt/roll) and pressurizes the recording medium P passing therethrough to fix the adhesive particles M onto the recording medium P; a pressure and heating device that includes a pair of pressure members (roll/roll, belt/roll) internally provided with a heating source, pressurizes and heats the recording medium P passing therethrough, and fixes the adhesive particles M onto the recording medium P.

In a case where the fixing device 120 has the heating source, a surface temperature of the recording medium P when heated by the fixing device 120 is preferably from 10° C. to 80° C., more preferably from 20° C. to 60° C., and still more preferably from 30° C. to 50° C.

In a case where the fixing device 120 has the pressure members, the pressure applied to the recording medium P by the pressure member may be lower than the pressure applied to the recording medium P2 by the pressure device 230.

The recording medium P passes through the arrangement unit 100 to become a recording medium P1 in which the adhesive particle M is applied on the image. The recording medium P1 is transported toward the pressure-bonding unit 200.

In the apparatus of producing a printed matter according to the exemplary embodiment, the arrangement unit 100 and the pressure-bonding unit 200 may be close to each other or may be separated from each other. In a case where the arrangement unit 100 and the pressure-bonding unit 200 are separated from each other, the arrangement unit 100 and the pressure-bonding unit 200 are connected by, for example, a transporting unit (for example, a belt conveyor) that transports the recording medium P1.

The pressure-bonding unit 200 includes a folding device 220 and a pressure device 230, and is a unit that folds and pressure-bonds the recording medium P.

The folding device 220 folds the recording medium P1 passing through the device to produce a folded recording medium P2. For example, the recording medium P2 may be folded in two, three, or four, and only a part of the recording medium P2 may be folded. The recording medium P2 is in a state in which the adhesive particle M is disposed on at least a part of at least one of the two opposing surfaces.

The folding device 220 may have a pair of pressure members (for example, roll/roll, belt/roll) that apply pressure to the recording medium P2. The pressure applied to the recording medium P2 by the pressure member of the folding device 220 may be lower than the pressure applied to the recording medium P2 by the pressure device 230.

The pressure-bonding unit 200 may include a stacking device that stacks the recording medium P1 and another recording medium, instead of the folding device 220. The form of overlap of the recording medium P1 and another recording medium is, for example, a form in which another recording medium is overlapped on the recording medium P1, or a form in which another recording medium is overlapped each at a plurality of locations on the recording medium P1. Another recording medium may be a recording medium on which an image is formed in advance on one side or both sides, a recording medium on which an image is not formed, or a pressure-bonded printed matter produced in advance.

The recording medium P2 out from the folding device 220 (or the stacking device) is transported toward the pressure device 230.

The pressure device 230 includes a pair of pressure members (that is, pressure rolls 231 and 232). The pressure roll 231 and the pressure roll 232 are in contact with each other on the outer peripheral surface and pressed against each other, and apply the pressure to the recording medium P2 passing therethrough. A pair of pressure members included in the pressure device 230 is not limited to a combination of a pressure roll and a pressure roll, and may be a combination of a pressure roll and a pressure belt, or a combination of a pressure belt and a pressure belt.

When the pressure is applied to the recording medium P2 that passes through the pressure device 230, the adhesive particle M is fluidized on the recording medium P2 due to the pressure and exhibits the adhesion.

The pressure device 230 may or may not have a heating source (for example, a halogen heater) for heating the recording medium P2 inside. Note that the fact that the pressure device 230 does not have a heating source does not exclude that the temperature in the pressure device 230 becomes the environmental temperature or higher due to the heat generated by a motor or the like provided in the pressure device 230.

When the recording medium P2 passes through the pressure device 230, the folded surfaces are bonded to each other by the fluidized adhesive particle M, and thereby a pressure-bonded printed matter P3 is produced. The pressure-bonded printed matter P3 has a part or all of the opposing two surfaces bonded together.

The completed pressure-bonded printed matter P3 is unloaded from the pressure device 230.

The first form of the pressure-bonded printed matter P3 is a pressure-bonded printed matter in which the folded recording medium is bonded to the opposing surface with the adhesive particle M. The pressure-bonded printed matter P3 of the exemplary embodiment is produced by an apparatus of producing a printed matter which includes the folding device 220.

The second form of the pressure-bonded printed matter P3 is a pressure-bonded printed matter in which a plurality of stacked recording media are bonded to the opposing surface with the adhesive particle M. The pressure-bonded printed matter P3 of the exemplary embodiment is produced by an apparatus of producing a pressure-bonded printed matter which includes a stacking device.

The apparatus of producing a printed matter according to the exemplary embodiment is not limited to an apparatus that continuously transports the recording medium P2 from the folding device 220 (or the stacking device) to the pressure device 230. The apparatus of producing a printed matter according to the exemplary embodiment may be an apparatus that stores the recording medium P2 out from the folding device 220 (or the stacking device), and transports the recording medium P2 to the pressure device 230 after the storage amount of the recording medium P2 reaches a predetermined amount.

In the apparatus of producing a printed matter according to the exemplary embodiment, the folding device 220 (or the stacking device) and the pressure device 230 may be close to each other or may be separated from each other. In a case where the folding device 220 (or the stacking device) and the pressure device 230 are separated from each other, the folding device 220 (or the stacking device) and the pressure device 230 are connected by, for example, a transporting unit (for example, a belt conveyor) that transports the recording medium P2.

The apparatus of producing a printed matter according to the exemplary embodiment may include a cutting unit that cuts the recording medium into a predetermined size. Examples of the cutting unit include a cutting unit that is disposed between the arrangement unit 100 and the pressure-bonding unit 200 and cuts off a region which is a part of the recording medium P1 and in which the adhesive particles M are not arranged; a cutting unit that is disposed between the folding device 220 and the pressure device 230 and cuts off a region which is a part of the recording medium P2 and in which the adhesive particles M are not arranged; and a cutting unit that is disposed downstream of the pressure-bonding unit 200 and cuts off a region which is a part of the pressure-bonded printed matter P3 and is not bonded by the adhesive particle M.

The apparatus of producing a printed matter according to the exemplary embodiment is not limited to a single-wafer type apparatus. The apparatus of producing a printed matter according to the exemplary embodiment may be an apparatus that forms a long pressure-bonded printed matter through the arrangement process and pressure-bonding process on a long recording medium, and then cuts the long pressure-bonded printed matter into a predetermined size.

The apparatus of producing a printed matter according to the exemplary embodiment may further include a color image forming unit that forms a color image on a recording medium by using a coloring material. Examples of the color image forming unit include a unit that forms a colored ink image on a recording medium by an inkjet method with a colored ink as a coloring material, and a unit that forms a color image on the recording medium by an electrophotographic system with a colored electrostatic charge image developer.

The method of producing a printed matter according to the exemplary embodiment by the production apparatus having the above-described configuration further includes a color image formation process of forming a color image on a recording medium by using a coloring material. Examples of the color image formation process include a process of forming a colored ink image on a recording medium by an inkjet method with a colored ink as a coloring material, and a process of forming a color image on the recording medium by an electrophotographic system with a colored electrostatic charge image developer.

Sheet for Producing Printed Matter and Method of Producing Sheet for Producing Printed Matter A sheet for producing a printed matter according to the exemplary embodiment includes a base material and adhesive particles arranged on the base material. The sheet for producing a printed matter according to the exemplary embodiment is produced by using the adhesive particle according to the exemplary embodiment. The adhesive particles on the base material may or may not retain the particle shape before being arranged on the base material.

The sheet for producing a printed matter according to the exemplary embodiment is applied to, for example, a masking sheet that is stacked and attached to the recording medium in a case where the information recorded on the recording medium is kept confidential; and a release sheet used for providing an adhesive layer on the recording medium when the recording media are stacked and bonded to each other.

Examples of the base material applied to the sheet for producing a printed matter according to the exemplary embodiment include paper, coated paper whose surface is coated with a resin, cloth, nonwoven fabric, a resin film, and a resin sheet. On the base material, an image may be formed on one side or both sides.

In the sheet for producing a printed matter according to the exemplary embodiment, the adhesive particles may be arranged on the entire surface of the base material, or may be arranged on a part of the base material. The adhesive particles according to the exemplary embodiment are arranged in one or plural layers on the base material. A layer of the adhesive particles according to the exemplary embodiment may be a layer that is continuous in the surface direction of the base material, or may be a layer that is discontinuous in the surface direction of the base material. The layer of the adhesive particles according to the exemplary embodiment may be a layer in which the adhesive particles are arranged as particles, or may be a layer in which the adjacent adhesive particles are coalesced and arranged.

The amount of the adhesive particles on the base material in the arranged region is, for example, from 0.5 g/m$^2$ to 50 g/m$^2$, from 1 g/m$^2$ to 40 g/m$^2$, and from 1.5 g/m$^2$ to 30 g/m$^2$. The layer thickness of the adhesive particle on the base material is, for example, from 0.2 μm to 25 μm, from 0.4 μm to 20 μm, and from 0.6 μm to 15 μm.

The sheet for producing a printed matter according to the exemplary embodiment is produced by, for example, a producing method including an arrangement process of using the adhesive particle according to the exemplary embodiment and arranging the adhesive particles on the base material.

The arrangement process may include, for example, an applying process of applying the adhesive particles onto the base material, and further, a fixing process of fixing the adhesive particles applied onto the base material onto the base material.

The applying process is realized by applying methods such as a spray method, a bar coating method, a die coating method, a knife coating method, a roll coating method, a reverse roll coating method, a gravure coating method, a screen printing method, an inkjet method, a laminating method, and an electrophotographic method. Depending on the applying method for the applying process, the adhesive particles may be dispersed in a dispersion medium to prepare a liquid composition, and the liquid composition may be applied to the applying process.

Examples of the fixing process include a heating process of heating the adhesive particle on the base material with a heating source and fixing the adhesive particle on the base material; a pressure process of pressurizing the base material to which the adhesive particle is applied with a pair of pressure members (roll/roll, belt/roll) to fix the adhesive particle onto the base material; and a pressure and heating process of pressurizing and heating the base material to which the adhesive particle is applied with a pair of pressure members (roll/roll, belt/roll) having a heating source inside to fix the adhesive particle on the base material.

Production of Printed Matter by Electrophotographic System

Examples of applying the adhesive particle according to the exemplary embodiment by the electrophotographic system will be described. In the electrophotographic system, the adhesive particle may be used as a toner.

The adhesive particle according to the exemplary embodiment may be used as an electrostatic charge image developer. The electrostatic charge image developer according to the exemplary embodiment may be a one-component developer containing only the adhesive particle according to the exemplary embodiment, or may be a two-component developer in which the adhesive particle of the exemplary embodiment and a carrier are mixed with each other.

The carrier is not particularly limited, and a well-known carrier may be used. Examples of the carrier include a coating carrier in which the surface of the core formed of magnetic particle is coated with a resin; a magnetic particle dispersion-type carrier in which the magnetic particles are dispersed and distributed in the matrix resin; and a resin impregnated-type carrier in which the porous magnetic particles are impregnated with a resin. Note that, the magnetic particle dispersion-type carrier and the resin impregnated-type carrier may be carriers in which the constitutional particle of the carrier is a core and the core is coated with a resin.

Examples of the magnetic particle include a magnetic metal such as iron, nickel, and cobalt, and a magnetic oxide such as ferrite, and magnetite.

Examples of the coating resin and the matrix resin include a straight silicone resin formed by containing polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, and an organosiloxane bond, or the modified products thereof, a fluororesin, polyester, polycarbonate, a phenol resin, and an epoxy resin. The coating resin and the matrix resin may contain other additives such as conductive particles. Examples of the conductive particle include particles such as particles formed of metal such as gold, silver and copper, carbon black, titanium oxide, zinc oxide, tin oxide, barium sulfate, aluminum borate, or potassium titanate.

Here, in order to coat the surface of the core with the resin, a method of coating the surface with a coating layer-forming solution in which a resin for coating, and various additives are dissolved as needed in a proper solvent is used. The solvent is not particularly limited as long as a solvent is selected in consideration of a resin to be used and coating suitability.

Specific examples of the resin coating method include a dipping method of dipping the core into the coating layer-forming solution, a spray method of spraying the coating layer-forming solution onto the surface of the core, a fluid-bed method of spraying the coating layer-forming solution to the core in a state of being floated by the fluid air, and a kneader coating method of mixing the core of the carrier with the coating layer-forming solution and removing a solvent in the kneader coater.

The mixing ratio (weight ratio) of the adhesive particle to the carrier in the two-component developer is preferably adhesive particle:carrier=1:100 to 30:100, and is more preferably 3:100 to 20:100.

An electrographic apparatus of producing a printed matter according to the exemplary embodiment includes an arrangement unit that stores an adhesive particle according to the exemplary embodiment, and arranges the adhesive particle on a recording medium; and a pressure-bonding unit that folds and pressure-bonds the recording medium, or stacks and pressure-bonds the recording medium and another recording medium.

The apparatus of producing the printed matter according to the exemplary embodiment implements the method of producing a printed matter according to the exemplary embodiment.

The method of producing a printed matter according to the exemplary embodiment includes an arrangement process of arranging the adhesive particle on a recording medium by a powder supplying system with an adhesive particle according to the exemplary embodiment or an electrophotographic system with a developer containing the adhesive particle according to the exemplary embodiment, and a pressure-bonding process of folding and pressure-bonding the recording medium or stacking and pressure-bonding the recording medium and another recording medium.

The arrangement unit using a powder supplying system, included in the apparatus of producing a printed matter according to the exemplary embodiment is provided with, for example, a container containing the adhesive particle and an applicating unit.

The arrangement unit using an electrophotographic system, included in the apparatus of producing a printed matter according to the exemplary embodiment is provided with, for example, a photoreceptor, a charging unit that charges the surface of the photoreceptor, an electrostatic charge image forming unit that forms an electrostatic charge image on the charged surface of the photoreceptor, a developing unit that stores an electrostatic charge image developer according to the exemplary embodiment, and develops the electrostatic charge image formed on the surface of the photoreceptor as an adhesive particle area with the electrostatic charge image developer, and a transfer unit that transfers the adhesive particle area formed on the surface of the photoreceptor to a surface of the recording medium.

It is preferable that the arrangement unit further includes a fixing unit that fixes the adhesive particle image transferred to the surface of the recording medium.

The arrangement process included in the method of producing a printed matter according to the exemplary embodiment includes, for example, an applicating process of forming an adhesive particle area on the recording medium using an applicating unit.

Next arrangement process included in the method of producing a printed matter according to the exemplary embodiment includes, for example, a charging process of charging the surface of the photoreceptor, an electrostatic charge image forming process of forming an electrostatic charge image on the charged surface of the photoreceptor, a developing process of containing an electrostatic charge image developer according to the exemplary embodiment, and developing the electrostatic charge image formed on the surface of the photoreceptor as an adhesive particle area with the electrostatic charge image developer, and a transfer process of transferring the adhesive particle area formed on the surface of the photoreceptor to a surface of the recording medium.

It is preferable that the arrangement process further includes a fixing process of fixing the adhesive particle area transferred to the surface of the recording medium.

The arrangement unit example is a device such as a direct-transfer type device that directly transfers the adhesive particle area formed on the surface of the photoreceptor to the recording medium; an intermediate transfer type device that primarily transfers the adhesive particle area formed on the surface of the photoreceptor to a surface of an intermediate transfer member, and secondarily transfers the adhesive particle area transferred to the surface of the intermediate transfer member to the surface of the recording medium; a device including a cleaning unit that cleans the surface of the photoreceptor before being charged and after transferring the adhesive particle area; and a device including an erasing unit that erases charges by irradiating the surface of the photoreceptor with erasing light before being charged and after transferring the adhesive particle area. In a case where the arrangement unit is the intermediate transfer type device, the transfer unit includes an intermediate transfer member that transfers the adhesive particle area to the surface, a first transfer unit that primarily transfers the adhesive particle area formed on the surface of the photoreceptor to the surface of the intermediate transfer member, and a second transfer unit that secondarily transfers the adhesive particle area formed on the surface of the intermediate transfer member to the surface of the recording medium.

The arrangement unit may have a cartridge structure (so-called process cartridge) in which a portion including the developing unit is detachable from the arrangement unit. As a process cartridge, for example, a process cartridge including the developing unit that stores the electrostatic charge image developer according to the exemplary embodiment is preferably used.

The pressure-bonding unit included in the apparatus of producing a printed matter according to the exemplary embodiment applies pressure to the recording medium on which the adhesive particles according to the exemplary embodiment are arranged. As a result, the adhesive particle according to the exemplary embodiment is fluidized on the recording medium and thus exhibits the adhesion. The pressure applied by the pressure-bonding unit to the recording medium for the purpose of fluidizing the adhesive particle according to the exemplary embodiment is preferably 3 MPa to 300 MPa, is more preferably 10 MPa to 200 MPa, and is still more preferably 30 MPa to 150 MPa.

The adhesive particle according to the exemplary embodiment may be arranged on the entire surface of the recording medium or may be arranged on a part of the recording medium. The adhesive particle according to the exemplary embodiment is arranged in one or plural layers on the recording medium. A of the adhesive particle according to the exemplary embodiment may be a layer that is continuous in the surface direction of the recording medium, or may be a layer that is discontinuous in the surface direction of the recording medium. The layer of the adhesive particle layer according to the exemplary embodiment may be a layer in which adhesive particles are arranged as particles, or may be a layer in which adjacent adhesive particles are coalesced and arranged.

The amount of adhesive particle (preferably transparent adhesive particle) according to the exemplary embodiment on the recording medium is, for example, 0.5 $g/m^2$ to 50 $g/m^2$, and 1 $g/m^2$ to 40 $g/m^2$, and 1.5 $g/m^2$ to 30 $g/m^2$ in the arranged region. The layer thickness of the adhesive particle (preferably transparent adhesive particle) according to the exemplary embodiment on the recording medium is, for example, 0.2 μm to 25 μm, 0.4 μm to 20 μm, and 0.6 μm to 15 μm.

Examples of the recording medium applicable to the apparatus of producing a printed matter according to the exemplary embodiment include paper, coated paper whose surface is coated with a resin, cloth, nonwoven fabric, a resin film, and a resin sheet. The recording medium may have an image on one side or both sides.

Hereinafter, an example of the apparatus of producing a printed matter according to the exemplary embodiment will be described. However, the exemplary embodiment is not limited thereto.

Figure 2:
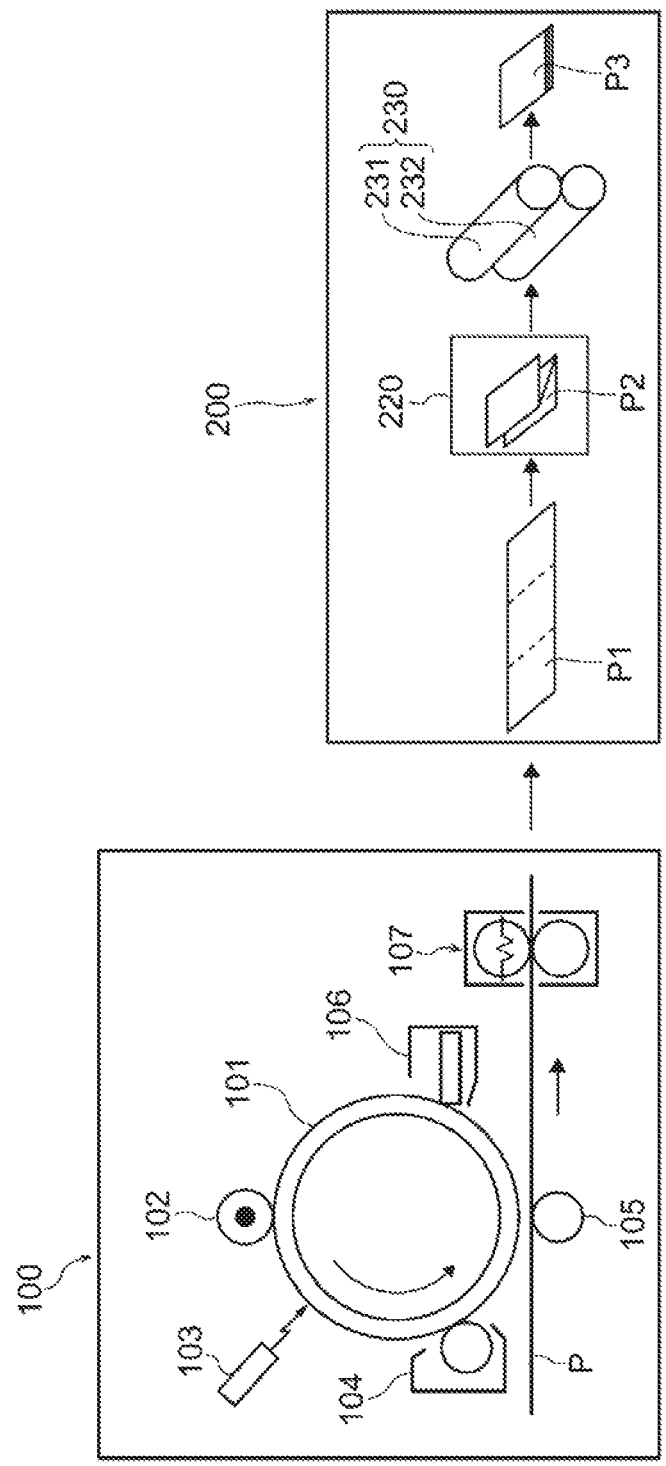
FIG. 2 is a schematic diagram illustrating another example of an apparatus of producing a printed matter according to the exemplary embodiment.

FIG. 2 is a schematic configuration diagram illustrating an example of an apparatus of producing a printed matter according to the exemplary embodiment. The apparatus of producing a printed matter as illustrated in FIG. 2 includes an arrangement unit 100 and a pressure-bonding unit 200 disposed downstream of the arrangement unit 100. An arrow indicates the rotational direction of the photoreceptor or the transport direction of the recording medium.

The arrangement unit 100 is a direct-transfer type device that arranges the adhesive particle according to the exemplary embodiment on a recording medium P by an electrophotographic system with a developer containing the adhesive particle according to the exemplary embodiment. On the recording medium P, an image is formed in advance on one side or both sides.

The arrangement unit 100 includes a photoreceptor 101. Around the photoreceptor 101, a charging roll (an example of the charging unit) 102 that charges the surface of the photoreceptor 101, an exposure device (an example of the electrostatic charge image formation unit) 103 that forms an electrostatic charge image by exposing the charged photoreceptor surface with a laser beam, a developing device (an example of the developing unit) 104 that develops an electrostatic charge image by supplying adhesive particle to the electrostatic charge image, a transfer roll 105 (an example of a transfer unit) that transfers the developed adhesive particle area onto the recording medium P, and a photoreceptor cleaning device (an example of the cleaning unit) 106 that removes the adhesive particle remaining on the surface of the photoreceptor 101 after the transfer are arranged in order.

An operation in which the arrangement unit 100 arranges the adhesive particle according to the exemplary embodiment on the recording medium P will be described.

First, the surface of the photoreceptor 101 is charged by the charging roll 102. The exposure device 103 irradiates the surface of the charged photoreceptor 101 with a laser beam in accordance with image data sent from a control unit (not shown). As a result, an electrostatic charge image having an arrangement pattern of the adhesive particle according to the exemplary embodiment is formed on the surface of the photoreceptor 101.

The electrostatic charge image formed on the photoreceptor 101 rotates to a development position as the photoreceptor 101 travels. Then, at the development position, the electrostatic charge image on the photoreceptor 101 is developed and visualized by the developing device 104 to become an adhesive particle area.

In the developing device 104, for example, a developer storing at least the adhesive particle according to the exemplary embodiment and a carrier is contained. The adhesive particle according to the exemplary embodiment is frictionally charged by being stirred together with the carrier in the developing device 104 and is held on the developer roll. As the surface of the photoreceptor 101 passes through the developing device 104, the adhesive particle is electrostatically attached to the electrostatic charge image on the surface of the photoreceptor 101, so that the electrostatic charge image is developed with the adhesive particle. The photoreceptor 101 on which the adhesive particle area of the adhesive particle is formed continues to travel, and the adhesive particle area developed on the photoreceptor 101 is transported to the transfer position.

When the adhesive particle area on the photoreceptor 101 is transported to the transfer position, the transfer bias is applied to the transfer roll 105, the electrostatic force from the photoreceptor 101 toward the transfer roll 105 acts on the adhesive particle area, and the adhesive particle area on the photoreceptor 101 is transferred onto the recording medium P.

The adhesive particle remaining on the photoreceptor 101 is removed and collected by a photoreceptor cleaning device 106. The photoreceptor cleaning device 106 is, for example, a cleaning blade, a cleaning brush, or the like. The photoreceptor cleaning device 106 is preferably a cleaning brush from the viewpoint of preventing the phenomenon in which the adhesive particle according to the exemplary embodiment remaining on the surface of the photoreceptor fluidizes due to the pressure and attached to the surface of the photoreceptor in a film form.

The recording medium P onto which the adhesive particle area is transferred is transported to a fixing device (an example of a fixing unit) 107. The fixing device 107 is, for example, a pair of fixing members (roll/roll, belt/roll). The arrangement unit 100 may not include the fixing device 107, but it is preferable to include the fixing device 107 from the viewpoint of preventing the adhesive particle according to the exemplary embodiment from dropping off from the recording medium P. The pressure applied to the recording medium P by the fixing device 107 may be lower than the pressure applied to a recording medium P2 by a pressure device 230. Specifically, the pressure is preferably 0.2 MPa to 1 MPa.

The fixing device 107 may or may not have a heating source (for example, a halogen heater) for heating the recording medium P inside. In a case where the fixing device 107 has the heating source therein, the surface temperature of the recording medium P when heated by the heating source is preferably 150° C. to 220° C., is more preferably 155° C. to 210° C., and is still more preferably 160° C. to 200° C. Note that the fact that the fixing device 107 does not have a heating source does not exclude that the temperature in the fixing device 107 becomes the environmental temperature or higher due to the heat generated by a motor or the like provided in the arrangement unit 100.

The recording medium P becomes a recording medium P1 in which the adhesive particle according to the exemplary embodiment is applied on the image by passing through the arrangement unit 100. The recording medium P1 is transported toward the pressure-bonding unit 200.

In the apparatus of producing a printed matter according to the exemplary embodiment, the arrangement unit 100 and the pressure-bonding unit 200 may be close to each other or may be separated from each other. In a case where the arrangement unit 100 and the pressure-bonding unit 200 are separated from each other, the arrangement unit 100 and the pressure-bonding unit 200 are connected by, for example, a transporting unit (for example, a belt conveyor) that transports the recording medium P1.

The pressure-bonding unit 200 includes a folding device 220 and a pressure device 230, and is a unit that folds and pressure-bonds the recording medium P1.

The folding device 220 folds the recording medium P1 passing through the device to produce a folded recording medium P2. For example, the recording medium P2 may be folded in two, three, or four, and only a part of the recording medium P2 may be folded. The recording medium P2 is in a state in which the adhesive particle according to the exemplary embodiment is disposed on at least a part of at least one of the two facing surfaces.

The folding device 220 may have a pair of pressure members (for example, roll/roll, belt/roll) that apply pressure to the recording medium P2. The pressure applied to the recording medium P2 by the pressure member of the folding device 220 may be lower than the pressure applied to a recording medium P2 by a pressure device 230. Specifically, the pressure is preferably 1 MPa to 10 MPa.

The pressure-bonding unit 200 may include a stacking device that stacks the recording medium P1 and another recording medium, instead of the folding device 220. The form of overlap between the recording medium P1 and another recording medium is, for example, a form in which another recording medium is overlapped on the recording medium P1, or a form in which another recording medium is stacked each at a plurality of locations on the recording medium P1. Another recording medium may be a recording medium on which an image is formed in advance on one side or both sides, a recording medium on which an image is not formed, or a pressure-bonded printed matter produced in advance.

The recording medium P2 out from the folding device 220 (or the stacking device) is transported toward the pressure device 230.

The pressure device 230 includes a pair of pressure members (that is, pressure rolls 231 and 232). The pressure roll 231 and the pressure roll 232 are in contact with each other on the outer peripheral surface and pressed against each other, and apply the pressure to the recording medium P2 passing therethrough. A pair of pressure members included in the pressure device 230 is not limited to a combination of a pressure roll and a pressure roll, and may be a combination of a pressure roll and a pressure belt, or a combination of a pressure belt and a pressure belt.

When the pressure is applied to the recording medium P2 that passes through the pressure device 230, the adhesive particle according to the exemplary embodiment is fluidized on the recording medium P2 due to the pressure and exhibits the adhesion. The pressure applied to the recording medium P2 by the pressure device 230 is preferably 3 MPa to 300 MPa, is more preferably 10 MPa to 200 MPa, and is still more preferably 30 MPa to 150 MPa.

The pressure device 230 may or may not have a heating source (for example, a halogen heater) for heating the recording medium P2 inside. In a case where the pressure device 230 has the heating source therein, the surface temperature of the recording medium P2 when heated by the heating source is preferably 30° C. to 120° C., is more preferably 40° C. to 100° C., and is still more preferably 50° C. to 90° C. Note that the fact that the pressure device 230 does not have a heating source does not exclude that the temperature in the pressure device 230 becomes the environmental temperature or higher due to the heat generated by a motor or the like provided in the pressure device 230.

When the recording medium P2 passes through the pressure device 230, the folded surfaces are bonded to each other by the fluidized adhesive particle according to the exemplary embodiment, and thereby a pressure-bonded printed matter P3 is produced. The pressure-bonded printed matter P3 has a part or all of the facing surfaces bonded together.

The completed pressure-bonded printed matter P3 is unloaded from the pressure device 230.

The first form of the pressure-bonded printed matter P3 is a pressure-bonded printed matter in which the facing surfaces of the folded recording medium are bonded to each other with the adhesive particle according to the exemplary embodiment. The pressure-bonded printed matter P3 of the exemplary embodiment is produced by an apparatus of producing a printed matter which includes the folding device 220.

The second form of the pressure-bonded printed matter P3 is a pressure-bonded printed matter including the stacked plural recording media in which each medium is bonded to the adjacent medium with the opposing surfaces of these media being bonded to each other with the adhesive particle according to the exemplary embodiment. The pressure-bonded printed matter P3 of the exemplary embodiment is produced by an apparatus of producing a pressure-bonded printed matter, which includes a stacking device.

The apparatus of producing a printed matter according to the exemplary embodiment is not limited to an apparatus that continuously transports the recording medium P2 from the folding device 220 (or the stacking device) to the pressure device 230. The apparatus of producing a printed matter according to the exemplary embodiment may be an apparatus that stores the recording medium P2 out from the folding device 220 (or the stacking device), and after the storage amount of the recording medium P2 reaches a predetermined amount, transports the recording medium P2 to the pressure device 230.

In the apparatus of producing a printed matter according to the exemplary embodiment, the folding device 220 (or the stacking device) and the pressure device 230 may be close to each other or may be separated from each other. In a case where the folding device 220 (or the stacking device) and the pressure device 230 are separated from each other, the folding device 220 (or the stacking device) and the pressure device 230 are connected by, for example, a transporting unit (for example, a belt conveyor) that transports the recording medium P2.

The apparatus of producing a printed matter according to the exemplary embodiment may include a cutting unit that cuts the recording medium into a predetermined size. Examples of the cutting unit include a cutting unit that is disposed between the arrangement unit 100 and the pressure-bonding unit 200 and cuts off a region which is a part of the recording medium P1 and in which the adhesive particles according to the exemplary embodiment are not arranged; a cutting unit that is disposed between the folding device 220 and the pressure device 230 and cuts off a region which is a part of the recording medium P2 and in which the adhesive particles according to the exemplary embodiment are not arranged; and a cutting unit that is disposed downstream of the pressure-bonding unit 200 and cuts off a region which is a part of the pressure-bonded printed matter P3 and is not bonded by the adhesive particle according to the exemplary embodiment.

The apparatus of producing a printed matter according to the exemplary embodiment is not limited to a batch type apparatus which produces the pressure-bonded printed matter one by one. The apparatus of producing a printed matter according to the exemplary embodiment may be an apparatus that produces a long pressure-bonded printed matter through the arrangement process and pressure-bonding process on a long recording medium continuously, and then cuts the long pressure-bonded printed matter into a predetermined size.

The apparatus of producing a printed matter according to the exemplary embodiment may further include a color image forming unit that forms a color image on a recording medium by an electrophotographic system with a colored electrostatic charge image developer. The color image forming unit includes a photoreceptor, a charging unit that charges a surface of the photoreceptor, an electrostatic charge image forming unit that forms an electrostatic charge image on the charged surface of the photoreceptor, a developing unit that stores the electrostatic charge image developer, and develops the electrostatic charge image formed on the surface of the photoreceptor as a colored toner image with the electrostatic charge image developer, a transfer unit that transfers the colored toner image formed on the surface of the photoreceptor onto a surface of a recording medium, and a thermal fixing unit that fixes the colored toner image transferred onto the surface of the recording medium.

The method of producing a printed matter according to the exemplary embodiment by the production apparatus having the above-described configuration further includes a color image formation process of forming a color image on a recording medium by an electrophotographic system with a colored electrostatic charge image developer. The color image formation process includes a charging process of charging a surface of the photoreceptor, an electrostatic charge image formation process of forming an electrostatic charge image on the charged surface of the photoreceptor, a developing process of developing the electrostatic charge image formed on the surface of the photoreceptor as a colored toner image with the electrostatic charge image developer, a transfer process of transferring the colored toner image formed on the surface of the photoreceptor onto a surface of a recording medium, and a thermal fixing process of fixing the colored toner image transferred onto the surface of the recording medium.

The color image forming unit included in the apparatus of producing a printed matter according to the exemplary embodiment is a device such as a direct-transfer type device that directly transfers the colored toner image formed on the surface of the photoreceptor to the recording medium; an intermediate transfer type device that primarily transfers the colored toner image formed on the surface of the photoreceptor to a surface of an intermediate transfer member, and secondarily transfers the colored toner image transferred to the surface of the intermediate transfer member to the surface of the recording medium; a device including a cleaning unit that cleans the surface of the photoreceptor after transferring the colored toner image and before being charged; and a device including an erasing unit that erases charges by irradiating the surface of the photoreceptor with erasing light after transferring the colored toner image and before being charged. In a case where the color image forming unit is the intermediate transfer type device, the transfer unit includes an intermediate transfer member that transfers the colored toner image to the surface, a first transfer unit that primarily transfers the colored toner image formed on the surface of the photoreceptor to the surface of the intermediate transfer member, and a second transfer unit that secondarily transfers the colored toner image formed on the surface of the intermediate transfer member to the surface of the recording medium.

In the apparatus of producing a printed matter according to the exemplary embodiment, in a case where the arrangement unit for the developer containing the adhesive particle according to the exemplary embodiment and the color image forming unit adopt an intermediate transfer method, the arrangement unit and the color image forming unit may share the intermediate transfer member and the secondary transfer unit.

In the apparatus of producing a printed matter according to the exemplary embodiment, the arrangement unit for the developer containing the adhesive particle according to the exemplary embodiment and the color image forming unit may share a thermal fixing unit.

Hereinafter, an example of the apparatus of producing a printed matter according to the exemplary embodiment which includes the color image forming unit will be described. However, the exemplary embodiment is not limited thereto. In the following description, main parts illustrated in the drawings will be described, and the description of the other parts will not be repeated.

Figure 3:
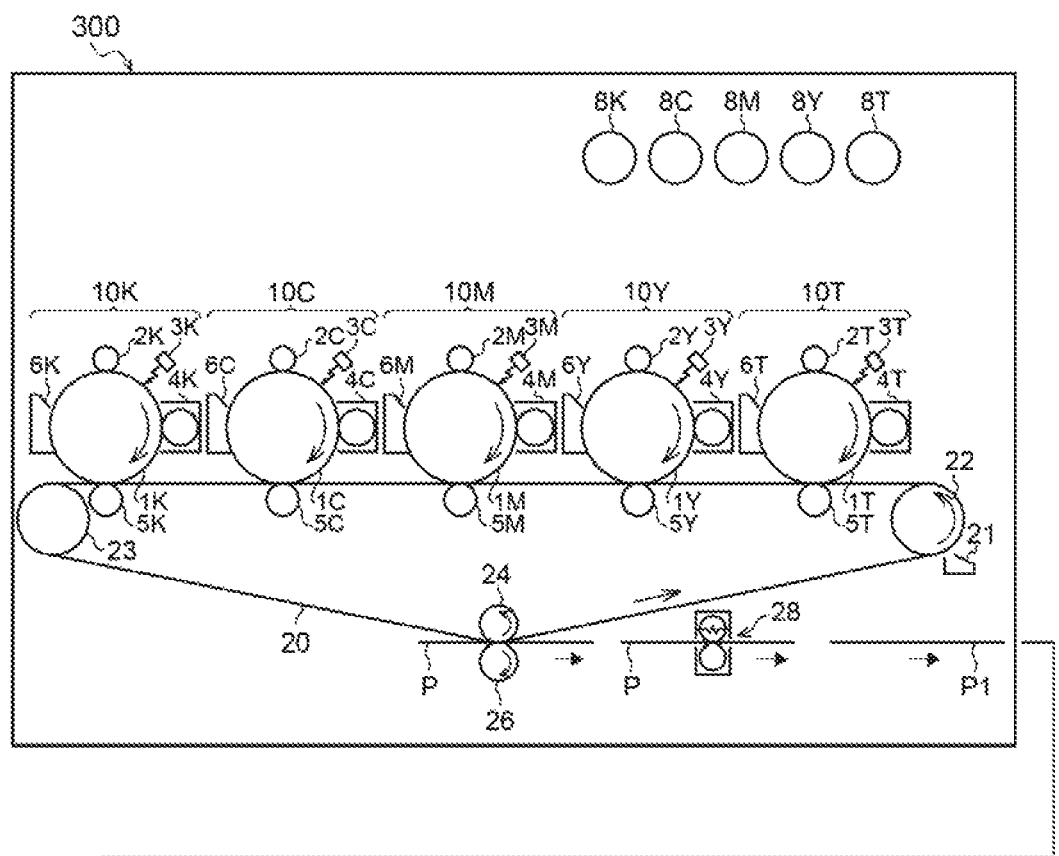
FIG. 3 is a schematic diagram illustrating another example of an apparatus of producing a printed matter according to the exemplary embodiment.
Figure 3:
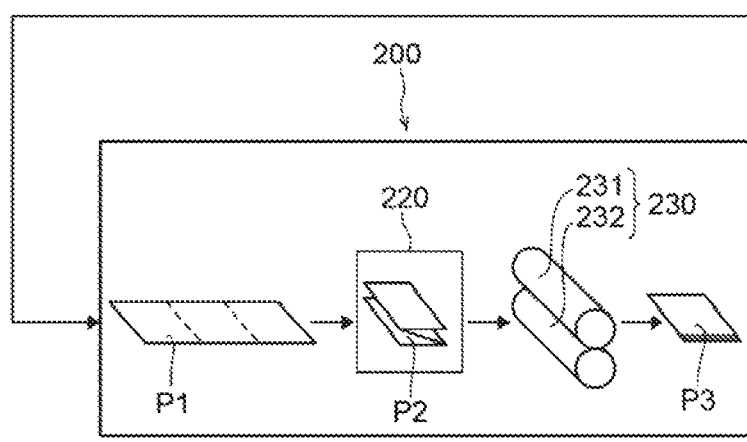

FIG. 3 is a schematic configuration diagram illustrating an example of an apparatus of producing a printed matter according to the exemplary embodiment. The apparatus of producing a printed matter as illustrated in FIG. 3 includes a printing unit 300 that collectively performs the arrangement of the adhesive particle according to the exemplary embodiment and a color image formation on a recording medium, and a pressure-bonding unit 200 that is disposed downstream of the printing unit 300.

The printing unit 300 is a five-tandem type and intermediate transfer type printing unit. The printing unit 300 includes a unit 10T for arranging an adhesive particle (T) according to the exemplary embodiment, and units 10Y, 10M, 10C, and 10K for forming respective color images of yellow (Y), magenta (M), cyan (C), and black (K). The unit 10T is an arrangement unit that arranges the adhesive particle according to the exemplary embodiment on the recording medium P with the developer including the adhesive particle according to the exemplary embodiment. Each of the units 10Y, 10M, 10C, and 10K is a unit that forms a colored image on the recording medium P with a developer containing a colored toner. The units 10T, 10Y, 10M, 10C, and 10K employ an electrophotographic system.

The units 10T, 10Y, 10M, 10C, and 10K are arranged in parallel in the horizontal direction so as to be separated from each other. The units 10T, 10Y, 10M, 10C, and 10K may be process cartridges that may be detachable from the printing unit 300.

Under the units 10T, 10Y, 10M, 10C, and 10K, an intermediate transfer belt (an example of an intermediate transfer member) 20 is extended through each unit. The intermediate transfer belt 20 is wound around a drive roll 22, a support roll 23, and a facing roll 24 that are in contact with the inner surface of the intermediate transfer belt 20, and travels in a direction from the unit 10T toward the unit 10K. An intermediate transfer member cleaning device 21 is provided on the side surface of the image holding surface side of the intermediate transfer belt 20 so as to face the drive roll 22.

Each of the units 10T, 10Y, 10M, 10C, and 10K includes a developing device (an example of a developing unit) 4T, 4Y, 4M, 4C, and 4K. In each of the developing devices 4T, 4Y, 4M, 4C, and 4K, the adhesive particle according to the exemplary embodiment, the yellow toner, the magenta toner, the cyan toner, and the black toner that are stored in the cartridges 8T, 8Y, 8M, 8C, and 8K are supplied.

Since the units 10T, 10Y, 10M, 10C, and 10K have the same configuration and operation, the unit 10T that arranges the adhesive particle according to the exemplary embodiment on the recording medium will be described as a representative.

The unit 10T has a photoreceptor 1T. Around the photoreceptor 1T, a charging roll (an example of the charging unit) 2T that charges the surface of the photoreceptor 1T, an exposure device (an example of the electrostatic charge image formation unit) 3T that forms an electrostatic charge image by exposing the charged photoreceptor surface with a laser beam, a developing device (an example of the developing unit) 4T that develops an electrostatic charge image by supplying adhesive particle to the electrostatic charge image, a transfer roll 5T (an example of a transfer unit) that transfers the developed adhesive particle area onto the recording medium P, and a photoreceptor cleaning device (an example of the cleaning unit) 6T that removes the adhesive particle remaining on the surface of the photoreceptor 1T after the transfer are arranged in order. The first transfer roll 5T is disposed on the inner side of the intermediate transfer belt 20, and is provided at a position facing the photoreceptor T.

Hereinafter, the operation of arranging the adhesive particle according to the exemplary embodiment and forming the color image on the recording medium P will be described while exemplifying the operation of the unit 10T.

First, the surface of the photoreceptor 1T is charged by the charging roll 2T. The exposure device 3T irradiates the surface of the charged photoreceptor 1T with a laser beam in accordance with image data sent from a control unit (not shown). As a result, an electrostatic charge image having an arrangement pattern of the adhesive particle according to the exemplary embodiment is formed on the surface of the photoreceptor T.

The electrostatic charge image formed on the photoreceptor 1T rotates to a development position as the photoreceptor 1T travels. Then, at the development position, the electrostatic charge image on the photoreceptor 1T is developed and visualized by the developing device 4T to become an adhesive particle area.

In the developing device 4T, for example, a developer containing at least the adhesive particle according to the exemplary embodiment and a carrier is contained. The adhesive particle according to the exemplary embodiment is frictionally charged by being agitated together with the carrier in the developing device 4T and is held on the developer roll. As the surface of the photoreceptor 1T passes through the developing device 4T, the adhesive particle is electrostatically attached to the electrostatic charge image on the surface of the photoreceptor 1T, and the electrostatic charge image is developed with the adhesive particle. The photoreceptor 1T on which the adhesive particle image of the adhesive particle is formed continues to travel, and the adhesive particle image developed on the photoreceptor 1T is transported to the primary transfer position.

When the adhesive particle image on the photoreceptor 1T is transported to the first transfer position, the first transfer bias is applied to the first transfer roll 5T, the electrostatic force from the photoreceptor 1T toward the first transfer roll 5T acts on the adhesive particle image, and the adhesive particle image on the photoreceptor 1T is transferred onto the intermediate transfer belt 20. The adhesive particle remaining on the photoreceptor 1T is removed and collected by a photoreceptor cleaning device 6T. The photoreceptor cleaning device 6T is, for example, a cleaning blade, a cleaning brush, or the like, and is preferably a cleaning brush.

In the units 10Y, 10M, 10C, and 10K, the same operation as that of the unit 10T is performed using a developer containing colored toner. The intermediate transfer belt 20 to which the toner image of the toner according to the exemplary embodiment is transferred by the unit 10T sequentially passes the units 10Y, 10M, 10C, and 10K, and the toner images of the respective colors are transferred onto the intermediate transfer belt 20 in a multiple transfer manner.

The intermediate transfer belt 20 on which five images of the units 10T, 10Y, 10M, 10C, and 10K are multiply transferred through the first to fourth units leads to a second transfer portion configured to include the intermediate transfer belt 20 and the facing roll 24 in contact with the inner surface of the intermediate transfer belt and a second transfer roll (an example of a second transfer unit) 26 disposed on the image holding surface side of the intermediate transfer belt 20. On the other hand, the recording medium P is fed to the gap where the second transfer roll 26 and the intermediate transfer belt 20 are in contact with each other via a supply mechanism, and the second transfer bias is applied to the facing roll 24. At this time, the electrostatic force from the intermediate transfer belt 20 toward the recording medium P acts on the image, and the image on the intermediate transfer belt 20 is transferred onto the recording medium P.

The recording medium P onto which the image is transferred is transported to a thermal fixing device (an example of a thermal fixing unit) 28. The thermal fixing device 28 includes a heating source such as a halogen heater, and heats the recording medium P. The surface temperature of the recording medium P when heated by the he thermal fixing device 28 is preferably 150° C. to 220° C., is more preferably 155° C. to 210° C., and is still more preferably 160° C. to 200° C. By passing through the thermal fixing device 28, the colored toner image is thermally fixed onto the recording medium P.

The thermal fixing device 28 is preferably a device that pressurizes with heating from the viewpoint of preventing the adhesive particle according to the exemplary embodiment from dropping from the recording medium P and improving the fixability of the colored image to the recording medium P, and for example, it may be a pair of fixing members (roll/roll, belt/roll) each having a heat source therein. In a case where the thermal fixing device 28 is pressurized, the pressure applied to the recording medium P by the thermal fixing device 28 may be lower than the pressure applied to a recording medium P2 by a pressure device 230. Specifically, the pressure is preferably 0.2 MPa to 1 MPa.

The recording medium P becomes a recording medium P1 in which the colored image and the adhesive particle according to the exemplary embodiment is applied on the image by passing through the printing unit 300. The recording medium P1 is transported toward the pressure-bonding unit 200.

The configuration of the pressure-bonding unit 200 in FIG. 3 may be the same as the pressure-bonding unit 200 in FIG. 2, and detailed description of the configuration and operation of the pressure-bonding unit 200 will not be repeated.

In the method of producing a printed matter according to the exemplary embodiment, the printing unit 300 and the pressure-bonding unit 200 may be close to each other or may be separated from each other. In a case where the printing unit 300 and the pressure-bonding unit 200 are separated from each other, the printing unit 300 and the pressure-bonding unit 200 are connected by, for example, a transporting unit (for example, a belt conveyor) that transports the recording medium P1.

The apparatus of producing a printed matter according to the exemplary embodiment may include a cutting unit that cuts the recording medium into a predetermined size. Examples of the cutting unit include a cutting unit that is disposed between the printing unit 300 and the pressure-bonding unit 200 and cuts off a region which is a part of the recording medium P1 and in which the adhesive particles according to the exemplary embodiment are not arranged; a cutting unit that is disposed between the folding device 220 and the pressure device 230 and cuts off a region which is a part of the recording medium P2 and in which the adhesive particles according to the exemplary embodiment are not arranged; and a cutting unit that is disposed downstream of the pressure-bonding unit 200 and cuts off a region which is a part of the pressure-bonded printed matter P3 and is not bonded by the adhesive particle according to the exemplary embodiment.

The apparatus of producing a printed matter according to the exemplary embodiment is not limited to a batch type apparatus which the produces pressure-bonded printed matter one by one. The apparatus of producing a printed matter according to the exemplary embodiment may be an apparatus that produces a long pressure-bonded printed matter through the color image formation process, the arrangement process and pressure-bonding process on a long recording medium continuously, and then cuts the long pressure-bonded printed matter into a predetermined size.

Examples

Hereinafter, the exemplary embodiments of the disclosure will be described in detail with reference to examples, but the exemplary embodiments of the disclosure are not limited to these examples. In addition, "parts" and "%" is on a weight basis unless otherwise specified.
Preparation of Dispersion Containing Styrene Resin Particle
Preparation of Styrene Resin Particle Dispersion (St1)
    Styrene: 390 parts
    n-butyl acrylate: 100 parts
    Acrylic acid: 10 parts
    Dodecanethiol: 7.5 parts The above materials are mixed and dissolved to prepare a monomer solution.

8 parts of an anionic surfactant (DOWFAX 2A1 manufactured by The Dow Chemical Company) is dissolved in 205 parts of ion-exchanged water, the monomer solution is added thereto, and the resultant is dispersed and emulsified to obtain an emulsion.

2.2 parts of an anionic surfactant (DOWFAX 2A1, manufactured by The Dow Chemical Company) is dissolved in 462 parts of ion-exchanged water, and charged into a polymerization flask equipped with a stirrer, a thermometer, a reflux condenser, and a nitrogen gas introduction pipe, and the mixture is heated up to 73° C. and the temperature is held with stirring.

3 parts of ammonium persulfate is dissolved in 21 parts of ion-exchanged water and the resultant is added dropwise into the polymerization flask via a metering pump over 15 minutes, and then the emulsion is added dropwise thereto over 160 minutes via the metering pump.

Next, the temperature of the polymerization flask is held at 75° C. for 3 hours while stirring slowly, and then returned to room temperature.

Thus, a styrene resin particle dispersion (St1), which contains a styrene resin particle and has a volume average particle diameter (D50v) of the resin particle of 174 nm, a weight average molecular weight by GPC (UV detection) of 49,000, a glass transition temperature of 54° C., and a solid content of 42%, is obtained.

The styrene resin particle dispersion (St1) is dried and the styrene resin particles are taken out, and a thermal behavior thereof is analyzed in a temperature from −100° C. to 100° C. with a differential scanning calorimeter (manufactured by Shimadzu Corporation, DSC-60A), and as a result, one glass transition temperature is observed. Table 1 shows the glass transition temperature.

Preparation of Styrene Resin Particle Dispersions (St2) to (St13)

Styrene resin particle dispersions (St2) to (St13) are prepared in the same manner as in the preparation of the styrene resin particle dispersion (St1) except that the monomers are changed as shown in Table 1.

In Table 1, the monomers are described by the following abbreviations.

Styrene: St, n-butyl acrylate: BA, 2-ethyl hexyl acrylate: 2EHA, ethyl acrylate: EA, 4-hydroxybutyl acrylate: 4HBA, acrylic acid: AA, methacrylic acid: MAA, 2-carboxyethyl acrylate: CEA

TABLE 1

| Styrene resin particle dispersion | | | | | | | | | | | |
|---|---|---|---|---|---|---|---|---|---|---|---|
| | Polymerization component (weight ratio) | | | | | | | | $D50_v$ of resin particle | Mw | Tg |
| No. | St | BA | 2EHA | EA | 4HBA | AA | MAA | CEA | nm | — | ° C. |
| St1 | 78 | 20 | 0 | 0 | 0 | 2 | 0 | 0 | 174 | 49000 | 54 |
| St2 | 88 | 10 | 0 | 0 | 0 | 2 | 0 | 0 | 170 | 50000 | 76 |
| St3 | 83 | 15 | 0 | 0 | 0 | 2 | 0 | 0 | 172 | 52000 | 65 |
| St4 | 78 | 20 | 0 | 0 | 0 | 0 | 2 | 0 | 177 | 48000 | 57 |
| St5 | 80 | 15 | 0 | 0 | 5 | 0 | 0 | 0 | 172 | 46000 | 55 |
| St6 | 80 | 15 | 5 | 0 | 0 | 0 | 0 | 0 | 174 | 51000 | 54 |
| St7 | 80 | 20 | 0 | 0 | 0 | 0 | 0 | 0 | 169 | 50000 | 54 |
| St8 | 77 | 20 | 0 | 0 | 0 | 0 | 0 | 3 | 168 | 48000 | 54 |
| St9 | 72 | 26 | 0 | 0 | 0 | 2 | 0 | 0 | 172 | 55000 | 43 |
| St10 | 68 | 30 | 0 | 0 | 0 | 2 | 0 | 0 | 173 | 53000 | 35 |
| St11 | 80 | 0 | 20 | 0 | 0 | 0 | 0 | 0 | 171 | 52000 | 56 |
| St12 | 78 | 0 | 20 | 0 | 0 | 2 | 0 | 0 | 167 | 49000 | 56 |
| St13 | 63 | 0 | 0 | 35 | 0 | 2 | 0 | 0 | 169 | 51000 | 54 |

Preparation of Dispersion Containing Composite Resin Particle
Preparation of Composite Resin Particle Dispersion (M1)
    Styrene resin particle dispersion (St1): 1190 parts (solid content of 500 parts)
    2-ethyl hexyl acrylate: 250 parts
    n-butyl acrylate: 250 parts
    Ion-exchanged water: 982 parts The above materials are charged into a polymerization flask, stirred at 25° C. for 1 hour, and then heated to 70° C.

2.5 parts of ammonium persulfate is dissolved in 75 parts of ion-exchanged water and added dropwise into the polymerization flask via a metering pump over 60 minutes.

Next, the temperature of the polymerization flask is held at 70° C. for 3 hours while stirring slowly, and then is returned to room temperature.

Thus, a composite resin particle dispersion (M1), which contains a composite resin particle, and has a volume average particle diameter (D50v) of the resin particle of 219 nm, a weight average molecular weight by GPC (UV detection) of 219,000, and a solid content of 32%, is obtained.

The composite resin particle dispersion (M1) is dried and the composite resin particles are taken out, and a thermal behavior thereof is analyzed in a temperature from −150° C. to 100° C. with a differential scanning calorimeter (manufactured by Shimadzu Corporation, DSC-60A), and as a result, two glass transition temperatures are observed. Table 2 shows the glass transition temperature.

Preparation of Composite Resin Particle Dispersions (M2) to (M21) and (cM1) to (cM3)

Composite resin particle dispersions (M2) to (M21) and (cM1) to (cM3) are prepared in the same manner as in the preparation of the composite resin particle dispersion (M1) except that the styrene resin particle dispersion (St1) is changed as shown in Table 2 or the polymerization components for the (meth)acrylate resin are changed as shown in Table 2.

Preparation of Composite Resin Particle Dispersions (M22) to (M27)

Composite resin particle dispersions (M22) to (M27) are prepared in the same manner as in the preparation of the composite resin particle dispersion (M1) except for changing the use amounts of 2-ethyl hexyl acrylate and n-butyl acrylate.

Hereinafter, the monomers are described by the following abbreviations.

Styrene: St, n-butyl acrylate: BA, 2-ethyl hexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA Preparation of Composite Resin Particle Dispersion (M28) to (M30)

Similar to the preparation of the composite resin particle dispersion (M1), composite resin particle dispersions (M28) to (M30) having different weight average molecular weights of the composite resin particles are prepared in the same manner as in the preparation of the composite resin particle dispersion (M1) except that the amount of ammonium persulfate is changed as indicated in Table 3.

TABLE 3

| No. | Ammonium persulfate |
|---|---|
| M28 | 3.0 parts |
| M29 | 5.0 parts |
| M30 | 7.5 parts |

Table 4 indicates the composition and physical properties of the composite resin particle dispersion (M28) to (M30). In Table 4, the monomers are described by the following abbreviations.

TABLE 2

Composite resin particle dispersion

| | | | | | Composite resin particle (or resin particle for comparison) | | | | |
|---|---|---|---|---|---|---|---|---|---|
| | St-based resin | | | | | Weight ratio of St-based | | | |
| No. | St-based resin particle dispersion | Polymerization component | Tg ° C. | Ac-based resin Polymerization component | resin to Ac-based resin (St:Ac) | D50$_v$ of resin particle nm | Mw — | Tg ° C. | ° C. |
| cM1 | St1 | St/BA/AA = 78/20/2 | 54 | 2EHA = 100 | 50:50 | 222 | 230000 | −50 | 54 |
| cM2 | St1 | St/BA/AA = 78/20/2 | 54 | BA = 100 | 50:50 | 225 | 220000 | −53 | 54 |
| cM3 | St12 | St/2EHA/AA = 78/20/2 | 56 | BA = 100 | 50:50 | 224 | 212000 | −53 | 56 |
| M1 | St1 | St/BA/AA = 78/20/2 | 54 | 2EHA/BA = 50/50 | 50:50 | 219 | 219000 | −52 | 54 |
| M2 | St2 | St/BA/AA = 88/10/2 | 76 | 2EHA/BA = 50/50 | 50:50 | 218 | 240000 | −52 | 76 |
| M3 | St3 | St/BA/AA = 83/15/2 | 65 | 2EHA/BA = 50/50 | 50:50 | 220 | 231000 | −52 | 65 |
| M4 | St4 | St/BA/MAA = 78/20/2 | 57 | 2EHA/BA = 50/50 | 50:50 | 221 | 250000 | −52 | 57 |
| M5 | St5 | St/BA/4HBA = 80/15/5 | 55 | 2EHA/BA = 50/50 | 50:50 | 224 | 242000 | −52 | 55 |
| M6 | St6 | St/BA/2EHA = 80/15/5 | 54 | 2EHA/BA = 50/50 | 50:50 | 225 | 233000 | −52 | 54 |
| M7 | St7 | St/BA = 80/20 | 54 | 2EHA/BA = 50/50 | 50:50 | 224 | 243000 | −52 | 54 |
| M8 | St8 | St/BA/CEA = 77/20/3 | 54 | 2EHA/BA = 50/50 | 50:50 | 222 | 260000 | −52 | 54 |
| M9 | St9 | St/BA/AA = 72/26/2 | 43 | 2EHA/BA = 50/50 | 50:50 | 223 | 251000 | −52 | 43 |
| M10 | St10 | St/BA/AA = 68/30/2 | 35 | 2EHA/BA = 50/50 | 50:50 | 220 | 243000 | −52 | 35 |
| M11 | St11 | St/2EHA = 80/20 | 56 | 2EHA/BA = 50/50 | 50:50 | 221 | 249000 | −52 | 56 |
| M12 | St12 | St/2EHA/AA = 78/20/2 | 56 | 2EHA/BA = 50/50 | 50:50 | 227 | 237000 | −52 | 56 |
| M13 | St12 | St/2EHA/AA = 78/20/2 | 56 | 2EHA/HA = 50/50 | 50:50 | 224 | 226000 | −55 | 56 |
| M14 | St13 | St/EA/AA = 63/35/2 | 54 | 2EHA/PA = 50/50 | 50:50 | 224 | 243000 | −45 | 54 |
| M15 | St1 | St/BA/AA = 78/20/2 | 54 | 2EHA/HA = 50/50 | 50:50 | 226 | 270000 | −54 | 54 |
| M16 | St1 | St/BA/AA = 78/20/2 | 54 | 2EHA/BA = 90/10 | 50:50 | 224 | 264000 | −51 | 54 |
| M17 | St1 | St/BA/AA = 78/20/2 | 54 | 2EHA/BA = 80/20 | 50:50 | 226 | 248000 | −52 | 54 |
| M18 | St1 | St/BA/AA = 78/20/2 | 54 | 2EHA/BA = 70/30 | 50:50 | 226 | 260000 | −52 | 54 |
| M19 | St1 | St/BA/AA = 78/20/2 | 54 | 2EHA/BA = 30/70 | 50:50 | 225 | 273000 | −52 | 54 |
| M20 | St1 | St/BA/AA = 78/20/2 | 54 | 2EHA/BA = 20/80 | 50:50 | 224 | 233000 | −52 | 54 |
| M21 | St1 | St/BA/AA = 78/20/2 | 54 | 2EHA/BA = 10/90 | 50:50 | 223 | 243000 | −53 | 54 |
| M22 | St1 | St/BA/AA = 78/20/2 | 54 | 2EHA/BA = 50/50 | 90:10 | 182 | 180000 | −52 | 54 |
| M23 | St1 | St/BA/AA = 78/20/2 | 54 | 2EHA/BA = 50/50 | 80:20 | 190 | 210000 | −52 | 54 |
| M24 | St1 | St/BA/AA = 78/20/2 | 54 | 2EHA/BA = 50/50 | 70:30 | 199 | 223000 | −52 | 54 |
| M25 | St1 | St/BA/AA = 78/20/2 | 54 | 2EHA/BA = 50/50 | 30:70 | 259 | 300000 | −52 | 54 |
| M26 | St1 | St/BA/AA = 78/20/2 | 54 | 2EHA/BA = 50/50 | 20:80 | 300 | 320000 | −52 | 54 |
| M27 | St1 | St/BA/AA = 78/20/2 | 54 | 2EHA/BA = 50/50 | 10:90 | 380 | 331000 | −52 | 54 |

Styrene: St, n-Butyl acrylate: BA, Acrylic acid: AA, 2-Ethyl hexyl acrylate: 2EHA

TABLE 4

Composite resin particle dispersion

| | St-based resin | | | Ac-based resin | Composite resin particle (or resin particle for comparison) | | | | |
|---|---|---|---|---|---|---|---|---|---|
| | St-based resin particle | | | | Weight ratio of St-based resin and Ac-based resin | $D50_v$ of resin particle | | Tg | |
| No. | dispersion | Polymerization component | Tg °C. | Polymerization component | (St:Ac) | nm | Mw | °C. | °C. |
| M28 | St1 | St/BA/AA = 78/20/2 | 54 | 2EHA/BA = 50/50 | 50:50 | 219 | 150,000 | −52 | 54 |
| M29 | St1 | St/BA/AA = 78/20/2 | 54 | 2EHA/BA = 50/50 | 50:50 | 219 | 100,000 | −52 | 54 |
| M30 | St1 | St/BA/AA = 78/20/2 | 54 | 2EHA/BA = 50/50 | 50:50 | 219 | 60,000 | −52 | 54 |

Preparation of an Adhesive Particle

Composite resin particle dispersion (M1): 504 parts
Ion-exchanged water: 710 parts
Anionic surfactant (DOWFAX 2A1, manufactured by The Dow Chemical Company): 1 part The above materials are put into a reaction container equipped with a thermometer and a pH meter, a 1.0% nitric acid aqueous solution is added thereto at a temperature of 25° C. to adjust the pH to 3.0, and while the mixture is dispersed at the number of revolutions of 5,000 rpm with a homogenizer (manufactured by IKA, ULTRA TURRAX T50), 23 parts of 2.0% aluminum sulfate aqueous solution is added thereto. Next, a stirrer and a mantle heater are installed in the reaction container, the temperature is increased up to a temperature of 40° C. at a rate of temperature increase of 0.2° C./min, and after the temperature exceeds 40° C., is increased at a rate of temperature increase of 0.05° C./min, and the particle diameter is measured every 10 minutes with COULTER MULTISIZER II (aperture diameter of 50 μm, manufactured by Beckman Coulter, Inc.). When the volume average particle diameter reaches 5.0 μm, the temperature is held, and 170 parts of the styrene resin particle dispersion (St1) is added therein over 5 minutes. After completion of the addition, the mixture is held at 50° C. for 30 minutes, and then a 1.0% aqueous sodium hydroxide solution is added thereto to adjust the pH of the resulting slurry to 6.0. Next, while adjusting the pH to 6.0 every 5° C., the temperature is increased up to 90° C. at a rate of temperature increase of 1° C./min and held at 90° C. When a particle shape and surface properties are observed with an optical microscope and a field emission scanning electron microscope (FE-SEM), the coalescence of the particles is found after 10 hours, and a container is cooled to 30° C. for 5 minutes.

The cooled slurry is passed through a nylon mesh having an opening of 15 μm to remove coarse particles, and the slurry having passed through the mesh is filtered under reduced pressure with an aspirator. The solid content remaining on the filter paper is crushed as finely as possible by hand, and the resultant is put into ion-exchanged water (temperature 30° C.) whose amount is 10 times that of the solid content, and stirred for 30 minutes. Next, the mixture is filtered under reduced pressure with an aspirator, the solid content remaining on the filter paper is crushed as finely as possible by hand, the resultant is put into ion-exchanged water (temperature 30° C.) whose amount is 10 times that of the solid content, followed by stirring for 30 minutes, the resultant is filtered under reduced pressure again with the aspirator, and the filtrate is measured for the electrical conductivity. This operation is repeated until the electric conductivity of the filtrate is 10 S/cm or less, and then, the resulting solid content is washed.

The washed solid content is finely pulverized with a wet dry granulator (Comil) and vacuum dried in an oven at 25° C. for 36 hours, thereby obtaining an adhesive particle (1). The adhesive particle (1) has a volume average particle diameter of 8.0 μm.

100 parts of adhesive particles (1) and 1.5 parts of hydrophobic silica (RY50, manufactured by Nippon Aerosil Co., Ltd.) are mixed for 30 seconds at a rotational speed of 13,000 rpm using a sample mill, and then sieved with a vibrating sieve having an opening of 45 μm, thereby obtaining an adhesive particle (1).

Using the adhesive particle (1) as a sample, a thermal behavior thereof is analyzed in a temperature from −150° C. to 100° C. with a differential scanning calorimeter (manufactured by Shimadzu Corporation, DSC-60A), and as a result, two glass transition temperatures are observed. Table 5 shows the glass transition temperature.

When a temperature T1 and a temperature T2 of the adhesive particle (1) are determined by the above-described measurement method, the adhesive particle (1) satisfies Expression 1: 10° C.≤T1−T2.

When the cross section of the adhesive particle (1) is observed with a scanning electron microscope (SEM), a sea-island structure is observed. The adhesive particle (1) has a core portion where an island phase is present and a shell layer where no island phase is present. A sea phase contains a styrene resin, and the island phase contains a (meth)acrylate resin. The average diameter of the island phase is determined by the measurement method described above. Table 5 shows the average diameter of the island phase.

Preparation of Adhesive Particles (2) to (27)

The adhesive particles (2) to (27) are prepared in the same manner as in the preparation of the adhesive particle (1), except that the composite resin particle dispersion and the styrene resin particle dispersion are changed as shown in Table 5, and the developers (2) to (27) are prepared in the same manner as in the preparation of the developer (1).

When the temperature T1 and the temperature T2 of the adhesive particles (2) to (27) are determined by the above-described measurement method, all of the adhesive particle (2) to (27) satisfy Expression 1: 10° C.≤T1−T2.

Preparation of Adhesive Particles (28) to (30)

Adhesive particles (28) to (30) are prepared in the same manner as in the preparation of the adhesive particle (1) except that the composite resin particle dispersion is changed as indicated in Table 6.

When the temperature T1 and the temperature T2 of the adhesive particles (28) to (30) are determined by the above-described measurement method, all of the adhesive particles (28) to (30) satisfy Expression 1 "10° C.≤T1−T2".

Preparation of Adhesive Particle (31)

The composite resin particle (M31) obtained by drying the composite resin particle dispersion (M1) is heat-kneaded by an extruder at a set temperature of 100° C., and the mixture is cooled, pulverized, and classified to obtain a adhesive particle (31) having a volume average particle diameter of 8.0 μm.

100 parts of adhesive particle (31) and 1.5 parts of hydrophobic silica (RY50, prepared by Nippon Aerosil Co., Ltd.) are mixed for 30 seconds at a rotational speed of 13,000 rpm using a sample mill. The adhesive particle (31) is obtained by sieving with a vibrating sieve having an opening of 45 μm.

Using the adhesive particle (31) as a sample, a thermal behavior is analyzed in a temperature from 150° C. to 100° C. with a differential scanning calorimeter (manufactured by Shimadzu Corporation, DSC-60A), and as a result, two glass transition temperature is observed. Table 6 shows the glass transition temperatures.

When the temperature T1 and the temperature T2 of the adhesive particle (31) are determined by the above-described measurement method, the adhesive particle (31) satisfy Expression 1 "10° C.≤T1−T2".

Preparation of Adhesive Particles (c1) to (c3) and Developers (c1) to (c3) for Comparison Adhesive particles (c1) to (c3) are prepared in the same manner as in the preparation of the adhesive particle (1), except that the composite resin particle dispersion and the styrene resin particle dispersion are changed as shown in Table 6, and developers (c1) to (c3) are prepared in the same manner as in the preparation of the developer (1) except for using adhesive particles (c1) to (c3), respectively.

Evaluation of Pressure-Responsive Phase Transition

A temperature difference (T1−T3), which is an index indicating that the adhesive particle easily undergoes phase transition due to the pressure, is obtained. Using each adhesive particle as a sample, the temperature T1 and temperature T3 are measured with a flow tester (manufactured by Shimadzu Corporation, CFT-500), and the temperature difference (T1−T3) is calculated. Table 6 shows the temperature difference (T1−T3).

Evaluation of Adhesion

A postcard paper V424 made by Fuji Xerox Co., Ltd. is prepared as a recording medium. An image forming apparatus DOCUCENTRE C7550I manufactured by Fuji Xerox Co., Ltd. and commercially available yellow toner, magenta toner, cyan toner, and black toner prepared by Fuji Xerox Co., Ltd. are used to form an image having an area density of 30% in which black characters and full-color photo-images are mixed on one side of postcard paper, and fixed thereon.

The adhesive particles are sprayed on the entire image forming surface of the postcard paper so that the applied amount is 3 g/m², and after passing through a belt roll type fixing machine, the adhesive particles are fixed on the image forming surface of the postcard paper to form a layer of the adhesive particles.

The postcard paper that has a layer of adhesive particles on the image forming surface is folded in half so that the image forming surface faces inside by using a sealer PRESSLE MULTI II manufactured by Toppan Forms Co., Ltd., and then pressure is applied to the folded postcard paper, and the inner image forming-surfaces are bonded to each other at a pressure of 90 MPa.

With the above-described apparatus and conditions, ten postcards which are folded in half so that the image forming surfaces become inside surfaces and the image forming surfaces are bonded to each other are produced in succession.

The tenth postcard is cut in the long side direction with a width of 15 mm to produce a rectangular test piece, and then a 90-degree peel test is performed. The peeling speed of the 90-degree peel test is 20 mm/min, and after starting the measurement, a load (N) from 10 mm to 50 mm is sampled at intervals of 0.4 mm, the average is calculated, and loads (N) of three test pieces are averaged. The load (N) required for the peeling is classified as follows. The results are shown in Tables 5 and 6.

A: 0.8 N or more
B: 0.6 N or more and less than 0.8 N
C: 0.4 N or more and less than 0.6 N
D: 0.2 N or more and less than 0.4 N
E: Less than 0.2 N

TABLE 5

| | | Core portion | | | | Adhesive particle | |
|---|---|---|---|---|---|---|---|
| Adhesive particle | Composite resin particle dispersion | Polymerization component for St-based resin | Polymerization component for Ac-based resin | Weight ratio of St-based resin to Ac-based resin (St:Ac) | Shell layer St-based resin particle dispersion | D50v μm | Average diameter of island phase nm |
| c1 | cM1 | St/BA/AA = 78/20/2 | 2EHA = 100 | 50:50 | St1 | 8.0 | 600 |
| c2 | cM2 | St/BA/AA = 78/20/2 | BA = 100 | 50:50 | St1 | 8.0 | 550 |
| c3 | cM3 | St/2EHA/AA = 78/20/2 | BA = 100 | 50:50 | St12 | 11.0 | 570 |
| 1 | M1 | St/BA/AA = 78/20/2 | 2EHA/BA = 50/50 | 50:50 | St1 | 8.0 | 200 |
| 2 | M2 | St/BA/AA = 88/10/2 | 2EHA/BA = 50/50 | 50:50 | St2 | 11.0 | 250 |
| 3 | M3 | St/BA/AA = 83/15/2 | 2EHA/BA = 50/50 | 50:50 | St3 | 11.0 | 280 |
| 4 | M4 | St/BA/MAA = 78/20/2 | 2EHA/BA = 50/50 | 50:50 | St4 | 11.0 | 240 |

TABLE 5-continued

| | | | | | | | |
|---|---|---|---|---|---|---|---|
| 5 | M5 | St/BA/4HBA = 80/15/5 | 2EHA/BA = 50/50 | 50:50 | St5 | 11.0 | 240 |
| 6 | M6 | St/BA/2EHA = 80/15/5 | 2EHA/BA = 50/50 | 50:50 | St6 | 11.0 | 250 |
| 7 | M7 | St/BA = 80/20 | 2EHA/BA = 50/50 | 50:50 | St7 | 9.5 | 250 |
| 8 | M8 | St/BA/CEA = 77/20/3 | 2EHA/BA = 50/50 | 50:50 | St8 | 9.5 | 250 |
| 9 | M9 | St/BA/AA = 72/26/2 | 2EHA/BA = 50/50 | 50:50 | St9 | 9.5 | 220 |
| 10 | M10 | St/BA/AA = 68/30/2 | 2EHA/BA = 50/50 | 50:50 | St10 | 9.5 | 230 |
| 11 | M11 | St/2EHA = 80/20 | 2EHA/BA = 50/50 | 50:50 | St11 | 9.5 | 220 |
| 12 | M12 | St/2EHA/AA = 78/20/2 | 2EHA/BA = 50/50 | 50:50 | St12 | 9.5 | 230 |
| 13 | M13 | St/2EHA/AA = 78/20/2 | 2EHA/HA = 50/50 | 50:50 | St12 | 5.8 | 250 |
| 14 | M14 | St/EA/AA = 63/35/2 | 2EHA/PA = 50/50 | 50:50 | St13 | 5.8 | 350 |
| 15 | M15 | St/BA/AA = 78/20/2 | 2EHA/HA = 50/50 | 50:50 | St1 | 5.8 | 400 |
| 16 | M16 | St/BA/AA = 78/20/2 | 2EHA/BA = 90/10 | 50:50 | St1 | 8.0 | 400 |
| 17 | M17 | St/BA/AA = 78/20/2 | 2EHA/BA = 80/20 | 50:50 | St1 | 8.0 | 300 |
| 18 | M18 | St/BA/AA = 78/20/2 | 2EHA/BA = 70/30 | 50:50 | St1 | 8.0 | 250 |
| 19 | M19 | St/BA/AA = 78/20/2 | 2EHA/BA = 30/70 | 50:50 | St1 | 8.0 | 250 |
| 20 | M20 | St/BA/AA = 78/20/2 | 2EHA/BA = 20/80 | 50:50 | St1 | 8.0 | 300 |
| 21 | M21 | St/BA/AA = 78/20/2 | 2EHA/BA = 10/90 | 50:50 | St1 | 8.0 | 400 |
| 22 | M22 | St/BA/AA = 78/20/2 | 2EHA/BA = 50/50 | 90:10 | St1 | 8.0 | 450 |
| 23 | M23 | St/BA/AA = 78/20/2 | 2EHA/BA = 50/50 | 80:20 | St1 | 8.0 | 400 |
| 24 | M24 | St/BA/AA = 78/20/2 | 2EHA/BA = 50/50 | 70:30 | St1 | 8.0 | 250 |
| 25 | M25 | St/BA/AA = 78/20/2 | 2EHA/BA = 50/50 | 30:70 | St1 | 8.0 | 210 |
| 26 | M26 | St/BA/AA = 78/20/2 | 2EHA/BA = 50/50 | 20:80 | St1 | 8.0 | 230 |
| 27 | M27 | St/BA/AA = 78/20/2 | 2EHA/BA = 50/50 | 10:90 | St1 | 8.0 | 250 |

| Adhesive particle | Tg °C. | Tg difference °C. | T3 °C. | Pressure-responsive phase transition (T1−T3) °C. | Adhesion | Remarks |
|---|---|---|---|---|---|---|
| c1 | −50 | 54 | 104 | 95 | 3 | D | Comparative Example |
| c2 | −53 | 54 | 107 | 93 | 4 | D | Comparative Example |
| c3 | −53 | 56 | 109 | 93 | 4 | D | Comparative Example |
| 1 | −52 | 54 | 106 | 75 | 15 | A | Example |
| 2 | −52 | 76 | 128 | 70 | 13 | A | Example |
| 3 | −52 | 65 | 117 | 78 | 15 | A | Example |
| 4 | −52 | 57 | 109 | 70 | 10 | A | Example |
| 5 | −52 | 55 | 107 | 74 | 16 | A | Example |
| 6 | −52 | 54 | 106 | 73 | 14 | A | Example |
| 7 | −52 | 54 | 106 | 73 | 13 | A | Example |
| 8 | −52 | 54 | 106 | 75 | 10 | A | Example |
| 9 | −52 | 43 | 95 | 75 | 15 | A | Example |
| 10 | −52 | 35 | 87 | 73 | 15 | A | Example |
| 11 | −52 | 56 | 108 | 72 | 15 | A | Example |
| 12 | −52 | 56 | 108 | 75 | 20 | A | Example |
| 13 | −55 | 56 | 111 | 70 | 15 | A | Example |
| 14 | −45 | 54 | 99 | 80 | 5 | B | Example |
| 15 | −54 | 54 | 108 | 81 | 7 | B | Example |
| 16 | −51 | 54 | 105 | 80 | 10 | B | Example |
| 17 | −52 | 54 | 106 | 70 | 20 | A | Example |
| 18 | −52 | 54 | 106 | 75 | 15 | A | Example |
| 19 | −52 | 54 | 106 | 73 | 15 | A | Example |
| 20 | −52 | 54 | 106 | 75 | 20 | A | Example |
| 21 | −53 | 54 | 107 | 80 | 9 | B | Example |
| 22 | −52 | 54 | 106 | 85 | 5 | C | Example |
| 23 | −52 | 54 | 106 | 80 | 10 | B | Example |
| 24 | −52 | 54 | 106 | 75 | 15 | A | Example |
| 25 | −52 | 54 | 106 | 73 | 13 | A | Example |
| 26 | −52 | 54 | 106 | 72 | 13 | A | Example |
| 27 | −52 | 54 | 106 | 72 | 13 | A | Example |

TABLE 6

| Adhesive particle | Composite resin particle dispersion | Core portion Polymerization component for St-based resin | Polymerization component for Ac-based resin | Weight ratio of St-based resin to Ac-based resin (St:Ac) | Shell layer St-based resin particle dispersion | Adhesive particle D50$_v$ μm | Average diameter of island phase nm |
|---|---|---|---|---|---|---|---|
| 28 | M28 | St/BA/AA = 78/20/2 | 2EHA/BA = 50/50 | 50:50 | St1 | 8.0 | 200 |
| 29 | M29 | St/BA/AA = 78/20/2 | 2EHA/BA = 50/50 | 50:50 | St1 | 8.0 | 200 |
| 30 | M30 | St/BA/AA = 78/20/2 | 2EHA/BA = 50/50 | 50:50 | St1 | 8.0 | 200 |
| 31 | M31 | St/BA/AA = 78/20/2 | 2EHA/BA = 50/50 | 50:50 | — | 8.0 | 400 |

| Adhesive particle | Adhesive particle Tg °C. | Tg difference °C. | T3 °C. | Pressure-responsive phase transition (T1-T3) °C. | Adhesion | Remark |
|---|---|---|---|---|---|---|
| 28 | −52 | 54 | 106 | 75 | 15 A | Example |
| 29 | −52 | 54 | 106 | 75 | 15 A | Example |
| 30 | −52 | 54 | 106 | 75 | 15 B | Example |
| 31 | −52 | 54 | 106 | 75 | 7 B | Example |

*The adhesive particle (M31) is produced by a pulverization method using the composite particle (M31) as a material obtained by drying the composite resin particle dispersion (M1).

Preparation of Dispersion Containing Composite Resin Particle

Preparation of Composite Resin Particle Dispersion (M50)

Styrene resin particle dispersion (St1): 1190 parts (solid content of 500 parts)

2-ethyl hexyl acrylate: 200 parts

Acrylic acid n-butyl: 200 parts

Ion-exchanged water: 1360 parts

The above materials are charged into a polymerization flask, stirred at 25° C. for 1 hour, and then heated to 70° C. 2.5 parts of ammonium persulfate is dissolved in 75 parts of ion-exchanged water and dropped into a polymerization flask via a metering pump over 60 minutes.

Then, the polymerization flask is held at 70° C. for 2 hours while slowly stirring, and then a mixture of 85 parts of styrene and 15 parts of n-butyl acrylate is dropped over 60 minutes. After dropping, the mixture is held at 75° C. for 3 hours and then returned to room temperature.

Thus, a composite resin particle dispersion (M50) which contains a composite resin particle and has a solid content of 32% is obtained, and the resin particles have a volume average particle diameter (D50v) of 223 nm, and the resin has a weight average molecular weight by GPC (UV detection) of 220,000.

The composite resin particle dispersion (M50) is dried and the composite resin particles are taken out, and a thermal behavior is analyzed in a temperature of from −150° C. to 100° C. with a differential scanning calorimeter (manufactured by Shimadzu Corporation, DSC-60A), and as a result, two glass transition temperatures are observed. Table 7 shows the glass transition temperature.

Preparation of Composite Resin Particle Dispersion (M51) to (M55)

Composite resin particle dispersion (M51) to (M55) are prepared in the same manner as in the preparation of the composite resin particle dispersion (M50) except that the material is changed to the specification shown in Table 7.

Table 7 shows the composition and physical properties of the composite resin particle dispersion (M50) and the like. In Table 7, the monomers are described by the following abbreviations.

Styrene: St, n-Butyl acrylate: BA, Acrylic acid: AA, 2-Ethyl hexyl acrylate: 2EHA

TABLE 7

Composite resin particle dispersion

| No. | St-based resin particle dispersion | St-based resin (1) Polymerization component | Tg °C. | Ac-based resin Polymerization component | St-based resin (2) Polymerization component | Composite resin particle Weight ratio of St-based resin and Ac-based resin (St:Ac) | D50$_v$ of resin particle nm | Mw | Tg °C. | Tg °C. |
|---|---|---|---|---|---|---|---|---|---|---|
| M50 | St1 | St/BA/AA = 78/20/2 | 54 | 2EHA/BA = 50/50 | St/BA = 85/15 | 60:40 | 223 | 220,000 | −52 | 55 |
| M51 | St1 | St/BA/AA = 78/20/2 | 54 | 2EHA/BA = 50/50 | St/BA = 90/10 | 60:40 | 224 | 215,000 | −52 | 55 |
| M52 | St1 | St/BA/AA = 78/20/2 | 54 | 2EHA/BA = 70/30 | St/BA = 70/30 | 60:40 | 223 | 212,000 | −54 | 53 |
| M53 | St1 | St/BA/AA = 78/20/2 | 54 | 2EHA/BA = 30/70 | St/BA = 90/10 | 60:40 | 223 | 200,000 | −52 | 54 |
| M54 | St1 | St/BA/AA = 78/20/2 | 54 | 2EHA/BA = 60/40 | St/BA = 85/15 | 50:50 | 230 | 220,000 | −52 | 54 |
| M55 | St3 | St/BA/AA = 83/15/2 | 65 | 2EHA/BA = 60/40 | St/BA = 85/15 | 50:50 | 228 | 223,000 | −52 | 65 |

Preparation of Adhesive Particle
Preparation of Adhesive Particles (50) to (55)

Adhesive particles (50) to (55) are prepared in the same manner as in the preparation of the adhesive particle (1) except that the materials are changed to the specification shown in Table 8.

Using the adhesive particles (50) to (55) as a sample, a thermal behavior is analyzed in a temperature of from −150° C. to 100° C. with a differential scanning calorimeter (manufactured by Shimadzu Corporation, DSC-60A), and as a result, two glass transition temperature is observed. Table 8 shows the glass transition temperature.

When the temperature T1 and the temperature T2 of the adhesive particles (50) to (55) are determined by the above-described measurement method, all of the adhesive particles (50) to (55) satisfy Expression 1 "10° C.≤T1−T2".

When cross sections of the adhesive particles (50) to (55) are observed with a scanning electron microscope (SEM), a sea-island structure is observed. The adhesive particles (50) to (55) have a core portion where an island phase is present and a shell layer where no island phase is present. A sea phase contains a styrene resin, and the island phase contains a (meth)acrylate resin. The average diameter of the island phase is determined by the measurement method described above. Table 8 shows the average diameter of the island phase.

Evaluation of Pressure-Responsive Phase Transition

Using each adhesive particle as a sample, the temperature T1 and temperature T3 are measured with a flow tester (manufactured by Shimadzu Corporation, CFT-500), and the temperature difference (T1−T3) is calculated. Table 8 shows the temperature difference (T1−T3).

Evaluation of Adhesion

Similar to the adhesive particle (1) and the like, the adhesiveness is evaluated by the evaluation method of Evaluation of adhesion described above. The results are shown in Table 8.

TABLE 8

| Adhesive particle | Composite resin particle dispersion | Core portion Polymerization component of St-based resin (1) | Polymerization component of Ac-based resin | Polymerization component of St-based resin (2) | Weight ratio of St-based resin and Ac-based resin (St:Ac) | Shell layer St-based resin particle dispersion | Adhesive particle D50$_v$ µm |
|---|---|---|---|---|---|---|---|
| 50 | M50 | St/BA/AA = 78/20/2 | 2EHA/BA = 50/50 | St/BA = 85/15 | 60:40 | St1 | 8.0 |
| 51 | M51 | St/BA/AA = 78/20/2 | 2EHA/BA = 50/50 | St/BA = 90/10 | 60:40 | St1 | 8.0 |
| 52 | M52 | St/BA/AA = 78/20/2 | 2EHA/BA = 70/30 | St/BA = 70/30 | 60:40 | St1 | 8.0 |
| 53 | M53 | St/BA/AA = 78/20/2 | 2EHA/BA = 30/70 | St/BA = 90/10 | 60:40 | St1 | 8.0 |
| 54 | M54 | St/BA/AA = 78/20/2 | 2EHA/BA = 60/40 | St/8A = 85/15 | 50:50 | St1 | 8.0 |
| 55 | M55 | St/BA/AA = 83/15/2 | 2EHA/BA = 60/40 | St/BA = 85/15 | 50:50 | St1 | 8.0 |

TABLE 8-continued

| Adhesive particle | Average diameter of island phase | Tg | | Tg difference | T3 | Pressure-responsive phase transition (T1-T3) | Adhesion | Remark |
|---|---|---|---|---|---|---|---|---|
| | nm | °C. | °C. | °C. | °C. | °C. | | |
| 50 | 250 | −52 | 55 | 107 | 75 | 10 | A | Example |
| 51 | 250 | −52 | 55 | 107 | 75 | 10 | A | Example |
| 52 | 250 | −54 | 53 | 107 | 74 | 13 | A | Example |
| 53 | 250 | −52 | 54 | 106 | 73 | 13 | A | Example |
| 54 | 270 | −52 | 54 | 106 | 78 | 15 | A | Example |
| 55 | 270 | −52 | 65 | 117 | 74 | 15 | A | Example |

Production of Printed Matter by Electrophotographic System 10 parts of any of adhesive particles (1) to (31), (c1) to (c3), and (50) to (55) and 100 parts of the following resin-coated carrier (1) are put into a V-type blender and agitated for 20 minutes, and then, sieved with a vibrating sieve having an opening of 212 μm to obtain developers (1) to (31), (c1) to (c3), and (50) to (55), respectively.

Resin-Coated Carrier (1)
Mn—Mg—Sr ferrite particle (average particle diameter of 40 μm): 100 parts
Toluene: 14 parts
Polymethylmethacrylate: 2 parts
Carbon black (VXC72, prepared by Cabot): 0.12 parts The above materials excluding the ferrite particle and glass bead (diameter of 1 mm, the same amount as toluene) are mixed, and stirred at a rotational speed of 1200 rpm for 30 minutes using a sand mill manufactured by Kansai Paint Co., so as to obtain a dispersion. The dispersion and the ferrite particle are put into a vacuum degassing type kneader and dried under the reduced pressure while stirring so as to obtain a resin-coated carrier (1).

An apparatus of the form as illustrated in FIG. 3 is prepared as an apparatus of producing a printed matter. That is, an apparatus of producing a printed matter, including a five-drum tandem and intermediate transfer type printing unit that collectively performs arrangement of adhesive particle according to the exemplary embodiment and color image formation on a recording medium, and a pressure-bonding unit that includes a folding device and a pressure device, is prepared.

The developer (or developer for comparison) according to the exemplary embodiment, a yellow developer, a magenta developer, a cyan developer, and a black developer are respectively put in five developing devices included in the printing unit. A commercially available product manufactured by Fuji Xerox Co., Ltd. is used for each color developer such as yellow.

A postcard paper V424 made by Fuji Xerox Co., Ltd. is prepared as a recording medium. An image formed on the postcard paper is an image with an area density of 30% in which black characters and full-color photo-images are mixed, and is formed on one side of the postcard paper.

The amount of adhesive particle according to the exemplary embodiment (or adhesive particle for comparison) applied is 3 g/m² in an image forming region on an image forming surface of the postcard paper.

The folding device is a device that folds the postcard paper in half so that the image forming surface becomes an inside surface.

The pressure device is set to a pressure of 90 MPa.

With the above-described apparatus and conditions, ten postcards which are folded in half so that the image forming surfaces become inside surfaces and the image forming surfaces are bonded to each other are produced in succession.

The tenth postcard is cut in the long side direction with a width of 15 mm to produce a rectangular test piece, and then a 90-degree peel test is performed. The peeling speed of the 90-degree peel test is 20 mm/min, and after starting the measurement, loads (N) are measured from 10 mm to 50 mm at intervals of 0.4 mm, the average of the obtained loads is calculated. The averaged loads obtained with respect to three test pieces are averaged. The load (N) required for the peeling is classified as follows. The results are shown in Tables 9, 10, and 11.

A: 0.8 N or more

B: 0.6 N or more and less than 0.8 N

C: 0.4 N or more and less than 0.6 N

D: 0.2 N or more and less than 0.4 N

E: less than 0.2 N

TABLE 9

| Developer | Adhesive particle | Adhesion | Remarks |
|---|---|---|---|
| c1 | c1 | D | Comparative Example |
| c2 | c2 | D | Comparative Example |
| c3 | c3 | D | Comparative Example |
| 1 | 1 | A | Example |
| 2 | 2 | A | Example |
| 3 | 3 | A | Example |
| 4 | 4 | A | Example |
| 5 | 5 | A | Example |
| 6 | 6 | A | Example |
| 7 | 7 | A | Example |
| 8 | 8 | A | Example |
| 9 | 9 | A | Example |
| 10 | 10 | A | Example |
| 11 | 11 | A | Example |
| 12 | 12 | A | Example |
| 13 | 13 | A | Example |
| 14 | 14 | B | Example |
| 15 | 15 | B | Example |
| 16 | 16 | B | Example |
| 17 | 17 | A | Example |
| 18 | 18 | A | Example |
| 19 | 19 | A | Example |
| 20 | 20 | A | Example |

TABLE 9-continued

| Developer | Adhesive particle | Adhesion | Remarks |
|---|---|---|---|
| 21 | 21 | B | Example |
| 22 | 22 | C | Example |
| 23 | 23 | B | Example |
| 24 | 24 | A | Example |
| 25 | 25 | A | Example |
| 26 | 26 | A | Example |
| 27 | 27 | A | Example |

TABLE 10

| Developer | Adhesive particle | Adhesion | Remarks |
|---|---|---|---|
| 28 | 28 | A | Example |
| 29 | 29 | A | Example |
| 30 | 30 | B | Example |
| 31 | 31 | B | Example |

TABLE 11

| Developer | Adhesive particle | Adhesion | Remarks |
|---|---|---|---|
| 50 | 50 | A | Example |
| 51 | 51 | A | Example |
| 52 | 52 | A | Example |
| 53 | 53 | A | Example |
| 54 | 54 | A | Example |
| 55 | 55 | A | Example |

Preparation of Resin Particle for Core Portion
Preparation of Resin Particle Dispersion for Core Portion (A1)

Styrene: 440 parts by weight
n-butyl acrylate: 130 parts
Acrylic acid: 20 parts
Dodecanethiol: 5 parts The above components are mixed and dissolved to prepare a solution A.

On the other hand, 10 parts of an anionic surfactant (DOWFAX 2A1, manufactured by The Dow Chemical Company) is dissolved in 250 parts of ion-exchanged water, and the solution A is added thereto, dispersed, and emulsified in a flask (monomer emulsion A).

Furthermore, 1 part of an anionic surfactant (DOWFAX 2A1, manufactured by The Dow Chemical Company) is dissolved in 555 parts of ion-exchanged water and charged into a polymerization flask. A reflux tube is installed in the polymerization flask, and the polymerization flask is heated to 75° C. in a water bath with stirring slowly while introducing nitrogen.

9 parts of ammonium persulfate is dissolved in 43 parts of ion-exchanged water, the resultant is added dropwise into the polymerization flask charged with an anionic surfactant aqueous solution via a metering pump over 20 minutes, and then the monomer emulsion A is added dropwise over 200 minutes via the metering pump.

Thereafter, the temperature of the polymerization flask is held at 75° C. for 3 hours while continuously stirring to complete the first polymerization. As a result, a resin particle dispersion for core portion (A1) precursor, in which styrene resin particles having a volume average particle diameter of 195 nm, a glass transition temperature of 53° C., and a weight average molecular weight of 32,000 are dispersed, is obtained.

Next, after the temperature is lowered to room temperature (25° C.), 240 parts of 2-ethyl hexyl acrylate, 160 parts of n-butyl acrylate, 7 parts of decanethiol, and 1,200 parts of ion-exchanged water are added in a polymerization flask containing the resin particle dispersion for core portion (A1) precursor, and the mixture is slowly stirred for 2 hours. Then, the mixture is heated up at 70° C. while continuously stirring, and 4.5 parts of ammonium persulfate and 100 parts of ion-exchanged water are added dropwise thereto over 20 minutes via the metering pump. Thereafter, the resultant is kept with stirring for 3 hours to complete the polymerization. Through the above processes, the resin particle dispersion for core portion (A1), in which the composite resin particles having a volume average particle diameter of 240 nm, a weight average molecular weight of 133,000, and a number average molecular weight of 18,000 are dispersed, provided that the solid content is adjusted to 30% by weight by adding the ion-exchanged water, is obtained.

The resin particles of the obtained resin particle dispersion for core portion (A1) are dried, and the dried resin particles are embedded in an epoxy resins, thereby preparing a sample. Then, the sample is cut with a diamond knife and a cross section of the resin particle is exposed. The cross section of the sample is dyed in ruthenium tetroxide vapor and then checked by observation with a transmission electron microscope. As a result of observation of the cross section of the resin particle, it is confirmed that the resin particle has a configuration in which a plurality of domains of (meth)acrylate resin having a low Tg are dispersed in a high Tg styrene resin as a base material.

Further, when the glass transition temperature Tg behavior of the dried resin particles is measured with a differential scanning calorimeter (DSC) manufactured by Shimadzu Corporation at a temperature from −150° C. to 100° C., the glass transition due to the low Tg (meth)acrylate resin at −59° C. is observed. Moreover, the glass transition by a high Tg styrene resin is observed at 53° C. (glass transition temperature difference: 112° C.).

Preparation of Resin Particle Dispersion for Core Portion (A2 to A5)

Resin particle dispersions for core portion (A2) to (A5), in which the composite resin particle having a volume average particle diameter of 200 nm to 240 nm are dispersed, provided that the solid content is adjusted to 30% by weight by adding ion-exchanged water, is obtained in the same manner as in the preparation of the resin particle dispersion for core portion (A1) except that in the preparation of the resin particle dispersion for core portion (A1) precursor, the amount of dodecanethiol added is changed as shown in Table 12, and the amounts of 2-ethyl hexyl acrylate and n-butyl acrylate added after preparing the resin particle dispersion for core portion (A1) precursor are changed as shown in Table 12.

Table 12 shows the weight average molecular weight, the number average molecular weight, and the glass transition temperature difference of the composite resin particles contained in the resin particle dispersions for core portion (A2) to (A5).

TABLE 12

| Resin particle dispersion for core portion | 2-ethyl hexyl acrylate | n-butyl acrylate | Dodecanethiol | Weight average molecular weight | Number average molecular weight | Difference in glass transition temperature |
|---|---|---|---|---|---|---|
| (A1) | 240 parts | 160 parts | 7 parts | 133,000 | 18,000 | 112° C. |
| (A2) | 380 parts | 20 parts | 10 parts | 110,000 | 15,000 | 120° C. |
| (A3) | 320 parts | 80 parts | 25 parts | 125,000 | 17,000 | 116° C. |
| (A4) | 200 parts | 200 parts | 20 parts | 135,000 | 19,000 | 111° C. |
| (A5) | 80 parts | 320 parts | 30 parts | 142,000 | 21,000 | 109° C. |

Preparation of Resin Particle Dispersion for Shell Portion
Preparation of Resin Particle Dispersion for Shell Portion (B1)

Styrene: 450 parts by weight
n-butyl acrylate: 135 parts
Acrylic acid: 10 parts
Dodecanethiol: 5 parts The above components are mixed and dissolved to prepare a solution B.

On the other hand, 10 parts of an anionic surfactant (DOWFAX 2A1, manufactured by The Dow Chemical Company) is dissolved in 250 parts of ion-exchanged water, and the solution B is added thereto, dispersed, and emulsified in the flask (monomer emulsion B).

Furthermore, 1 part of an anionic surfactant (DOWFAX 2A1, manufactured by The Dow Chemical Company) is dissolved in 555 parts of ion-exchanged water and the resultant is charged into a polymerization flask. A reflux tube is installed in the polymerization flask, and the polymerization flask is heated to 75° C. in a water bath with stirring slowly while introducing nitrogen.

9 parts of ammonium persulfate is dissolved in 43 parts of ion-exchanged water and added dropwise into the polymerization flask charged with an anionic surfactant aqueous solution via a metering pump over 20 minutes, and then the monomer emulsion B is added dropwise thereto over 200 minutes via the metering pump.

Thereafter, the polymerization flask is held at 75° C. for 3 hours while continuously stirring to complete the first polymerization. As a result, the resin particle dispersion for shell portion (B1) in which the styrene resin particles having a volume average particle diameter of 200 nm, a glass transition temperature of 53° C., a weight average molecular weight of 33,000, and a number average molecular weight of 15,000 are dispersed, provided that the solid content is adjusted to 30% by weight by adding the ion-exchanged water, is obtained.

Preparation of Release Agent Dispersion
Preparation of Release Agent Dispersion (1)

Fischer-Tropsch wax: 270 parts
 (trade name: FNP-0090, manufactured by Nippon Seiro Co., Ltd., melting temperature=90° C.)
Anionic surfactant: 1.0 part
 (NEOGEN RK, manufactured by Dai-Ichi Kogyo Seiyaku Co., Ltd.)
Ion-exchanged water: 400 parts The above-described materials are mixed with each other, the mixture is heated at 95° C., is dispersed by using a homogenizer (ULTRA TURRAX T50, manufactured by IKA Ltd.), and then is subjected to a dispersing treatment for 360 minutes by using Manton-Gaulin high pressure homogenizer (manufactured by Manton Gaulin Mfg Company Inc), thereby preparing a release agent dispersion (1) (solid content: 20% by weight) in which release agent particles having a volume average particle diameter of 0.23 μm are dispersed.

Preparation of Transparent Adhesive Particle
Preparation of Transparent Adhesive Particle (A1)

Resin particle dispersion for core portion (A1): 600 parts
Release agent dispersion (1): 10 parts
Colloidal silica aqueous solution: 13 parts
 (SNOWTEX OS, manufactured by Nissan Chemical Industries, Ltd.)
Ion-exchanged water: 1,000 parts
Anionic surfactant: 1 part
 (DOWFAX 2A1, manufactured by The Dow Chemical Company)

The above-described components as core portion forming materials are put into a 3-liter reaction container equipped with a thermometer, a pH meter, and a stirrer, and at a temperature of 25° C., 1.0% by weight of nitric acid is added thereto to adjust the pH to 3.0. Then, 4 parts of the prepared 10% by weight of polyaluminum chloride aqueous solution is added thereto and dispersed for another 6 minutes while dispersing at 5,000 rpm with a homogenizer (ULTRA TURRAX T50, manufactured by IKA Japan Co., Ltd.).

After that, a stirrer and a mantle heater are installed in the reaction container, and the temperature is increased up to a temperature of 40° C. at a rate of temperature increase of 0.2° C./min, and increased at a rate of temperature increase of 0.05° C./min after the temperature exceeds 40° C. while adjusting the number of revolutions of the stirrer to sufficiently stir the slurry, and the particle diameter is measured every 10 minutes with COULTER MULTISIZER II (aperture diameter of 50 μm, manufactured by Beckman Coulter, Inc.). When the volume average particle diameter reaches 7.5 μm, the temperature is held, and 115 parts of the resin particle dispersion for shell portion (B1) is charged as a shell portion forming material over 5 minutes. After holding the temperature for 30 minutes, the pH is adjusted to 6.0 with a 1% by weight aqueous sodium hydroxide solution. Thereafter, in the same way, the temperature is increased up to 90° C. at a rate of temperature increase of 1° C./min while adjusting the pH to 6.0 every 5° C., and held at 96° C. When a particle shape and surface properties are observed with an optical microscope and a field emission scanning electron microscope (FE-SEM), the coalescence of the particles is confirmed after 2.0 hours from the start for holding the temperature at 96° C., and thus the container is cooled to 30° C. over 5 minutes with cold water.

The cooled slurry is passed through a nylon mesh having an opening of 30 μm to remove coarse powder, and the adhesive particle slurry having passed through the mesh is filtered under the reduced pressure with an aspirator. The adhesive particle remaining on the filter paper is crushed as finely as possible by hand, charged into ion-exchanged water whose amount is 10 times the adhesive particle amount at a temperature of 30° C., and stirred for 30 minutes. Subsequently, the mixture is filtered under reduced pressure with an aspirator, and the adhesive particle remaining on the filter paper is crushed as finely as possible by hand, is charged into ion-exchanged water whose amount is 10 times the adhesive particle amount at a temperature of 30° C., stirred and mixed for 30 minutes, then is filtered under the reduced pressure again with the aspirator, and the filtrate is measured for the electrical conductivity. This operation is repeated until the electric conductivity of the filtrate is 10 S/cm or less, and then the resulting adhesive particle is washed. The washed adhesive particle is finely pulverized with a wet dry granulator (Comil) and vacuum dried in a drier at 25° C. for 36 hours, thereby obtaining an adhesive particle (A1). The obtained transparent adhesive particle (A1) has a volume average particle diameter of 8.5 μm, a weight average molecular weight of 125,000, and a number average molecular weight of 17,000.

When the cross section of the transparent adhesive particle (A1) is observed with a scanning electron microscope (SEM), a sea-island structure is observed. The transparent adhesive particle (A1) has a core portion where an island phase is present and a shell layer where no island phase is present. A sea phase contains a styrene resin, and the island phase contains a (meth)acrylate resin. The average diameter of the island phase is determined by the measurement method described above. Table 13 shows the average diameter of the island phase.

Preparation of Transparent Adhesive Particles (A2) to (A5)

Transparent adhesive particles (A2) to (A6) are prepared respectively in the same manner as in the preparation of the transparent adhesive particle (A1) except that the resin particle dispersion for core portion indicated in Table 13 is used instead of the resin particle dispersion for core portion (A1).

Table 13 shows the results obtained by measuring the weight average molecular weight, the number average molecular weight, the temperature T2, the temperature difference (T1–T2), and the average diameter of the island phase in the transparent adhesive particles (A2) to (A6).

TABLE 13

| Transparent adhesive particle | Resin particle dispersion for core portion | Volume average particle diameter (μm) | Weight average molecular weight | Number average molecular weight | Average diameter of island phase (nm) |
|---|---|---|---|---|---|
| (A1) | (A1) | 8.5 | 125,000 | 17,000 | 250 |
| (A2) | (A2) | 11.7 | 105,000 | 14,000 | 300 |
| (A3) | (A3) | 12.1 | 120,000 | 17,000 | 330 |
| (A4) | (A4) | 13.8 | 130,000 | 18,000 | 420 |
| (A5) | (A5) | 11.0 | 135,000 | 20,000 | 390 |

Preparation of Surface-Treated Titanium Oxide Particle
Preparation of Surface-Treated Titanium Oxide (T1)

200 ml of methanol is charged into a 1-L beaker, 10 g of STT100 (STT100: manufactured by Titan Kogyo, Ltd., average primary particle diameter of 30 nm) is added, and after ultrasonic dispersion for 2 minutes, the mixture is stirred with a stirrer for 10 minutes. 1 g of dimethyl dimethoxysilane as a surface treating agent is added to the dispersion and further stirred for 60 minutes. Thereafter, the dispersion is subjected to suction filtration for solid-liquid separation, and a separated titanium oxide particle cake is heated in a chamber at 120° C. for 60 minutes to be reacted. The solidified titanium oxide particle is crushed by a planetary ball mill to obtain a surface-treated titanium oxide particle (T1). The results are shown in Table 14.

Preparation of Surface-Treated Titanium Oxide (T2) to (T6)

Surface-treated titanium oxide particles (T2) to (T6) are obtained in the same manner as in the preparation of the surface-treated titanium oxide particle (T1) except that the average primary particle diameter, the surface treatment agent, and the treatment amount are changed to those indicated in Table 14.

TABLE 14

| No. | Titanium oxide Trade name | Average primary particle diameter (nm) | Surface treatment agent | Treated amount (%) |
|---|---|---|---|---|
| T1 | STT100 (manufactured by Titan Kogyo. Ltd.) | 30 | Dimethyldimethoxysilane | 10 |
| T2 | MT150A (manufactured by Tayca Corporation) | 15 | Hexamethyldisilazane | 15 |
| T3 | MT500 (manufactured by Tayca Corporation) | 35 | Dimethyldiethoxysilane | 15 |

TABLE 14-continued

| No. | Titanium oxide Trade name | Average primary particle diameter (nm) | Surface treatment agent | Treated amount (%) |
|---|---|---|---|---|
| T4 | MT600 (manufactured by Tayca Corporation) | 50 | Modified silicone X-22-343 | 10 |
| T5 | MT700B (manufactured by Tayca Corporation) | 80 | Dimethyldiethoxysilane | 7 |
| T6 | JR405 (manufactured by Tayca Corporation) | 210 | Modified silicone X-22-343 | 5 |

Preparation of External Additive Transparent Adhesive Particle
Preparation of External Additive Transparent Adhesive Particle (A1)

Next, with respect to 100 parts of the obtained transparent adhesive particle (1), 1.0 part of hydrophobic silica (RY50, manufactured by Nippon Aerosil Co., Ltd., average primary particle diameter of 40 nm) and 1.5 parts of the surface-treated titanium oxide particle T1 are added, and mixed for 30 seconds at 13,000 rpm using a sample mill.

Thereafter, the adhesive particle (A1) is prepared by sieving with a vibrating sieve having an opening of 45 μm to prepare an external additive transparent adhesive particle (A1).

The volume average particle diameter of the obtained external additive transparent adhesive particle (A1) is 8.5 μm.

Further, when T1 and T2 in the external additive transparent adhesive particle (A1) are obtained by the above-described measurement method, the external additive transparent adhesive particle (A1) satisfies Expression 1: $10°C. \leq T1-T2$.

Preparation of Transparent Developer
Preparation of Transparent Developer (A1)

8 parts of external additive transparent adhesive particle (A1) and 100 parts of the following carrier (1) are mixed with a V blender, thereby preparing a transparent developer (A1).

Preparation of Carrier (1)
  Ferrite particle (average particle diameter: 36 μm): 100 parts
  Toluene: 14 parts
  Styrene-methyl methacrylate copolymer: 2 parts
  (Component ratio: 90/10, Mw=80000)
  Carbon black (manufactured by Cabot, R330): 0.2 parts First, the above components excluding ferrite particles are stirred with a stirrer for 10 minutes to prepare a dispersed coating solution, and then this coating solution and the ferrite particles are put into a vacuum degassing type kneader, stirred at 60° C. for 30 minutes, and degassed by further depressurization while being heated, and the resultant is dried to obtain a carrier.

Preparation of Transparent Developers (A2) to (A12)

Transparent developers (A2) to (A12) are prepared in the same manner as in the preparation of the transparent developer (A1) except that an external additive transparent adhesive particle containing adhesive particles and surface-treated titanium oxide particles indicated in Table 15 is used instead of the external additive transparent adhesive particle (A1).

Next, the preparation of a developer containing various colored adhesive particles used in the exemplary embodiment (hereinafter, also referred to as "colored developer") will be described.

Preparation of Colored Adhesive Particle
Preparation of Release Agent Dispersion
Crystalline Polyester Resin Dispersion (A)

A monomer component composed of 100 mol % of dimethyl sebacate and 100 mol % of nonanediol, and 0.4 parts of dibutyltin oxide as a catalyst with respect to 100 parts of the monomer component are put into a heat-dried three-neck flask, then the air in the container is brought into an inert atmosphere with nitrogen gas by reducing the pressure, and the mixture is stirred and refluxed at 180° C. for 4 hours with mechanical stirring.

Thereafter, the temperature is slowly raised to 230° C. under reduced pressure, and the mixture is stirred for two hours. When it becomes in a viscous state, it is air-cooled, the reaction is stopped, and thereby a crystalline polyester resin (1) is synthesized. In molecular weight measurement (polystyrene conversion) by gel permeation chromatography, the weight average molecular weight (Mw) of the obtained crystalline polyester resin (1) is 15,800, the number average molecular weight (Mn) is 3800, and the acid value is 13.2 mgKOH/g.

Further, as a result of measuring the melting point (Tm) of the crystalline polyester resin (1) using a differential scanning calorimeter (DSC), a clear endothermic peak is indicated, and the endothermic peak temperature is 77.0° C.

Next, a resin particle dispersion is prepared using the crystalline polyester resin (1).
  Crystalline polyester resin (1): 90 parts
  Ionic surfactant (NEOGEN RK, manufactured by Dai-Ichi Kogyo Seiyaku Co., Ltd.): 1.8 parts
  Ion-exchanged water: 210 parts The above components are mixed to each other, heated to 100° C., dispersed with a homogenizer (ULTRA TURRAX T50, manufactured by IKA), heated to 110° C. and dispersed for 1 hour with a pressure discharge type gorin homogenizer, thereby obtaining a crystalline polyester resin dispersion (A) having a volume average particle diameter of 210 nm and a solid content of 30.0%.

Amorphous Polyester Resin Dispersion (A)
  Bisphenol A propylene oxide adduct: 80 mol %
  Bisphenol A ethylene oxide 2-mol adduct: 20 mol %
  Terephthalic acid: 60 mol %
  Fumaric acid: 20 mol %
  Dodecenyl succinic anhydride: 20 mol %

The monomer components at the above ratios are charged into a 5-liter flask equipped with a stirrer, a nitrogen inlet tube, a temperature sensor, and a rectifying column, and the temperature is increased up to 190° C. for 1 hour, and after confirming that the mixture is thoroughly stirred in a reaction system, 1.2 parts of dibutyltin oxide with respect to 100 parts of the monomer components are charged therein. Further, the temperature is increased up to 240° C. over 6 hours from the same temperature while distilling off the generated water, and a dehydration condensation reaction is continued at 240° C. for another 2 hours, thereby obtaining an amorphous polyester resin (1) having a glass transition point of 63° C., an acid value of 10.5 mgKOH/g, a weight average molecular weight of 18,000, and a number average molecular weight of 4,200.

Next, a resin particle dispersion is prepared using the amorphous polyester resin (1).

Amorphous polyester resin (1): 100 parts
Ethyl acetate: 50 parts

Ethyl acetate is charged into a 5-liter separable flask, and then the resin component is slowly charged, stirred with a three-one motor, and completely dissolved to obtain an oil phase. To this stirred oil phase, 10% ammonia aqueous solution is slowly added dropwise with a dropper so that the total amount becomes 2 parts, and 230 parts of ion-exchanged water is slowly added dropwise at a speed of 10 ml/min for phase inversion emulsification. Further, a solvent is removed while reducing the pressure with an evaporator, thereby obtaining an amorphous polyester resin dispersion (A). The volume average particle diameter of the amorphous polyester resin particles in this dispersion is 120 nm, and the solid content concentration is adjusted to 30% by adding ion-exchanged water.

Amorphous Polyester Resin Dispersion (B)
Bisphenol A propylene oxide adduct: 50 mol %
Bisphenol A ethylene oxide 2-mol adduct: 50 mol %
Trimellitic anhydride: 5 mol %
Terephthalic acid: 85 mol %
Dodecenyl succinic anhydride: 10 mol %

Using monomers except for trimellitic anhydride among the monomer components at the above ratios, the reaction is continued until the softening point reaches 110° C. in accordance with the synthesis of the amorphous polyester resin (3). Subsequently, the temperature is decreased to 190° C., 5 mol % of trimellitic anhydride is slowly charged, and the reaction is continued for 2 hours at the same temperature, thereby obtaining an amorphous polyester resin (2) having a glass transition point of 63° C., an acid value of 14.8 mgKOH/g, a weight average molecular weight of 48,000, and a number average molecular weight of 7,000. Next, a resin particle dispersion is prepared using the amorphous polyester resin (2).

An amorphous polyester resin dispersion (B) is obtained based on the preparation of the amorphous polyester resin dispersion (A) except for using the amorphous polyester resin (2) instead of the amorphous polyester resin (1) in the preparation of the amorphous polyester resin dispersion (A). The volume average particle diameter of the amorphous polyester resin particles in this dispersion is 220 nm, and the solid content concentration is adjusted to 30% by adding ion-exchanged water.

Coloring Agent Particle Dispersion 1
Carbon black (manufactured by Cabot, Regal 330): 50 parts
Anionic surfactant (manufactured by NOF Corporation, NUREX R): 2 parts
Ion-exchanged water: 198 parts The above components are mixed and pre-dispersed for 10 minutes with a homogenizer (ULTRA TURRAX, manufactured by IKA), and then the mixture is dispersed using an optimizer (anti-collision type wet pulverizer, Sugino Machine Limited Co., Ltd.) for 15 minutes at a pressure of 245 MPa, thereby obtaining a coloring agent particle dispersion 1 having a volume average particle diameter of the coloring agent particles of 354 nm and a solid content of 20.0%.

Coloring Agent Particle Dispersion 2
Blue pigment (copper phthalocyanine B15: 3, manufactured by Dainichiseika Color & Chemicals): 50 parts
Ionic surfactant (NEOGEN RK, manufactured by Dai-Ichi Kogyo Seiyaku Co., Ltd.): 5 parts
Ion-exchanged water: 195 parts The above components are mixed and dispersed for 10 minutes with a homogenizer (ULTRA TURRAX, manufactured by IKA), and then the mixture is dispersed using an optimizer (anti-collision type wet pulverizer, Sugino Machine Limited Co., Ltd.) for 15 minutes at a pressure of 245 MPa, thereby obtaining a coloring agent particle dispersion 2 having a volume average particle diameter of the coloring agent particles of 462 nm and a solid content of 20.0%.

Coloring Agent Particle Dispersion 3
Magenta pigment (C.I. Pigment Red 122): 80 parts
Anionic surfactant (NEOGEN SC, manufactured by Dai-Ichi Kogyo Seiyaku Co., Ltd.): 8 parts
Ion-exchanged water: 200 parts The above components are mixed, dissolved, and dispersed for 10 minutes using a homogenizer (ULTRA TURRAX T50, manufactured by IKA), and then the mixture is irradiated with 28 kHz ultrasonic waves for 10 minutes using an ultrasonic disperser, thereby obtaining a coloring agent particle dispersion 3 having a volume average particle diameter of 132 nm and a solid content of 29.0%.

Coloring Agent Particle Dispersion 4
Yellow pigment (5GX03, manufactured by Clariant Japan K.K.): 80 parts
Anionic surfactant (NEOGEN SC, manufactured by Dai-Ichi Kogyo Seiyaku Co., Ltd.): 8 parts
Ion-exchanged water: 200 parts The above components are mixed, dissolved, and dispersed for 10 minutes using a homogenizer (ULTRA TURRAX T50, manufactured by IKA), and then the mixture is irradiated with 28 kHz ultrasonic waves for 20 minutes using an ultrasonic disperser, thereby obtaining a coloring agent particle dispersion 4 having a volume average particle diameter of 108 nm and a solid content of 29.0%.

Release Agent Particle Dispersion
Olefin wax (melting point: 88° C.): 90 parts
Ionic surfactant (NEOGEN RK, manufactured by Dai-Ichi Kogyo Seiyaku Co., Ltd.): 1.8 parts
Ion-exchanged water: 210 parts The above components are mixed to each other, heated to 100° C., dispersed with a homogenizer (ULTRA TURRAX T50, manufactured by IKA), heated to 110° C. and dispersed for 1 hour with a pressure discharge type gorin homogenizer, thereby obtaining a release agent particle dispersion 1 having a volume average particle diameter of 180 nm and a solid content of 30.0%.

Preparation of Colored Toner 1
Preparation of Black Toner 1
Black Toner Particle 1
Amorphous polyester resin dispersion (A): 166 parts
Crystalline polyester resin dispersion (A): 50 parts
Coloring agent particle dispersion 1: 25 parts
Release agent particle dispersion 1: 40 parts The above components are mixed and dispersed with a homogenizer (ULTRA TURRAX T50) in around stainless steel flask. Next, 0.20 parts of polyaluminum chloride is added thereto, and a dispersion operation is continued with an Ultra Talux T50. The flask is heated to 48° C. with stirring in an oil bath for heating. After holding the temperature at 48° C. for 60 minutes, 60 parts of the amorphous polyester resin dispersion (A) is slowly added. Thereafter, the pH of the system is adjusted to 8.0 with a 0.5 mol/l sodium hydroxide aqueous solution, and then the stainless steel flask is sealed, heated to 90° C. while stirring is continued using a magnetic seal, and the temperature is held for 3 hours.

After completion of the reaction, the mixture is cooled, filtered, washed with ion-exchanged water, and then subjected to solid-liquid separation by Nutsche suction filtration. The mixture is further dispersed again in 1-liter of ion-exchanged water at 40° C., and stirred and washed at 300 rpm for 15 minutes. This operation is repeated five more times, and when the pH of the filtrate is 7.5 and the electrical conductivity is 7.0 S/cm, solid-liquid separation is performed using No 5A filter paper by Nutsche suction filtration. Next, vacuum drying is continued for 12 hours to obtain a black toner particle 1.

When the particle diameter of the black toner particle 1 is measured with COULTER MULTISIZER II, the volume average particle diameter D50 is 6.4 μm and the volume particle diameter distribution index GSDv is 1.21.

External Addition Treatment 100 parts of black toner particles 1, 0.8 part of hydrophobic titania treated with decylsilane having an average particle diameter of 15 nm, and 1.3 parts of hydrophobic silica (NY50, manufactured by Nippon Aerosil Co., Ltd.) having an average particle diameter of 30 nm are mixed. Then, after blending for 10 minutes at a peripheral speed of 32 μm/s using a HENSCHEL mixer, coarse particles are removed using a sieve of 45 μm mesh to obtain a black toner 1.

Preparation of Carrier

Ferrite particle (volume average particle diameter: 50 μm, volume resistivity: 108 Ωcm): 100 parts minutes, thereby preparing a film forming solution. The film forming solution and the ferrite particle are put into a vacuum degassing kneader and stirred at 60° C. for 30 minutes, and then the pressure is reduced to distill off toluene, thereby forming a resin film on a ferrite particle surface so as to prepare a carrier.

Preparation of Colored Developer

Preparation of Black Developer 1

94 parts of carrier and 6 parts of black toner 1 are mixed, stirred for 20 minutes at 40 rpm using a V-blender, and sieved through a sieve having a 177 μm mesh, thereby preparing a black developer 1.

Preparation of Each Colored Developer

Each color toner particle 1 is obtained according to the preparation of the black toner particle 1 except that the coloring agent particle dispersion 1, the crystalline polyester resin dispersion, and the amorphous polyester resin dispersion (A) are changed in the preparation of the black toner particle 1. In addition, each colored developer is obtained by performing the external addition treatment and preparation of the developer in the same manner, except that the black toner particle 1 is changed to other toner particles. The results are shown in Table 15.

In addition, in the column of the amorphous polyester resin dispersion (A) and the amorphous polyester resin dispersion (B) in Table 15, the number of parts indicated on the left side of the reference numeral "+" indicates the number of parts to be blended in advance in the round stainless steel flask, and the number of parts indicated on the right side of the reference numeral "+" indicates the number of parts to be added to the round stainless steel flask described above after the mixing and dispersing operation.

TABLE 15

| Developer | Toner particle | Coloring agent particle dispersion Kinds | Addition amount (parts) | Crystalline polyester resin dispersion (A) | Amorphous polyester resin dispersion (A) | Amorphous polyester resin dispersion (B) | Volume average particle diameter (μm) | Volume particle diameter distribution index |
|---|---|---|---|---|---|---|---|---|
| Black developer 1 | Black toner particle 1 | Coloring agent particle dispersion | 25 parts | 50 parts | 166 parts + 60 parts | — | 6.4 | 1.21 |
| Black developer 2 | Black toner particle 2 | Coloring agent particle dispersion | 25 parts | 50 parts | 80 parts + 30 parts | 80 parts + 30 parts | 6.0 | 1.21 |
| Cyan developer 2 | Cyan toner particle 2 | Coloring agent particle dispersion 2 | 20 parts | 50 parts | 80 parts + 30 parts | 80 parts + 30 parts | 6.2 | 1.21 |
| Magenta developer 2 | Magenta toner particle 2 | Coloring agent particle dispersion 3 | 25 parts | 50 parts | 80 parts + 30 parts | 80 parts + 30 parts | 6.0 | 1.22 |
| Yellow developer 2 | Yellow toner particle 2 | Coloring agent particle dispersion 4 | 25 parts | 50 parts | 80 parts + 30 parts | 80 parts + 30 parts | 6.2 | 1.21 |
| Black developer 3 | Black toner particle 3 | Coloring agent particle dispersion 1 | 25 parts | 50 parts | 50 parts + 20 parts | 110 parts + 40 parts | 6.3 | 1.22 |
| Cyan developer 3 | Cyan toner particle 3 | Coloring agent particle dispersion 2 | 20 parts | 50 parts | 50 parts + 20 parts | 110 parts + 40 parts | 6.0 | 1.22 |
| Magenta developer 3 | Magenta toner particle 3 | Coloring agent particle dispersion 3 | 25 parts | 50 parts | 50 parts + 20 parts | 110 parts + 40 parts | 6.1 | 1.21 |
| Yellow developer 3 | Yellow toner particle 3 | Coloring agent particle dispersion 4 | 25 parts | 50 parts | 50 parts + 20 parts | 110 parts + 40 parts | 6.4 | 1.22 |

Toluene: 14 parts

Perfluorooctylethyl acrylate/methyl methacrylate copolymer (copolymerization ratio: 40/60, Mw: 50,000): 1.6 parts Carbon black (VXC-72, manufactured by Cabot): 0.12 parts Cross-linked melamine resin particle (number average particle diameter: 0.3 μm): 0.3 part Among the above components, components other than the ferrite particles are mixed and dispersed with a stirrer for 10

Evaluation

The obtained transparent developer (that is, transparent developers (A1) to (A10) and (A12)) is supplied to a fifth developer unit of a COLOR1000 PRESS remodeling machine manufactured by Fuji Xerox Co., Ltd., in which first to fourth developing devices are preliminarily filled with cyan, magenta, yellow, and black colored electrostatic charge image developers.

A recording sheet (OK Prince fine paper, manufactured by Oji Paper Co., Ltd.), with a fixing temperature of 170° C.

and a fixing pressure of 4.0 kg/cm², a loading amount of transparent adhesive particle of 3 g/m², and an image (area density of 30%) having mixed text and a photo-image is formed and fixed on the recording sheet. As the order of arrangement of the toner images, the transparent adhesive particle area is disposed on the colored toner image.

The fixed image is folded so that the image-fixed surfaces overlap with each other, and are pressure-bonded using a pressure-bonding sealer PRESSELE LEADA (manufactured by Toppan Forms Co., Ltd.) to produce a pressure-bonded printed matter. The temperature at the time of pressure bonding is 20° C., and the pressure is 90 MPa.

The adhesion of the obtained pressure-bonded printed matter is evaluated after being left for 1 day at 20° C. and 50% humidity. Evaluation of the adhesion between adhesive particle layers of the printed matter is performed by preparing a rectangular sample having a width of 15 mm by cutting the pressure-bonded printed matter in the long side direction, and measuring the peeling strength by a 90-degree peeling method. The peeling speed of the 90-degree peel test is 20 mm/min, and after starting the measurement, a load (N) from 10 mm to 50 mm is sampled at intervals of 0.4 mm, the average is calculated, and loads (N) of three test pieces are averaged. The results are shown in Table 16.

8 parts of an anionic surfactant (DOWFAX 2A1 manufactured by The Dow Chemical Company) is dissolved in 205 parts of ion-exchanged water, and the monomer solution is added, dispersed, and emulsified to obtain an emulsion.

2.2 parts of an anionic surfactant (DOWFAX 2A1, manufactured by The Dow Chemical Company) is dissolved in 462 parts of ion-exchanged water, and charged into a polymerization flask equipped with a stirrer, a thermometer, a reflux condenser, and a nitrogen gas introduction pipe, and the mixture is heated up to 73° C. and the temperature is held with stirring.

3 parts of ammonium persulfate is dissolved in 21 parts of ion-exchanged water and added dropwise into a polymerization flask via a metering pump over 15 minutes, and then the emulsion is added dropwise over 160 minutes via the metering pump.

Next, the temperature of the polymerization flask is held at 75° C. for 3 hours while stirring slowly, and then is returned to room temperature.

With this, a styrene resin particle dispersion (St1) which contains a styrene resin particle, a volume average particle diameter (D50v) of the resin particle of 174 nm, a weight average molecular weight by GPC (UV detection) of 49,000, a glass transition temperature of 54° C., and a solid content of 42% is obtained.

TABLE 16

| | Developer | | | | Transparent | Surface-treated | External addition | Adhesion Peeling |
| --- | --- | --- | --- | --- | --- | --- | --- | --- |
| | Black developer | Cyan developer | Magenta developer | Yellow developer | Fifth developer unit | adhesive particle | titanium oxide | amount (parts) | strength (N) |
| Example 1 | Black developer 2 | Cyan developer 2 | Magenta developer 2 | Yellow developer 2 | Transparent developer (A1) | A1 | T1 | 1.5 | 1.0 |
| Example 2 | Black developer 3 | Cyan developer 3 | Magenta developer 3 | Yellow developer 3 | Transparent developer (A2) | A1 | T2 | 1.2 | 0.8 |
| Example 3 | Black developer 2 | Cyan developer 2 | Magenta developer 2 | Yellow developer 2 | Transparent developer (A3) | A1 | T3 | 1.2 | 0.8 |
| Example 4 | Black developer 3 | Cyan developer 3 | Magenta developer 3 | Yellow developer 3 | Transparent developer (A4) | A1 | T4 | 1.8 | 0.7 |
| Example 5 | Black developer 2 | Cyan developer 2 | Magenta developer 2 | Yellow developer 2 | Transparent developer (A5) | A1 | T5 | 2 | 0.8 |
| Example 6 | Black developer 3 | Cyan developer 3 | Magenta developer 3 | Yellow developer 3 | Transparent developer (A7) | A2 | T1 | 1.5 | 0.7 |
| Example 7 | Black developer 2 | Cyan developer 2 | Magenta developer 2 | Yellow developer 2 | Transparent developer (A8) | A3 | T1 | 1.2 | 0.7 |
| Example 8 | Black developer 3 | Cyan developer 3 | Magenta developer 3 | Yellow developer 3 | Transparent developer (A9) | A4 | T1 | 1.4 | 0.9 |
| Example 9 | Black developer 3 | Cyan developer 3 | Magenta developer 3 | Yellow developer 3 | Transparent developer (A10) | A5 | T1 | 1.4 | 1.0 |
| Example 10 | Black developer 3 | Cyan developer 3 | Magenta developer 3 | Yellow developer 3 | Transparent developer (A12) | A1 | T6 | 1.2 | 0.5 |

Preparation of Dispersion Containing Styrene Resin Particle
Preparation of Styrene Resin Particle Dispersion (St1)
  Styrene: 390 parts by weight
  n-butyl acrylate: 100 parts
  Acrylic acid: 10 parts
  Dodecanethiol: 7.5 parts The above materials are mixed and dissolved to prepare a monomer solution.

The styrene resin particle dispersion (St1) is dried and the styrene resin particles are taken out, and a thermal behavior is analyzed in a temperature from −100° C. to 100° C. with a differential scanning calorimeter (manufactured by Shimadzu Corporation, DSC-60A), and as a result, one glass transition temperature is observed. Table 17 shows the glass transition temperature.

Preparation of Styrene Resin Particle Dispersions (St2) to (St14)

Styrene resin particle dispersions (St2) to (St14) are prepared in the same manner as in the preparation of the styrene resin particle dispersion (St1) except that the monomers are changed as indicated in Table 17.

The composite resin particle dispersion (M1) is dried and the composite resin particles are taken out, and a thermal behavior is analyzed in a temperature from −150° C. to 100° C. with a differential scanning calorimeter (manufactured by Shimadzu Corporation, DSC-60A), and as a result, two glass transition temperatures are observed. Table 18 shows the glass transition temperature.

TABLE 17

(k)

| No. | Polymerization component (weight ratio) | | | | | | | | $D50_v$ of resin particle nm | Mw | Tg ° C. |
|---|---|---|---|---|---|---|---|---|---|---|---|
| | St | BA | 2EHA | EA | 4HBA | AA | MAA | CEA | | | |
| St1 | 78 | 20 | 0 | 0 | 0 | 2 | 0 | 0 | 174 | 49000 | 54 |
| St2 | 88 | 10 | 0 | 0 | 0 | 2 | 0 | 0 | 170 | 50000 | 76 |
| St3 | 83 | 15 | 0 | 0 | 0 | 2 | 0 | 0 | 172 | 52000 | 65 |
| St4 | 78 | 20 | 0 | 0 | 0 | 0 | 2 | 0 | 177 | 48000 | 57 |
| St5 | 80 | 15 | 0 | 0 | 5 | 0 | 0 | 0 | 172 | 46000 | 55 |
| St6 | 80 | 15 | 5 | 0 | 0 | 0 | 0 | 0 | 174 | 51000 | 54 |
| St7 | 80 | 20 | 0 | 0 | 0 | 0 | 0 | 0 | 169 | 50000 | 54 |
| St8 | 77 | 20 | 0 | 0 | 0 | 0 | 0 | 3 | 168 | 48000 | 54 |
| St9 | 72 | 26 | 0 | 0 | 0 | 2 | 0 | 0 | 172 | 55000 | 43 |
| St10 | 68 | 30 | 0 | 0 | 0 | 2 | 0 | 0 | 173 | 53000 | 35 |
| St11 | 80 | 0 | 20 | 0 | 0 | 0 | 0 | 0 | 171 | 52000 | 56 |
| St12 | 78 | 0 | 20 | 0 | 0 | 2 | 0 | 0 | 167 | 49000 | 56 |
| St13 | 63 | 0 | 0 | 35 | 0 | 2 | 0 | 0 | 169 | 51000 | 54 |
| St14 | 75 | 0 | 0 | 23 | 0 | 2 | 0 | 0 | 182 | 33000 | 53 |

Preparation of Dispersion Containing Composite Resin Particle

Preparation of Composite Resin Particle Dispersion (M1)
  Styrene resin particle dispersion (St1): 1,190 parts (solid content of 500 parts)
  2-ethyl hexyl acrylate: 250 parts
  n-butyl acrylate: 250 parts
  Ion-exchanged water: 982 parts The above materials are charged into a polymerization flask, stirred at 25° C. for 1 hour, and then heated to 70° C.

2.5 parts of ammonium persulfate is dissolved in 75 parts of ion-exchanged water and added dropwise into a polymerization flask via a metering pump over 60 minutes.

Next, the temperature of the polymerization flask is held at 70° C. for 3 hours while stirring slowly, and then is returned to room temperature.

With this, a composite resin particle dispersion (M1) which contains a styrene resin particle, a volume average particle diameter (D50v) of the resin particle of 219 nm, a weight average molecular weight by GPC (UV detection) of 219,000, and a solid content of 32% is obtained.

Preparation of Composite Resin Particle Dispersions (M2) to (M21), (M28) to (M32), and (cM1) to (cM3)

Composite resin particle dispersion (M2) to (M21), (M28) to (M32), and (cM1) to (cM3) are prepared in the same manner as in the preparation of the composite resin particle dispersion (M1) by changing the styrene resin particle dispersion (St1) as indicated in Table 18 or changing the polymerization component of the (meth)acrylate resin as indicated in Table 18.

Preparation of Composite Resin Particle Dispersions (M22) to (M27)

Composite resin particle dispersions (M22) to (M27) are prepared in the same manner as in the preparation of the composite resin particle dispersion (M1) except that the use amount of 2-ethyl hexyl acrylate and n-butyl acrylate.

TABLE 18

| Composite resin particle dispersion | | | | | Composite resin particle (or resin particle for comparison) | | | | |
|---|---|---|---|---|---|---|---|---|---|
| | St-based resin | | | | | | | | |
| No. | St-based resin particle dispersion | Polymerization component | Tg ° C. | Ac-based resin Polymerization component | Weight ratio of St-based resin to Ac-based resin (St:Ac) | $D50_v$ of resin particle nm | Mw | Tg ° C. | Tg ° C. |
| cM1 | St1 | St/BA/AA = 78/20/2 | 54 | 2EHA = 100 | 50:50 | 222 | 230000 | −50 | 54 |
| cM2 | St1 | St/BA/AA = 78/20/2 | 54 | BA = 100 | 50:50 | 225 | 220000 | −53 | 54 |
| cM3 | St12 | St/2EHA/AA = 78/20/2 | 56 | BA = 100 | 50:50 | 224 | 212000 | −53 | 56 |

TABLE 18-continued

Composite resin particle dispersion

| No. | St-based resin particle dispersion | St-based resin Polymerization component | Tg °C. | Ac-based resin Polymerization component | Weight ratio of St-based resin to Ac-based resin (St:Ac) | D50$_v$ of resin particle nm | Mw | Tg °C. | Tg °C. |
|---|---|---|---|---|---|---|---|---|---|
| M1 | St1 | St/BA/AA = 78/20/2 | 54 | 2EHA/BA = 50/50 | 50:50 | 219 | 219000 | −52 | 54 |
| M2 | St2 | St/BA/AA = 88/10/2 | 76 | 2EHA/BA = 50/50 | 50:50 | 218 | 240000 | −52 | 76 |
| M3 | St3 | St/BA/AA = 83/15/2 | 65 | 2EHA/BA = 50/50 | 50:50 | 220 | 231000 | −52 | 65 |
| M4 | St4 | St/BA/MAA = 78/20/2 | 57 | 2EHA/BA = 50/50 | 50:50 | 221 | 250000 | −52 | 57 |
| M5 | St5 | St/BA/4HBA = 80/15/5 | 55 | 2EHA/BA = 50/50 | 50:50 | 224 | 242000 | −52 | 55 |
| M6 | St6 | St/BA/2EHA = 80/15/5 | 54 | 2EHA/BA = 50/50 | 50:50 | 225 | 233000 | −52 | 54 |
| M7 | St7 | St/BA = 80/20 | 54 | 2EHA/BA = 50/50 | 50:50 | 224 | 243000 | −52 | 54 |
| M8 | St8 | St/BA/CEA = 77/20/3 | 54 | 2EHA/BA = 50/50 | 50:50 | 222 | 260000 | −52 | 54 |
| M9 | St9 | St/BA/AA = 72/26/2 | 43 | 2EHA/BA = 50/50 | 50:50 | 223 | 251000 | −52 | 43 |
| M10 | St10 | St/BA/AA = 68/30/2 | 35 | 2EHA/BA = 50/50 | 50:50 | 220 | 243000 | −52 | 35 |
| M11 | St11 | St/2EHA = 80/20 | 56 | 2EHA/BA = 50/50 | 50:50 | 221 | 249000 | −52 | 56 |
| M12 | St12 | St/2EHA/AA = 78/20/2 | 56 | 2EHA/BA = 50/50 | 50:50 | 227 | 237000 | −52 | 56 |
| M13 | St12 | St/2EHA/AA = 78/20/2 | 56 | 2EHA/HA = 50/50 | 50:50 | 224 | 226000 | −55 | 56 |
| M14 | St13 | St/EA/AA = 63/35/2 | 54 | 2EHA/PA = 50/50 | 50:50 | 224 | 243000 | −45 | 54 |
| M15 | St1 | St/BA/AA = 78/20/2 | 54 | 2EHA/HA = 50/50 | 50:50 | 226 | 270000 | −54 | 54 |
| M16 | St1 | St/BA/AA = 78/20/2 | 54 | 2EHA/BA = 90/10 | 50:50 | 224 | 264000 | −51 | 54 |
| M17 | St1 | St/BA/AA = 78/20/2 | 54 | 2EHA/BA = 80/20 | 50:50 | 226 | 248000 | −52 | 54 |
| M18 | St1 | St/BA/AA = 78/20/2 | 54 | 2EHA/BA = 70/30 | 50:50 | 226 | 260000 | −52 | 54 |
| M19 | St1 | St/BA/AA = 78/20/2 | 54 | 2EHA/BA = 30/70 | 50:50 | 225 | 273000 | −52 | 54 |
| M20 | St1 | St/BA/AA = 78/20/2 | 54 | 2EHA/BA = 20/80 | 50:50 | 224 | 233000 | −52 | 54 |
| M21 | St1 | St/BA/AA = 78/20/2 | 54 | 2EHA/BA = 10/90 | 50:50 | 223 | 243000 | −53 | 54 |
| M22 | St1 | St/BA/AA = 78/20/2 | 54 | 2EHA/BA = 50/50 | 90:10 | 182 | 180000 | −52 | 54 |
| M23 | St1 | St/BA/AA = 78/20/2 | 54 | 2EHA/BA = 50/50 | 80:20 | 190 | 210000 | −52 | 54 |
| M24 | St1 | St/BA/AA = 78/20/2 | 54 | 2EHA/BA = 50/50 | 70:30 | 199 | 223000 | −52 | 54 |
| M25 | St1 | St/BA/AA = 78/20/2 | 54 | 2EHA/BA = 50/50 | 30:70 | 259 | 300000 | −52 | 54 |
| M26 | St1 | St/BA/AA = 78/20/2 | 54 | 2EHA/BA = 50/50 | 20:80 | 300 | 320000 | −52 | 54 |
| M27 | St1 | St/BA/AA = 78/20/2 | 54 | 2EHA/BA = 50/50 | 10:90 | 380 | 331000 | −52 | 54 |
| M28 | St14 | St/BA/AA = 75/23/2 | 53 | 2EHA/BA = 60/40 | 50:50 | 240 | 133000 | −59 | 53 |
| M29 | St14 | St/BA/AA = 75/23/2 | 53 | 2EHA/BA = 95/05 | 50:50 | 215 | 110000 | −59 | 53 |
| M30 | St14 | St/BA/AA = 75/23/2 | 53 | 2EHA/BA = 80/20 | 50:50 | 240 | 125000 | −59 | 53 |
| M31 | St14 | St/BA/AA = 75/23/2 | 53 | 2EHA/BA = 50/50 | 50:50 | 230 | 135000 | −59 | 53 |
| M32 | St14 | St/BA/AA = 75/23/2 | 53 | 2EHA/BA = 20/80 | 50:50 | 205 | 142000 | −59 | 53 |

Preparation of Release Agent Dispersion
Fischer-Tropsch wax: 270 parts
(trade name: FNP-0090, manufactured by Nippon Seiro Co., Ltd., melting temperature=90° C.)
Anionic surfactant: 1.0 part
(NEOGEN RK, manufactured by Dai-Ichi Kogyo Seiyaku Co., Ltd.)
Ion-exchanged water: 400 parts The above-described materials are mixed with each other, the mixture is heated at 95° C., is dispersed by using a homogenizer (ULTRA TURRAX T50, manufactured by IKA Ltd.), and then is subjected to a dispersing treatment by using Manton-Gaulin high pressure homogenizer (manufactured by Manton Gaulin Mfg Company Inc) for 360 minutes, thereby preparing a release agent dispersion (solid content concentration: 20%) in which release agent having a volume average particle diameter of 0.23 μm are dispersed.

Preparation of Large Diameter Silica Particle
Preparation of Large Diameter Silica Particle (S1)
Preparation of Large Diameter Silica Particle Dispersion In a 1.5 L glass reaction container equipped with a stirrer, a dropping nozzle, and a thermometer, 300 parts of methanol and 70 parts of 10% ammonia aqueous solution are added and mixed to obtain an alkali catalyst solution. After the temperature of the alkali catalyst solution is set to 30° C., 169 parts of tetramethoxysilane (TMOS) and 45 parts of 8.0% ammonia aqueous solution are simultaneously added dropwise to the stirred alkali catalyst solution to increase the hydrophilicity, thereby obtaining a large diameter silica particle dispersion (solid content concentration: 12.0%). Here, the dropping time is 29 minutes. Next, the obtained large diameter silica particle dispersion is concentrated to a solid content concentration of 40% by weight using a rotary filter (R-Fine manufactured by Kotobuki Kogyou Co., Ltd.). This condensed matter is used as a large diameter silica particle dispersion.

Preparation of Large Diameter Silica Particles with Surface Treated with a Hydrophobizing Agent 62 parts of hexamethyl disilazane (HMDS) is added as a hydrophobizing agent with respect to 250 parts of the above-described large diameter silica particle dispersion, and reacted for 2 hours at 130° C. Then, the reactant is cooled and dried by spray drying, thereby obtaining the hydrophobic large diameter silica particle (S) by which the surface of the large diameter silica particle is treated with a hydrophobizing agent.

Preparation of Large Diameter Silica Particles (S2) to (S7)

The large diameter silica particles (S2) to (S7) are prepared in the same manner as in the preparation of the large diameter silica particle (S) except that the preparation conditions for the large diameter silica particle dispersion and the conditions for the hydrophobization treatment are set as specifications shown in Table 19. Table 19 shows the results of measuring the average primary particle diameter (D50v) and average circularity of each large diameter silica particle by the method described above.

TABLE 19

| | Preparation conditions of large diameter silica particle dispersion | | | | | | |
|---|---|---|---|---|---|---|---|
| | Total amount of dropwise addition of TMOS | Total amount of dropwise addition of 8% aqueous ammonia | Dropping time | Hydrophobization treatment | | Characteristics of large diameter silica particle | |
| | | | | Hydrophobizing | Addition amount | D50v | Average |
| No. | Parts | Parts | Minute | agent | Parts | nm | Circularity |
| S1 | 169 | 45 | 29 | HMDS | 62 | 118 | 0.97 |
| S2 | 110 | 30 | 24 | HMDS | 73 | 70 | 0.96 |
| S3 | 145 | 40 | 27 | HMDS | 70 | 102 | 0.96 |
| S4 | 250 | 66 | 45 | HMDS | 60 | 158 | 0.97 |
| S5 | 300 | 85 | 60 | HMDS | 59 | 210 | 0.92 |
| S6 | 450 | 145 | 90 | HMDS | 62 | 280 | 0.9 |
| S7 | 80 | 24 | 21 | HMDS | 62 | 45 | 0.92 |

Preparation of Adhesive Particle
Preparation of Adhesive Particle (1b)
 Composite resin particle dispersion (M1): 504 parts
 Release agent dispersion: 7.5 parts
 Ion-exchanged water: 710 parts
 Anionic surfactant (DOWFAX 2A1, manufactured by The Dow Chemical Company): 1 part The above materials are put into a reaction container equipped with a thermometer and a pH meter, a 1.0% nitric acid aqueous solution is added at a temperature of 25° C. to adjust the pH to 3.0, and then while the mixture while dispersed at the number of revolutions of 5,000 rpm with a homogenizer (manufactured by IKA, ULTRA TURRAX T50), 23 parts of 2.0% aluminum sulfate aqueous solution is added thereto. Next, a stirrer and a mantle heater are installed in the reaction container, and the temperature is increased up to a temperature of 40° C. at a rate of temperature increase of 0.2° C./min, and increased at a rate of temperature increase of 0.05° C./min after the temperature exceeds 40° C., and the particle diameter is measured every 10 minutes with COULTER MULTISIZER II (aperture diameter of 50 μm, manufactured by Beckman Coulter, Inc.). When the volume average particle diameter reaches 5.0 μm, the temperature is held, and 170 parts of the styrene resin particle dispersion (St1) is added over 5 minutes. After completion of the addition, the mixture is held at 50° C. for 30 minutes, and then a 1.0% aqueous sodium hydroxide solution is added to adjust the pH of the slurry to 6.0. Next, while adjusting the pH to 6.0 every 5° C., the temperature is increased up to 90° C. at a rate of temperature increase of 1° C./min and held at 90° C. When a particle shape and surface properties are observed with an optical microscope and a field emission scanning electron microscope (FE-SEM), the coalescence of the particles is found after 10 hours, and a container is cooled to 30° C. over 5 minutes.

The cooled slurry is passed through a nylon mesh having an opening of 15 μm to remove coarse particles, and the slurry having passed through the mesh is filtered under reduced pressure with an aspirator. The solid content remaining on the filter paper is crushed as finely as possible by hand, charged into ion-exchanged water (temperature 30° C.) 10 times the solid content, and stirred for 30 minutes. Next, the mixture is filtered under reduced pressure with an aspirator, and the solid content remaining on the filter paper is crushed as finely as possible by hand, is charged into ion-exchanged water (temperature 30° C.) 10 times the solid content, stirred for 30 minutes, and then is filtered under reduced pressure again with the aspirator to measure the electrical conductivity of the filtrate. This operation is repeated until the electric conductivity of the filtrate is 10 S/cm or less, and the solid content is washed.

The washed solid content is finely pulverized with a wet dry granulator (Comil) and vacuum dried in an oven at 25° C. for 36 hours, thereby obtaining an adhesive particle (1b). The adhesive particle (1b) has a volume average particle diameter of 8.0 μm.

100 parts of adhesive particles (1b), 1.5 parts of large diameter silica particle (S1), and 0.5 parts of silica particle having an average primary particle diameter of 40 nm (hydrophobic silica, RY50, manufactured by Nippon Aerosil Co., Ltd.) are mixed for 30 seconds at a rotational speed of 13,000 rpm using a sample mill. The adhesive particle (1b) is obtained by sieving with a vibrating sieve having an opening of 45 μm.

Using the adhesive particle (1b) as a sample, a thermal behavior is analyzed in a temperature from −150° C. to 100° C. with a differential scanning calorimeter (manufactured by Shimadzu Corporation, DSC-60A), and as a result, two glass transition temperatures are observed. Table 20 shows the glass transition temperature.

When a temperature T1 and a temperature T2 of the adhesive particle (1b) are determined by the above-described measurement method, the adhesive particle (1b) satisfies Expression 1: 10° C.≤T1−T2.

When the cross section of the adhesive particle (1b) is observed with a scanning electron microscope (SEM), a sea-island structure is observed. The adhesive particle (1b) has a core portion where an island phase is present and a shell layer where no island phase is present. A sea phase contains a styrene resin, and the island phase contains a (meth)acrylate resin. The average diameter of the island phase is determined by the measurement method described above. Table 20 shows the average diameter of the island phase.

10 parts of the adhesive particle (1b) and 100 parts of the following resin-coated carrier are put into a V-type blender and stirred for 20 minutes, and then sieved through a vibrating sieve having an opening of 212 μm, thereby obtaining a developer (1b).

Mn—Mg—Sr ferrite particle (average particle diameter of 40 μm): 100 parts

Toluene: 14 parts

Polymethylmethacrylate: 2 parts

Carbon black (VXC72, manufactured by Cabot): 0.12 parts

The above materials excluding the ferrite particle and glass bead (diameter of 1 mm, the same amount as toluene) are mixed, and stirred at a rotational speed of 1200 rpm for 30 minutes using a sand mill manufactured by Kansai Paint Co., thereby obtaining a dispersion. The dispersion and ferrite particle are put into a vacuum degassing type kneader and dried under the reduced pressure while stirring, thereby obtaining a resin-coated carrier.

Preparation of Adhesive Particles (2b) to (40b) and Developers (2b) to (40b)

Adhesive particles (2b) to (40b) are prepared in the same manner as in the preparation of the adhesive particle (1b), except that the types and amounts of the composite resin particle dispersion, the styrene resin particle dispersion, and the large diameter silica particle dispersion are changed as indicated in Table 20 and 21, and developers (2b) to (40b) are prepared in the same manner as in the preparation of the developer (1b) except for using the adhesive particles (2b) to (40b), respectively.

When the temperature T1 and the temperature T2 of the adhesive particles (2b) to (40b) are determined by the above-described measurement method, all of the adhesive particle (2b) to (40b) satisfy Expression 1: $10°$ C.$\leq$T1−T2.

Preparation of Adhesive Particles (c1b) to (c3b) and Developers (c1b) to (c3b) for Comparison Adhesive particles (c1b) to (c3b) are prepared in the same manner as in the preparation of the adhesive particle (1), except that the composite resin particle dispersion and the styrene resin particle dispersion are changed as indicated in Tables 20 and 21, and developers (c1b) to (c3b) are prepared in the same manner as in the preparation of the developer (1b) except for using the adhesive particles (c1b) to (c3b), respectively.

Evaluation of Pressure-Responsive Phase Transition

A temperature difference (T1−T3), which is an index indicating that the adhesive particle easily undergoes phase transition due to the pressure, is obtained. Using each adhesive particle as a sample, the temperature T1 and temperature T3 are measured with a flow tester (manufactured by Shimadzu Corporation, CFT-500), and the temperature difference (T1−T3) is calculated. Tables 20 and 21 indicate the temperature difference (T1−T3).

Evaluation of Adhesion and Peelability, and Evaluation of Image Transfer to Surface Facing on Printed Matter An apparatus having the form illustrated in FIG. 2 is prepared as an apparatus of producing a printed matter. That is, an apparatus of producing a printed matter, including a five-drum tandem and intermediate transfer type printing unit that collectively performs arrangement of adhesive particle according to the exemplary embodiment and color image formation on a recording medium and a pressure-bonding unit that includes a folding device and a pressure device, is prepared.

The adhesive particle (or adhesive particles for comparison) according to the exemplary embodiment, a yellow toner, a magenta toner, a cyan toner, and a black toner are respectively put in five developer units included in the printing unit. As the yellow toner, the magenta toner, the cyan toner and the black toner, commercially available products manufactured by Fuji Xerox Co., Ltd. are used.

An image formed on the postcard paper is an image having an area density of 20% in which black characters and full-color photo-images are mixed, and is formed on one side of the postcard paper.

The amount of adhesive particle (or adhesive particle for comparison) according to the exemplary embodiment applied is 3 $g/m^2$ in an image forming region on an image forming surface of the postcard paper.

The folding device is a device that folds the postcard paper in half so that the image forming surface becomes an inside surface.

The pressure of the pressure device is set to 90 MPa.

With the above-described apparatus and conditions, ten postcards which are folded in half so that the image forming surfaces become inside surfaces and the image forming surfaces are bonded to each other are produced in succession.

The tenth postcard is cut in the long side direction with a width of 15 mm to produce a rectangular test piece, and then a 90-degree peel test is performed. The peeling speed of the 90-degree peel test is 20 mm/min, and after starting the measurement, a load (N) from 10 mm to 50 mm is sampled at intervals of 0.4 mm, the average is calculated, and loads (N) of three test pieces are averaged. The load (N) required for the peeling is classified as follows. The results are shown in Tables 20 and 21. Further, it is visually observed whether or not the image formed on the surface to be pressure-bonded of the postcard paper is moved on the postcard paper after peeling. A case where the image transfer occurs is evaluated as "occurrence", and a case where the image transfer does not occur is evaluated as "not occurred".

A: 1.6 N or more

B: 1.4 N to less than 1.6 N

C: 1.0 N to less than 1.4 N

D: 0.5 N to less than 1.0 N

E: less than 0.5 N

TABLE 20

| Adhesive particle | Composite resin particle dispersion | Polymerization component of Ac-based resin | Core portion Weight ratio of St-based resin to Ac-based resin (St:Ac) | Shell layer St-based resin particle dispersion | Adhesive particle D50$_v$ μm | Average diameter of island phase nm | Tg °C. | Tg °C. | Tg difference °C. |
|---|---|---|---|---|---|---|---|---|---|
| c1b | cM1 | 2EHA = 100 | 50:50 | St1 | 8.0 | 600 | −50 | 54 | 104 |
| c2b | cM2 | BA = 100 | 50:50 | St1 | 8.0 | 550 | −53 | 54 | 107 |
| c3b | cM3 | BA = 100 | 50:50 | St12 | 11.0 | 570 | −53 | 56 | 109 |
| 1b | M1 | 2EHA/BA = 50/50 | 50:50 | St1 | 8.0 | 200 | −52 | 54 | 106 |
| 2b | M2 | 2EHA/BA = 50/50 | 50:50 | St2 | 11.0 | 250 | −52 | 76 | 128 |
| 3b | M3 | 2EHA/BA = 50/50 | 50:50 | St3 | 11.0 | 280 | −52 | 65 | 117 |
| 4b | M4 | 2EHA/BA = 50/50 | 50:50 | St4 | 11.0 | 240 | −52 | 57 | 109 |
| 5b | M5 | 2EHA/BA = 50/50 | 50:50 | St5 | 11.0 | 240 | −52 | 55 | 107 |
| 6b | M6 | 2EHA/BA = 50/50 | 50:50 | St6 | 11.0 | 250 | −52 | 54 | 106 |
| 7b | M7 | 2EHA/BA = 50/50 | 50:50 | St7 | 9.5 | 250 | −52 | 54 | 106 |
| 8b | M8 | 2EHA/BA = 50/50 | 50:50 | St8 | 9.5 | 250 | −52 | 54 | 106 |
| 9b | M9 | 2EHA/BA = 50/50 | 50:50 | St9 | 9.5 | 220 | −52 | 43 | 95 |
| 10b | M10 | 2EHA/BA = 50/50 | 50:50 | St10 | 9.5 | 230 | −52 | 35 | 87 |
| 11b | M11 | 2EHA/BA = 50/50 | 50:50 | St11 | 9.5 | 220 | −52 | 56 | 108 |
| 12b | M12 | 2EHA/BA = 50/50 | 50:50 | St12 | 9.5 | 230 | −52 | 56 | 108 |
| 13b | M13 | 2EHA/HA = 50/50 | 50:50 | St12 | 5.8 | 250 | −55 | 56 | 111 |
| 14b | M14 | 2EHA/PA = 50/50 | 50:50 | St13 | 5.8 | 350 | −45 | 54 | 99 |
| 15b | M15 | 2EHA/HA = 50/50 | 50:50 | St1 | 5.8 | 400 | −54 | 54 | 108 |
| 16b | M16 | 2EHA/BA = 90/10 | 50:50 | St1 | 8.0 | 400 | −51 | 54 | 105 |
| 17b | M17 | 2EHA/BA = 80/20 | 50:50 | St1 | 8.0 | 300 | −52 | 54 | 106 |
| 18b | M18 | 2EHA/BA = 70/30 | 50:50 | St1 | 8.0 | 250 | −52 | 54 | 106 |
| 19b | M19 | 2EHA/BA = 30/70 | 50:50 | St1 | 8.0 | 250 | −52 | 54 | 106 |
| 20b | M20 | 2EHA/BA = 20/80 | 50:50 | St1 | 8.0 | 300 | −52 | 54 | 106 |
| 21b | M21 | 2EHA/BA = 10/90 | 50:50 | St1 | 8.0 | 400 | −53 | 54 | 107 |
| 22b | M22 | 2EHA/BA = 50/50 | 90:10 | St1 | 8.0 | 450 | −52 | 54 | 106 |
| 23b | M23 | 2EHA/BA = 50/50 | 80:20 | St1 | 8.0 | 400 | −52 | 54 | 106 |
| 24b | M24 | 2EHA/BA = 50/50 | 70:30 | St1 | 8.0 | 250 | −52 | 54 | 106 |
| 25b | M25 | 2EHA/BA = 50/50 | 30:70 | St1 | 8.0 | 210 | −52 | 54 | 106 |
| 26b | M26 | 2EHA/BA = 50/50 | 20:80 | St1 | 8.0 | 230 | −52 | 54 | 106 |
| 27b | M27 | 2EHA/BA = 50/50 | 10:90 | St1 | 8.0 | 250 | −52 | 54 | 106 |

| Adhesive particle | Pressure-responsive T3 °C. | phase transition (T1-T3) °C. | Large diameter silica particle Kinds of particle dispersion | External addition amount Parts | Peelability | Evaluation of image transfer to surface facing on printed matter | Remarks |
|---|---|---|---|---|---|---|---|
| c1b | 95 | 3 | S1 | 1.2 | E | Not occurred | Comparative Example |
| c2b | 93 | 4 | S1 | 1.2 | E | Not occurred | Comparative Example |
| c3b | 93 | 4 | S1 | 1.2 | E | Not occurred | Comparative Example |
| 1b | 75 | 15 | S1 | 1.2 | B | Not occurred | Example |
| 2b | 70 | 13 | S1 | 1.2 | B | Not occurred | Example |
| 3b | 78 | 15 | S1 | 1.2 | B | Not occurred | Example |
| 4b | 70 | 10 | S1 | 1.2 | B | Not occurred | Example |
| 5b | 74 | 16 | S1 | 1.2 | B | Not occurred | Example |
| 6b | 73 | 14 | S1 | 1.2 | B | Not occurred | Example |
| 7b | 73 | 13 | S1 | 1.2 | B | Not occurred | Example |
| 8b | 75 | 10 | S1 | 1.2 | B | Not occurred | Example |
| 9b | 75 | 15 | S1 | 1.2 | B | Not occurred | Example |
| 10b | 73 | 15 | S1 | 1.2 | B | Not occurred | Example |
| 11b | 72 | 15 | S1 | 1.2 | B | Not occurred | Example |
| 12b | 75 | 20 | S1 | 1.2 | B | Not occurred | Example |
| 13b | 70 | 15 | S1 | 1.2 | B | Not occurred | Example |
| 14b | 80 | 5 | S1 | 1.2 | C | Not occurred | Example |
| 15b | 81 | 7 | S1 | 1.2 | C | Not occurred | Example |
| 16b | 80 | 10 | S1 | 1.2 | C | Not occurred | Example |
| 17b | 70 | 20 | S1 | 1.2 | B | Not occurred | Example |
| 18b | 75 | 15 | S1 | 1.2 | B | Not occurred | Example |
| 19b | 73 | 15 | S1 | 1.2 | B | Not occurred | Example |
| 20b | 75 | 20 | S1 | 1.2 | B | Not occurred | Example |
| 21b | 80 | 9 | S1 | 1.2 | C | Not occurred | Example |
| 22b | 85 | 5 | S1 | 1.2 | E | Not occurred | Example |
| 23b | 80 | 10 | S1 | 1.2 | C | Not occurred | Example |
| 24b | 75 | 15 | S1 | 1.2 | B | Not occurred | Example |

TABLE 20-continued

| | | | | | | | |
|---|---|---|---|---|---|---|---|
| 25b | 73 | 13 | S1 | 1.2 | B | Not occurred | Example |
| 26b | 72 | 13 | S1 | 1.2 | B | Not occurred | Example |
| 27b | 72 | 13 | S1 | 1.2 | B | Not occurred | Example |

TABLE 21

| | Core portion | | | | Adhesive particle | | | |
|---|---|---|---|---|---|---|---|---|
| Adhesive particle | Composite resin particle dispersion | Polymerization component of Ac-based resin | Weight ratio of St-based resin to Ac-based resin (St:Ac) | Shell layer St-based resin particle dispersion | $D50_v$ μm | Average diameter of island phase nm | Tg °C. | Tg °C. | Tg difference °C. |
| 28b | M28 | 2EHA/BA = 60/40 | 50:50 | St14 | 8.6 | 260 | −59 | 53 | 112 |
| 29b | M29 | 2EHA/BA = 95/05 | 50:50 | St14 | 11.3 | 280 | −67 | 53 | 120 |
| 30b | M30 | 2EHA/BA = 80/20 | 50:50 | St14 | 12.5 | 260 | −63 | 53 | 116 |
| 31b | M31 | 2EHA/BA = 50/50 | 50:50 | St14 | 10.5 | 270 | −58 | 53 | 111 |
| 32b | M32 | 2EHA/BA = 20/80 | 50:50 | St14 | 11.0 | 310 | −56 | 53 | 109 |
| 34b | M28 | 2EHA/BA = 60/40 | 50:50 | St14 | 8.6 | 280 | −59 | 53 | 112 |
| 35b | M28 | 2EHA/BA = 60/40 | 50:50 | St14 | 8.6 | 270 | −59 | 53 | 112 |
| 36b | M28 | 2EHA/BA = 60/40 | 50:50 | St14 | 8.6 | 260 | −59 | 53 | 112 |
| 37b | M28 | 2EHA/BA = 60/40 | 50:50 | St14 | 8.6 | 270 | −59 | 53 | 112 |
| 38b | M28 | 2EHA/BA = 60/40 | 50:50 | St14 | 8.6 | 300 | −59 | 53 | 112 |
| 39b | M28 | 2EHA/BA = 60/40 | 50:50 | St14 | 8.6 | 270 | −59 | 53 | 112 |
| 40b | M28 | 2EHA/BA = 60/40 | 50:50 | St14 | 8.6 | 250 | −59 | 53 | 112 |

| Adhesive particle | | Adhesive particle | | Large diameter silica particle | | | Evaluation of image transfer to surface facing on printed matter | Remarks |
|---|---|---|---|---|---|---|---|---|
| | T3 °C. | Pressure-responsive phase transition (T1-T3) °C. | Kinds of particle dispersion | External addition amount Parts | Peelability | | | |
| 28b | 70 | 22 | S1 | 1.5 | D | Not occurred | Example |
| 29b | 68 | 21 | S1 | 1.5 | D | Not occurred | Example |
| 30b | 68 | 21 | S3 | 1.2 | D | Not occurred | Example |
| 31b | 70 | 22 | S1 | 1.4 | D | Not occurred | Example |
| 32b | 68 | 22 | S3 | 1.4 | C | Not occurred | Example |
| 34b | 69 | 22 | S2 | 1.2 | D | Not occurred | Example |
| 35b | 69 | 22 | S3 | 1.2 | C | Not occurred | Example |
| 36b | 69 | 22 | S4 | 1.8 | C | Not occurred | Example |
| 37b | 69 | 22 | S5 | 2 | C | Not occurred | Example |
| 38b | 69 | 22 | S6 | 2.5 | D | Not occurred | Example |
| 39b | 69 | 22 | S1 | 11 | D | Not occurred | Example |
| 40b | 69 | 22 | S1 | 0.05 | A | Not occurred | Example |

As shown in Tables 20 and 21, it is understood that adhesion and peelability between the adhesive particle layers are compatible with respect to a printed matter pressure-bonded with the electrostatic charge image developing adhesive particle including the adhesive particle of each of Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pressure sensitive adhesive particle comprising:
   a styrene resin; and
   a (meth)acrylate resin,
   wherein the styrene resin is derived from styrene resin polymerization components, the styrene resin polymerization components including styrene and at least one selected from the group consisting of 2-ethyl hexyl acrylate and n-butyl acrylate,
   wherein the (meth)acrylate resin is derived from alkyl (meth)acrylate polymerization components, the alkyl (meth)acrylate polymerization components including 2-ethyl hexyl acrylate and n-butyl acrylate,
   a weight proportion of the alkyl (meth)acrylate polymerization components to a total polymerization components of the (meth)acrylate resin is 90% by weight or more,
   the pressure sensitive adhesive has two glass transition points,
   a difference between a lowest glass transition temperature and a highest glass transition temperature of the pressure sensitive adhesive is 30° C. or higher,
   a weight ratio among the 2-ethyl hexyl acrylate and n-butyl acrylate of the alkyl (meth)acrylate polymerization components of the (meth)acrylate resin is from 80:20 to 20:80,
   the pressure sensitive adhesive particle includes:
      a core portion that contains the styrene resin and the (meth)acrylate resin; and
      a shell layer that covers the core portion and contains the styrene resin,
   a glass transition temperature of the (meth)acrylate resin is −10° C. or lower,
   the core portion comprises:
      a sea phase that contains the styrene resin; and
      an island phase that contains the (meth)acrylate resin dispersed in the sea phase, and
   an average diameter of the island phases is from 200 nm to 500 nm.

2. The pressure sensitive adhesive particle according to claim 1,
   wherein a weight proportion of styrene to total polymerization components for the styrene resin is from 60% by weight to 95% by weight.

3. The pressure sensitive adhesive particle according to claim 1,
   wherein a content of the styrene resin is larger than a content of the (meth)acrylate resin.

4. The pressure sensitive adhesive particle according to claim 1,
   wherein a temperature at which the toner has a viscosity of 10,000 Pa's under a pressure of 4 MPa is 90° C. or lower.

5. The pressure sensitive adhesive particle according to claim 1,
   wherein the average thickness of the shell layer is 120 nm or more and 550 nm or less.

6. The pressure sensitive adhesive particle according to claim 1, wherein a temperature difference (T1−T3) between a temperature T1 at which the adhesive particle has a viscosity of 10,000 Pa·s under a pressure of 1 MPa and a temperature T3 at which the adhesive particle has a viscosity of 10,000 Pa·s under a pressure of 4 MPa is 5° C. or higher.

7. The pressure sensitive adhesive particle according to claim 1, wherein a temperature difference (T1−T3) between a temperature T1 at which the adhesive particle has a viscosity of 10,000 Pa·s under a pressure of 1 MPa and a temperature T3 at which the adhesive particle has a viscosity of 10,000 Pa·s under a pressure of 4 MPa is 10° C. or higher.

8. The pressure sensitive adhesive particle according to claim 1, further comprising:
   silica particles having an average primary particle diameter of 1 nm to 300 nm or titanium oxide particles as an external additive.

9. The pressure sensitive adhesive particle according to claim 8,
   wherein an average primary particle diameter of the titanium oxide particles is from 10 nm to 100 nm.

10. The pressure sensitive adhesive particle according to claim 8,
    wherein an external addition amount of the silica particles is 1 part by weight to 3 parts by weight with respect to 100 parts by weight of toner particles included in the toner.

11. The pressure sensitive adhesive particle according to claim 8,
    wherein a content of the titanium oxide particles is 0.5 parts by weight to 5 parts by weight with respect to 100 parts by weight of toner particles included in the toner.

12. A method of producing a printed matter, the method comprising:
    arranging a pressure sensitive adhesive particle according to claim 1 on a recording medium; and
    folding and pressure-bonding the recording medium or stacking and pressure-bonding the recording medium and another recording medium.

* * * * *